(12) United States Patent
Macciola et al.

(10) Patent No.: US 9,137,417 B2
(45) Date of Patent: *Sep. 15, 2015

(54) SYSTEMS AND METHODS FOR PROCESSING VIDEO DATA

(71) Applicant: Kofax, Inc., Irvine, CA (US)

(72) Inventors: Anthony Macciola, Chino Hills, CA (US); Jan W. Amtrup, Chevy Chase, MD (US); Jiyong Ma, San Diego, CA (US); Roland G. Borrey, Villa Park, CA (US); Mauritius A. R. Schmidtler, Escondido, CA (US); Hari S. Asuri, Irvine, CA (US); Joel S. Fechter, Huntington Beach, CA (US); Robert A. Taylor, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/340,460

(22) Filed: Jul. 24, 2014

(65) Prior Publication Data

US 2014/0333971 A1  Nov. 13, 2014

Related U.S. Application Data

(63) Continuation-in-part of application No. 13/898,407, filed on May 20, 2013, now Pat. No. 8,823,991, which is a continuation of application No. 11/329,999, filed on Jan. 11, 2006, now Pat. No. 8,749,839, application (Continued)

(51) Int. Cl.
*H04N 1/40* (2006.01)
*H04N 1/00* (2006.01)
(Continued)

(52) U.S. Cl.
CPC .......... *H04N 1/40093* (2013.01); *G06K 9/3208* (2013.01); *G06T 5/00* (2013.01); *H04N 1/40* (2013.01); *H04N 2201/0458* (2013.01)

(58) Field of Classification Search
CPC ... H04N 19/186; H04N 19/61; H04N 19/105; H04N 19/182; H04N 19/436
USPC ........................... 358/3.24, 1.6, 1.13, 1.9, 1.2
See application file for complete search history.

(56) References Cited

U.S. PATENT DOCUMENTS 3,069,654 A 12/1962 Hough
4,656,665 A 4/1987 Pennebaker
(Continued)

FOREIGN PATENT DOCUMENTS

EP 0549329 A2 6/1993
EP 0767578 A2 4/1997
(Continued)

OTHER PUBLICATIONS

"AutoMatch," www.ucoa.com/products/automatch, retrieved Jan. 22, 2009.
(Continued)

*Primary Examiner* — Charlotte M Baker
(74) *Attorney, Agent, or Firm* — Zilka-Kotab, PC

(57) ABSTRACT

A method includes storing raw or normalized video data in a computer accessible storage medium; analyzing portions of the video data with a first analytic engine to: determine whether the raw video data is within a first set of parameters; and generate with the first analytic engine a first set of processor settings; processing the raw or normalized video data with the first set of processor settings; and analyzing portions of the processed data with a second analytic engine to determine whether the processed data is within a second set of parameters; generating with the second analytic engine a second set of processor settings to reprocess the raw or normalized video data, sending the second set of processor settings to the first analytic engine; and reprocessing the raw or normalized video data with the first analytic engine using the second set of processor settings.

20 Claims, 11 Drawing Sheets

Related U.S. Application Data

No. 14/340,460, which is a continuation-in-part of application No. 14/268,876, filed on May 2, 2014, now Pat. No. 8,885,229.

(60) Provisional application No. 60/665,067, filed on Mar. 24, 2005, provisional application No. 61/819,463, filed on May 3, 2013.

(51) Int. Cl.
| | |
|---|---|
| G06F 3/12 | (2006.01) |
| H04N 1/60 | (2006.01) |
| G06K 15/02 | (2006.01) |
| G06K 9/32 | (2006.01) |
| G06T 5/00 | (2006.01) |

(56) References Cited

U.S. PATENT DOCUMENTS

| | | |
|---|---|---|
| 4,836,026 A | 6/1989 | P'an et al. |
| 4,903,312 A | 2/1990 | Sato |
| 4,992,863 A | 2/1991 | Moriya |
| 5,020,112 A | 5/1991 | Chou |
| 5,063,604 A | 11/1991 | Weiman |
| 5,124,810 A | 6/1992 | Seto |
| 5,159,667 A | 10/1992 | Borrey et al. |
| 5,181,260 A | 1/1993 | Kurosu et al. |
| 5,202,934 A | 4/1993 | Miyakawa et al. |
| 5,220,621 A | 6/1993 | Saitoh |
| 5,268,967 A | 12/1993 | Jang et al. |
| 5,282,055 A | 1/1994 | Suzuki |
| 5,313,527 A | 5/1994 | Guberman et al. |
| 5,317,646 A | 5/1994 | Sang, Jr. et al. |
| 5,344,132 A | 9/1994 | LeBrun et al. |
| 5,353,673 A | 10/1994 | Lynch |
| 5,355,547 A | 10/1994 | Fitjer |
| 5,375,197 A | 12/1994 | Kang |
| 5,430,810 A | 7/1995 | Saeki |
| 5,467,407 A | 11/1995 | Guberman et al. |
| 5,473,742 A | 12/1995 | Polyakov et al. |
| 5,546,474 A | 8/1996 | Zuniga |
| 5,563,723 A | 10/1996 | Beaulieu et al. |
| 5,563,966 A | 10/1996 | Ise et al. |
| 5,602,964 A | 2/1997 | Barrett |
| 5,629,989 A | 5/1997 | Osada |
| 5,652,663 A | 7/1997 | Zelten |
| 5,668,890 A | 9/1997 | Winkelman |
| 5,696,611 A | 12/1997 | Nishimura et al. |
| 5,699,244 A | 12/1997 | Clark, Jr. et al. |
| 5,717,794 A | 2/1998 | Koga et al. |
| 5,721,940 A | 2/1998 | Luther et al. |
| 5,757,963 A | 5/1998 | Ozaki et al. |
| 5,781,665 A | 7/1998 | Cullen et al. |
| 5,822,454 A | 10/1998 | Rangarajan |
| 5,825,915 A | 10/1998 | Michimoto et al. |
| 5,832,138 A | 11/1998 | Nakanishi et al. |
| 5,839,019 A | 11/1998 | Ito |
| 5,848,184 A | 12/1998 | Taylor et al. |
| 5,867,264 A | 2/1999 | Hinnrichs |
| 5,937,084 A | 8/1999 | Crabtree et al. |
| 5,953,388 A | 9/1999 | Walnut et al. |
| 5,987,172 A | 11/1999 | Michael |
| 6,005,958 A | 12/1999 | Farmer et al. |
| 6,009,191 A | 12/1999 | Julier |
| 6,009,196 A | 12/1999 | Mahoney et al. |
| 6,011,595 A | 1/2000 | Henderson et al. |
| 6,016,361 A | 1/2000 | Hongu et al. |
| 6,038,348 A | 3/2000 | Carley |
| 6,055,968 A | 5/2000 | Sasaki et al. |
| 6,067,385 A | 5/2000 | Cullen et al. |
| 6,072,916 A | 6/2000 | Suzuki |
| 6,073,148 A | 6/2000 | Rowe et al. |
| 6,098,065 A | 8/2000 | Skillen et al. |
| 6,104,830 A | 8/2000 | Schistad |
| 6,118,544 A | 9/2000 | Rao |
| 6,118,552 A | 9/2000 | Suzuki et al. |
| 6,154,217 A | 11/2000 | Aldrich |
| 6,192,360 B1 | 2/2001 | Dumais et al. |
| 6,219,158 B1 | 4/2001 | Dawe |
| 6,219,773 B1 | 4/2001 | Garibay, Jr. et al. |
| 6,223,223 B1 | 4/2001 | Kumpf et al. |
| 6,229,625 B1 | 5/2001 | Nakatsuka |
| 6,233,059 B1 | 5/2001 | Kodaira et al. |
| 6,263,122 B1 | 7/2001 | Simske et al. |
| 6,292,168 B1 | 9/2001 | Venable et al. |
| 6,327,581 B1 | 12/2001 | Platt |
| 6,337,925 B1 | 1/2002 | Cohen et al. |
| 6,347,152 B1 | 2/2002 | Shinagawa et al. |
| 6,347,162 B1 | 2/2002 | Suzuki |
| 6,356,647 B1 | 3/2002 | Bober et al. |
| 6,370,277 B1 | 4/2002 | Borrey et al. |
| 6,385,346 B1 | 5/2002 | Gillihan et al. |
| 6,393,147 B2 | 5/2002 | Danneels et al. |
| 6,408,094 B1 | 6/2002 | Mirzaoff et al. |
| 6,408,105 B1 | 6/2002 | Maruo |
| 6,424,742 B2 | 7/2002 | Yamamoto et al. |
| 6,456,738 B1 | 9/2002 | Tsukasa |
| 6,463,430 B1 | 10/2002 | Brady et al. |
| 6,469,801 B1 | 10/2002 | Telle |
| 6,473,198 B1 | 10/2002 | Matama |
| 6,473,535 B1 | 10/2002 | Takaoka |
| 6,480,304 B1 | 11/2002 | Os et al. |
| 6,480,624 B1 | 11/2002 | Horie et al. |
| 6,501,855 B1 | 12/2002 | Zelinski |
| 6,512,848 B2 | 1/2003 | Wang et al. |
| 6,522,791 B2 | 2/2003 | Nagarajan |
| 6,525,840 B1 | 2/2003 | Haraguchi et al. |
| 6,563,531 B1 | 5/2003 | Matama |
| 6,601,026 B2 | 7/2003 | Appelt et al. |
| 6,614,930 B1 | 9/2003 | Agnihotri et al. |
| 6,621,595 B1 | 9/2003 | Fan et al. |
| 6,628,416 B1 | 9/2003 | Hsu et al. |
| 6,633,857 B1 | 10/2003 | Tipping |
| 6,643,413 B1 | 11/2003 | Shum et al. |
| 6,646,765 B1 | 11/2003 | Barker et al. |
| 6,658,147 B2 | 12/2003 | Gorbatov et al. |
| 6,665,425 B1 | 12/2003 | Sampath et al. |
| 6,667,774 B2 | 12/2003 | Berman et al. |
| 6,675,159 B1 | 1/2004 | Lin et al. |
| 6,701,009 B1 | 3/2004 | Makoto et al. |
| 6,704,441 B1 | 3/2004 | Inagaki et al. |
| 6,724,916 B1 | 4/2004 | Shyu |
| 6,732,046 B1 | 5/2004 | Joshi |
| 6,748,109 B1 | 6/2004 | Yamaguchi |
| 6,751,349 B2 | 6/2004 | Matama |
| 6,757,081 B1 | 6/2004 | Fan et al. |
| 6,757,427 B1 | 6/2004 | Hongu |
| 6,763,515 B1 | 7/2004 | Vazquez et al. |
| 6,765,685 B1 | 7/2004 | Yu |
| 6,781,375 B2 | 8/2004 | Miyazaki et al. |
| 6,788,830 B1 | 9/2004 | Morikawa |
| 6,789,069 B1 | 9/2004 | Barnhill et al. |
| 6,801,658 B2 | 10/2004 | Morita et al. |
| 6,826,311 B2 | 11/2004 | Wilt |
| 6,839,466 B2 | 1/2005 | Venable |
| 6,850,653 B2 | 2/2005 | Abe |
| 6,873,721 B1 | 3/2005 | Beyerer et al. |
| 6,882,983 B2 | 4/2005 | Furphy et al. |
| 6,898,601 B2 | 5/2005 | Amado et al. |
| 6,901,170 B1 | 5/2005 | Terada et al. |
| 6,917,438 B1 | 7/2005 | Yoda et al. |
| 6,917,709 B2 | 7/2005 | Zelinski |
| 6,921,220 B2 | 7/2005 | Aiyama |
| 6,950,555 B2 | 9/2005 | Filatov et al. |
| 6,987,534 B1 | 1/2006 | Seta |
| 6,989,914 B2 | 1/2006 | Iwaki |
| 7,016,549 B1 | 3/2006 | Utagawa |
| 7,017,108 B1 | 3/2006 | Wan |
| 7,020,320 B2 | 3/2006 | Filatov |
| 7,023,447 B2 | 4/2006 | Luo et al. |
| 7,027,181 B2 | 4/2006 | Takamori |
| 7,038,713 B1 | 5/2006 | Matama |
| 7,042,603 B2 | 5/2006 | Masao et al. |
| 7,043,080 B1 | 5/2006 | Dolan |

(56) References Cited

U.S. PATENT DOCUMENTS

| | | |
|---|---|---|
| 7,054,036 B2 | 5/2006 | Hirayama |
| 7,081,975 B2 | 7/2006 | Yoda et al. |
| 7,082,426 B2 | 7/2006 | Musgrove et al. |
| 7,123,387 B2 | 10/2006 | Cheng et al. |
| 7,130,471 B2 | 10/2006 | Bossut et al. |
| 7,145,699 B2 | 12/2006 | Dolan |
| 7,168,614 B2 | 1/2007 | Kotovich et al. |
| 7,173,732 B2 | 2/2007 | Matama |
| 7,174,043 B2 | 2/2007 | Lossev et al. |
| 7,177,049 B2 | 2/2007 | Karidi |
| 7,181,082 B2 | 2/2007 | Feng |
| 7,184,929 B2 | 2/2007 | Goodman |
| 7,194,471 B1 | 3/2007 | Nagatsuka et al. |
| 7,197,158 B2 | 3/2007 | Camara et al. |
| 7,201,323 B2 | 4/2007 | Kotovich et al. |
| 7,209,599 B2 | 4/2007 | Simske et al. |
| 7,228,314 B2 | 6/2007 | Kawamoto et al. |
| 7,249,717 B2 | 7/2007 | Kotovich et al. |
| 7,251,777 B1 | 7/2007 | Valtchev et al. |
| 7,253,836 B1 | 8/2007 | Suzuki et al. |
| 7,263,221 B1 | 8/2007 | Moriwaki |
| 7,266,768 B2 | 9/2007 | Ferlitsch et al. |
| 7,317,828 B2 | 1/2008 | Suzuki et al. |
| 7,337,389 B1 | 2/2008 | Woolf et al. |
| 7,339,585 B2 | 3/2008 | Verstraelen et al. |
| 7,340,376 B2 | 3/2008 | Goodman |
| 7,349,888 B1 | 3/2008 | Heidenreich et al. |
| 7,365,881 B2 | 4/2008 | Burns et al. |
| 7,366,705 B2 | 4/2008 | Zeng et al. |
| 7,382,921 B2 | 6/2008 | Lossev et al. |
| 7,386,527 B2 | 6/2008 | Harris et al. |
| 7,392,426 B2 | 6/2008 | Wolfe et al. |
| 7,403,008 B2 | 7/2008 | Blank et al. |
| 7,403,313 B2 | 7/2008 | Kuo |
| 7,406,183 B2 | 7/2008 | Emerson et al. |
| 7,409,092 B2 | 8/2008 | Srinivasa |
| 7,409,633 B2 | 8/2008 | Lerner et al. |
| 7,416,131 B2 | 8/2008 | Fortune et al. |
| 7,426,293 B2 | 9/2008 | Chien et al. |
| 7,430,059 B2 | 9/2008 | Rodrigues et al. |
| 7,430,066 B2 | 9/2008 | Hsu et al. |
| 7,430,310 B2 | 9/2008 | Kotovich et al. |
| 7,447,377 B2 | 11/2008 | Takahira |
| 7,464,066 B2 | 12/2008 | Zelinski et al. |
| 7,478,332 B2 | 1/2009 | Büttner et al. |
| 7,487,438 B1 | 2/2009 | Withers |
| 7,492,478 B2 | 2/2009 | Une |
| 7,492,943 B2 | 2/2009 | Li et al. |
| 7,515,313 B2 | 4/2009 | Cheng |
| 7,515,772 B2 | 4/2009 | Li et al. |
| 7,528,883 B2 | 5/2009 | Hsu |
| 7,545,529 B2 | 6/2009 | Borrey et al. |
| 7,553,095 B2 | 6/2009 | Kimura et al. |
| 7,562,060 B2 | 7/2009 | Sindhwani et al. |
| 7,580,557 B2 | 8/2009 | Zavadsky et al. |
| 7,639,387 B2 | 12/2009 | Hull et al. |
| 7,643,665 B2 | 1/2010 | Zavadsky et al. |
| 7,651,286 B2 | 1/2010 | Tischler |
| 7,655,685 B2 | 2/2010 | McElroy et al. |
| 7,657,091 B2 | 2/2010 | Postnikov et al. |
| 7,665,061 B2 | 2/2010 | Kothari et al. |
| 7,673,799 B2 | 3/2010 | Hart et al. |
| 7,738,730 B2 | 6/2010 | Hawley |
| 7,739,127 B1 | 6/2010 | Hall |
| 7,761,391 B2 | 7/2010 | Schmidtler et al. |
| 7,778,457 B2 | 8/2010 | Nepomniachtchi et al. |
| 7,787,695 B2 | 8/2010 | Nepomniachtchi et al. |
| 7,937,345 B2 | 5/2011 | Schmidtler et al. |
| 7,949,167 B2 | 5/2011 | Krishnan et al. |
| 7,949,176 B2 | 5/2011 | Nepomniachtchi |
| 7,949,660 B2 | 5/2011 | Green et al. |
| 7,953,268 B2 | 5/2011 | Nepomniachtchi |
| 7,958,067 B2 | 6/2011 | Schmidtler et al. |
| 7,978,900 B2 | 7/2011 | Nepomniachtchi et al. |
| 7,999,961 B2 | 8/2011 | Wanda |
| 8,000,514 B2 | 8/2011 | Nepomniachtchi et al. |
| 8,064,710 B2 | 11/2011 | Mizoguchi |
| 8,073,263 B2 | 12/2011 | Hull et al. |
| 8,078,958 B2 | 12/2011 | Cottrille et al. |
| 8,094,976 B2 | 1/2012 | Berard et al. |
| 8,135,656 B2 | 3/2012 | Evanitsky |
| 8,194,965 B2 | 6/2012 | Lossev et al. |
| 8,239,335 B2 | 8/2012 | Schmidtler et al. |
| 8,244,031 B2 | 8/2012 | Cho et al. |
| 8,279,465 B2 | 10/2012 | Couchman |
| 8,311,296 B2 | 11/2012 | Filatov et al. |
| 8,326,015 B2 | 12/2012 | Nepomniachtchi |
| 8,345,981 B2 | 1/2013 | Schmidtler et al. |
| 8,354,981 B2 | 1/2013 | Kawasaki et al. |
| 8,374,977 B2 | 2/2013 | Schmidtler et al. |
| 8,379,914 B2 | 2/2013 | Nepomniachtchi et al. |
| 8,385,647 B2 | 2/2013 | Hawley et al. |
| 8,406,480 B2 | 3/2013 | Grigsby et al. |
| 8,452,098 B2 | 5/2013 | Nepomniachtchi et al. |
| 8,483,473 B2 | 7/2013 | Roach et al. |
| 8,503,797 B2 | 8/2013 | Turkelson et al. |
| 8,515,163 B2 | 8/2013 | Cho et al. |
| 8,515,208 B2 | 8/2013 | Minerich |
| 8,526,739 B2 | 9/2013 | Schmidtler et al. |
| 8,532,419 B2 | 9/2013 | Coleman |
| 8,559,766 B2 | 10/2013 | Tilt et al. |
| 8,577,118 B2 | 11/2013 | Nepomniachtchi et al. |
| 8,582,862 B2 | 11/2013 | Nepomniachtchi et al. |
| 8,620,058 B2 | 12/2013 | Nepomniachtchi et al. |
| 8,639,621 B1 | 1/2014 | Ellis et al. |
| 8,677,249 B2 | 3/2014 | Buttner et al. |
| 8,693,043 B2 | 4/2014 | Schmidtler et al. |
| 8,705,836 B2 | 4/2014 | Gorski et al. |
| 8,719,197 B2 | 5/2014 | Schmidtler et al. |
| 8,749,839 B2 | 6/2014 | Borrey et al. |
| 8,774,516 B2 | 7/2014 | Amtrup et al. |
| 8,823,991 B2 | 9/2014 | Borrey et al. |
| 8,855,375 B2 | 10/2014 | Macciola et al. |
| 8,855,425 B2 | 10/2014 | Schmidtler et al. |
| 2001/0027420 A1 | 10/2001 | Boublik et al. |
| 2002/0030831 A1 | 3/2002 | Kinjo |
| 2002/0054693 A1 | 5/2002 | Elmenhurst |
| 2002/0069218 A1 | 6/2002 | Sull et al. |
| 2002/0122071 A1 | 9/2002 | Camara et al. |
| 2002/0126313 A1 | 9/2002 | Namizuka |
| 2002/0165717 A1 | 11/2002 | Solmer et al. |
| 2003/0002068 A1 | 1/2003 | Constantin et al. |
| 2003/0026479 A1 | 2/2003 | Thomas et al. |
| 2003/0044012 A1 | 3/2003 | Eden |
| 2003/0046445 A1 | 3/2003 | Witt et al. |
| 2003/0101161 A1 | 5/2003 | Ferguson et al. |
| 2003/0120653 A1 | 6/2003 | Brady et al. |
| 2003/0142328 A1 | 7/2003 | McDaniel et al. |
| 2003/0156201 A1 | 8/2003 | Zhang |
| 2003/0210428 A1 | 11/2003 | Bevlin et al. |
| 2003/0223615 A1 | 12/2003 | Keaton et al. |
| 2004/0021909 A1 | 2/2004 | Kikuoka |
| 2004/0022437 A1 | 2/2004 | Beardsley |
| 2004/0083119 A1 | 4/2004 | Schunder et al. |
| 2004/0090458 A1 | 5/2004 | Yu et al. |
| 2004/0093119 A1 | 5/2004 | Gunnarsson et al. |
| 2004/0102989 A1 | 5/2004 | Jang et al. |
| 2004/0111453 A1 | 6/2004 | Harris et al. |
| 2004/0143796 A1 | 7/2004 | Lerner et al. |
| 2004/0169873 A1 | 9/2004 | Nagarajan |
| 2004/0169889 A1 | 9/2004 | Sawada |
| 2004/0175033 A1 | 9/2004 | Matama |
| 2004/0181482 A1 | 9/2004 | Yap |
| 2004/0190019 A1 | 9/2004 | Li et al. |
| 2004/0261084 A1 | 12/2004 | Rosenbloom et al. |
| 2004/0263639 A1 | 12/2004 | Sadovsky et al. |
| 2005/0021360 A1 | 1/2005 | Miller et al. |
| 2005/0030602 A1 | 2/2005 | Gregson et al. |
| 2005/0046887 A1 | 3/2005 | Shibata et al. |
| 2005/0050060 A1 | 3/2005 | Damm et al. |
| 2005/0054342 A1 | 3/2005 | Otsuka |
| 2005/0060162 A1 | 3/2005 | Mohit et al. |
| 2005/0063585 A1 | 3/2005 | Matsuura |
| 2005/0065903 A1 | 3/2005 | Zhang et al. |

(56) References Cited

U.S. PATENT DOCUMENTS

| | | |
|---|---|---|
| 2005/0080844 A1 | 4/2005 | Dathathraya et al. |
| 2005/0100209 A1 | 5/2005 | Lewis et al. |
| 2005/0131780 A1 | 6/2005 | Princen |
| 2005/0134935 A1 | 6/2005 | Schmidtler et al. |
| 2005/0141777 A1 | 6/2005 | Kuwata |
| 2005/0151990 A1 | 7/2005 | Ishikawa et al. |
| 2005/0160065 A1 | 7/2005 | Seeman |
| 2005/0180628 A1 | 8/2005 | Curry et al. |
| 2005/0193325 A1 | 9/2005 | Epstein |
| 2005/0204058 A1 | 9/2005 | Philbrick et al. |
| 2005/0216426 A1 | 9/2005 | Weston et al. |
| 2005/0228591 A1 | 10/2005 | Hur et al. |
| 2005/0234955 A1 | 10/2005 | Zeng et al. |
| 2005/0246262 A1 | 11/2005 | Aggarwal et al. |
| 2005/0265618 A1 | 12/2005 | Jebara |
| 2005/0271265 A1 | 12/2005 | Wang et al. |
| 2006/0023271 A1 | 2/2006 | Boay et al. |
| 2006/0031344 A1 | 2/2006 | Mishima et al. |
| 2006/0048046 A1 | 3/2006 | Joshi et al. |
| 2006/0074821 A1 | 4/2006 | Cristianini |
| 2006/0089907 A1 | 4/2006 | Kohlmaier et al. |
| 2006/0093208 A1 | 5/2006 | Li et al. |
| 2006/0095373 A1 | 5/2006 | Venkatasubramanian et al. |
| 2006/0095374 A1 | 5/2006 | Lo et al. |
| 2006/0098899 A1 | 5/2006 | King et al. |
| 2006/0112340 A1 | 5/2006 | Mohr et al. |
| 2006/0114488 A1 | 6/2006 | Motamed |
| 2006/0115153 A1 | 6/2006 | Bhattacharjya |
| 2006/0120609 A1 | 6/2006 | Ivanov et al. |
| 2006/0159364 A1 | 7/2006 | Poon et al. |
| 2006/0161646 A1 | 7/2006 | Chene et al. |
| 2006/0195491 A1 | 8/2006 | Nieland et al. |
| 2006/0206628 A1 | 9/2006 | Erez |
| 2006/0212413 A1 | 9/2006 | Rujan et al. |
| 2006/0215231 A1 | 9/2006 | Borrey et al. |
| 2006/0219773 A1 | 10/2006 | Richardson |
| 2006/0222239 A1 | 10/2006 | Bargeron et al. |
| 2006/0235732 A1 | 10/2006 | Miller et al. |
| 2006/0235812 A1 | 10/2006 | Rifkin et al. |
| 2006/0236304 A1 | 10/2006 | Luo et al. |
| 2006/0242180 A1 | 10/2006 | Graf et al. |
| 2006/0256392 A1 | 11/2006 | Van Hoof et al. |
| 2006/0263134 A1 | 11/2006 | Beppu |
| 2006/0265640 A1 | 11/2006 | Albornoz et al. |
| 2006/0268356 A1 | 11/2006 | Shih et al. |
| 2006/0268369 A1 | 11/2006 | Kuo |
| 2006/0279798 A1 | 12/2006 | Rudolph et al. |
| 2006/0282442 A1 | 12/2006 | Lennon et al. |
| 2006/0282463 A1 | 12/2006 | Rudolph et al. |
| 2006/0282762 A1 | 12/2006 | Diamond et al. |
| 2006/0288015 A1 | 12/2006 | Schirripa et al. |
| 2007/0002348 A1 | 1/2007 | Hagiwara |
| 2007/0003155 A1 | 1/2007 | Miller et al. |
| 2007/0005341 A1 | 1/2007 | Burges et al. |
| 2007/0016848 A1 | 1/2007 | Rosenoff et al. |
| 2007/0030540 A1 | 2/2007 | Cheng et al. |
| 2007/0035780 A1 | 2/2007 | Kanno |
| 2007/0046957 A1 | 3/2007 | Jacobs et al. |
| 2007/0046982 A1 | 3/2007 | Hull et al. |
| 2007/0047782 A1 | 3/2007 | Hull et al. |
| 2007/0065033 A1 | 3/2007 | Hernandez et al. |
| 2007/0086667 A1 | 4/2007 | Dai et al. |
| 2007/0109590 A1 | 5/2007 | Hagiwara |
| 2007/0118794 A1 | 5/2007 | Hollander et al. |
| 2007/0128899 A1 | 6/2007 | Mayer |
| 2007/0133862 A1 | 6/2007 | Gold et al. |
| 2007/0165801 A1 | 7/2007 | Devolites et al. |
| 2007/0239642 A1 | 10/2007 | Sindhwani et al. |
| 2007/0250416 A1 | 10/2007 | Beach et al. |
| 2007/0252907 A1 | 11/2007 | Hsu |
| 2007/0260588 A1 | 11/2007 | Biazetti et al. |
| 2008/0005678 A1 | 1/2008 | Buttner et al. |
| 2008/0082352 A1 | 4/2008 | Schmidtler et al. |
| 2008/0086432 A1 | 4/2008 | Schmidtler et al. |
| 2008/0086433 A1 | 4/2008 | Schmidtler et al. |
| 2008/0097936 A1 | 4/2008 | Schmidtler et al. |
| 2008/0130992 A1 | 6/2008 | Fujii |
| 2008/0133388 A1 | 6/2008 | Alekseev et al. |
| 2008/0137971 A1 | 6/2008 | King et al. |
| 2008/0144881 A1 | 6/2008 | Fortune et al. |
| 2008/0147561 A1 | 6/2008 | Euchner et al. |
| 2008/0175476 A1 | 7/2008 | Ohk et al. |
| 2008/0177643 A1 | 7/2008 | Matthews et al. |
| 2008/0183576 A1 | 7/2008 | Kim et al. |
| 2008/0212115 A1 | 9/2008 | Konishi |
| 2008/0215489 A1 | 9/2008 | Lawson et al. |
| 2008/0219543 A1 | 9/2008 | Csulits et al. |
| 2008/0235766 A1 | 9/2008 | Wallos et al. |
| 2008/0253647 A1 | 10/2008 | Cho et al. |
| 2008/0294737 A1 | 11/2008 | Kim |
| 2009/0015687 A1 | 1/2009 | Shinkai et al. |
| 2009/0089078 A1 | 4/2009 | Bursey |
| 2009/0175537 A1 | 7/2009 | Tribelhorn et al. |
| 2009/0214112 A1 | 8/2009 | Borrey et al. |
| 2009/0228499 A1 | 9/2009 | Schmidtler et al. |
| 2010/0060910 A1 | 3/2010 | Fechter |
| 2010/0060915 A1 | 3/2010 | Suzuki et al. |
| 2010/0169250 A1 | 7/2010 | Schmidtler et al. |
| 2010/0202698 A1 | 8/2010 | Schmidtler et al. |
| 2010/0202701 A1 | 8/2010 | Basri et al. |
| 2010/0232706 A1 | 9/2010 | Forutanpour |
| 2010/0280859 A1 | 11/2010 | Frederick, II et al. |
| 2011/0013039 A1 | 1/2011 | Aisaka et al. |
| 2011/0116716 A1 | 5/2011 | Kwon et al. |
| 2011/0145178 A1 | 6/2011 | Schmidtler et al. |
| 2011/0196870 A1 | 8/2011 | Schmidtler et al. |
| 2011/0246076 A1 | 10/2011 | Su et al. |
| 2011/0249905 A1 | 10/2011 | Singh et al. |
| 2012/0114249 A1 | 5/2012 | Conwell |
| 2012/0116957 A1 | 5/2012 | Zanzot et al. |
| 2012/0162527 A1 | 6/2012 | Baker |
| 2012/0194692 A1 | 8/2012 | Mers et al. |
| 2012/0272192 A1 | 10/2012 | Grossman et al. |
| 2012/0284122 A1 | 11/2012 | Brandis |
| 2013/0022231 A1 | 1/2013 | Nepomniachtchi et al. |
| 2013/0060596 A1 | 3/2013 | Gu et al. |
| 2013/0073459 A1 | 3/2013 | Zacarias et al. |
| 2013/0088757 A1 | 4/2013 | Schmidtler et al. |
| 2013/0090969 A1 | 4/2013 | Rivere |
| 2013/0117175 A1 | 5/2013 | Hanson |
| 2013/0121610 A1 | 5/2013 | Chen et al. |
| 2013/0124414 A1 | 5/2013 | Roach et al. |
| 2013/0152176 A1 | 6/2013 | Courtney et al. |
| 2013/0182002 A1 | 7/2013 | Macciola et al. |
| 2013/0182128 A1 | 7/2013 | Amtrup et al. |
| 2013/0182292 A1 | 7/2013 | Thrasher et al. |
| 2013/0182951 A1 | 7/2013 | Shustorovich et al. |
| 2013/0182959 A1 | 7/2013 | Thrasher et al. |
| 2013/0182970 A1 | 7/2013 | Shustorovich et al. |
| 2013/0182973 A1 | 7/2013 | Macciola et al. |
| 2013/0185618 A1 | 7/2013 | Macciola et al. |
| 2013/0230246 A1 | 9/2013 | Nuggehalli |
| 2013/0268378 A1 | 10/2013 | Yovin |
| 2013/0268430 A1 | 10/2013 | Lopez et al. |
| 2013/0287265 A1 | 10/2013 | Nepomniachtchi et al. |
| 2013/0287284 A1 | 10/2013 | Nepomniachtchi et al. |
| 2013/0297353 A1 | 11/2013 | Strange et al. |
| 2013/0308832 A1 | 11/2013 | Schmidtler et al. |
| 2014/0006129 A1 | 1/2014 | Heath |
| 2014/0006198 A1 | 1/2014 | Daly et al. |
| 2014/0012754 A1 | 1/2014 | Hanson et al. |
| 2014/0079294 A1 | 3/2014 | Amtrup et al. |
| 2014/0108456 A1 | 4/2014 | Ramachandrula et al. |
| 2014/0153787 A1 | 6/2014 | Schmidtler et al. |
| 2014/0153830 A1 | 6/2014 | Amtrup et al. |
| 2014/0164914 A1 | 6/2014 | Schmidtler et al. |
| 2014/0201612 A1 | 7/2014 | Buttner et al. |
| 2014/0207717 A1 | 7/2014 | Schmidtler et al. |
| 2014/0233068 A1 | 8/2014 | Borrey et al. |

(56) References Cited

U.S. PATENT DOCUMENTS

| | | | |
|---|---|---|---|
| 2014/0254887 A1 | 9/2014 | Amtrup et al. | |
| 2014/0270349 A1 | 9/2014 | Amtrup et al. | |
| 2014/0270536 A1 | 9/2014 | Amtrup et al. | |

FOREIGN PATENT DOCUMENTS

| | | | |
|---|---|---|---|
| EP | 0936804 A2 | 8/1999 | |
| EP | 1128659 A1 | 8/2001 | |
| EP | 1317133 A1 | 6/2003 | |
| EP | 1422920 A2 | 5/2004 | |
| EP | 1956518 A1 | 8/2008 | |
| EP | 1959363 A2 | 8/2008 | |
| EP | 1976259 A1 | 10/2008 | |
| JP | 9116720 | 5/1997 | |
| JP | 09062826 A | 7/1997 | |
| JP | 2000067065 A | 3/2000 | |
| JP | 2000103628 A | 4/2000 | |
| JP | 2000354144 A | 12/2000 | |
| JP | 2001309128 A | 11/2001 | |
| JP | 2002024258 A | 1/2002 | |
| JP | 2002519766 A | 7/2002 | |
| JP | 2002312385 A | 10/2002 | |
| JP | 2003091521 A | 3/2003 | |
| JP | 2003196357 A | 7/2003 | |
| JP | 2003234888 A | 8/2003 | |
| JP | 2003303315 A | 10/2003 | |
| JP | 2005018678 | 1/2005 | |
| JP | 2005173730 A | 6/2005 | |
| JP | 2006209588 A | 8/2006 | |
| JP | 2008134683 A | 6/2008 | |
| TW | 401553 | 8/2000 | |
| WO | 9604749 | 2/1996 | |
| WO | 9847098 A1 | 10/1998 | |
| WO | 9967731 A1 | 12/1999 | |
| WO | 02063812 | 8/2002 | |
| WO | 2004053630 A2 | 6/2004 | |
| WO | 2006104627 A1 | 10/2006 | |
| WO | 2008008142 A2 | 1/2008 | |
| WO | 2010030056 | 3/2010 | |

OTHER PUBLICATIONS

"The American Heritage College Dictionary; Fourth Edition," Definition of "relationship," 2004.

Advisory Action from U.S. Appl. No. 11/752,691, dated Dec. 24, 2013.

Allwein et al., "Reducing Multiclass to Binary: A Unifying Approach for Margin Classifiers," Journal of Machine Learning Research vol. 1, 2000, pp. 113-141.

Angulo et al., "A multi-class Support Vector Machine," ECML, Barcelona, Spain, 2000, pp. 34-35.

Ayat et al., "Empirical Error based Optimization of SVM Kernels: Application to Digit Image Recognition," Proceedings of the Eighth International Workshop on Frontiers in Handwriting Recognition, IEEE, 2002, pp. 1-6.

Bennett et al., "A Support Vector Machine Approach to Decision Trees," IEEE, 1998, pp. 2396-2401.

Bishop, C.M., "Neural Networks for Pattern Recognition," Oxford University Press, Inc., p. 27.

Bishop, C.M., "Neural Networks for Pattern Recognition," Oxford University Press, Inc., pp. 230-247.

Bishop, C.M., "Neural Networks for Pattern Recognition," Oxford University Press, Inc., pp. 295-300.

Bishop, C.M., "Neural Networks for Pattern Recognition," Oxford University Press, Inc., pp. 343-345.

Bishop, C.M., "Neural Networks for Pattern Recognition," Oxford University Press, Inc., pp. 77-85.

Brauer et al., "Robust recognition of complex entities in text exploiting enterprise data and NLP-techniques," 2008 IEEE, Third International Conference on Digital Information Management, Nov. 13, 2008, pp. 551-558.

Bredensteiner et al., "Multicategory Classification by Support Vector Machines," Computational Optimization and Aoolications, 1999, pp. 1-30.

Campbell et al., "Machine Learning Strategies for Complex Tasks," Proceedings of First IEEE-RAS International Conference on Humanoid Robots, Springer Verlag, Cambridge, 2000, pp. 1-13.

Chen et al., "Learning with Progressive Transductive Support Vector Machine," Pattern Recognition Letters, vol. 24, 2003, pp. 1845-1855.

Collins-Thompson et al., "A Clustering-Based Algorithm for Automatic Document Separation," ACM Special Interest Group in Information Retrieval SIGIR, 2002, 6 pages.

Cover et al., "Elements of Information Theory, Second Edition," A Johnson Wiley & Sons, Inc. Publication, Jul. 2006, 774 pages.

Cristianini et al., "An Introduction to Support Vector Machines and Other Kernel-Based Learning Methods," pp. 8-11, 26-41, 92-101, 124-129, 2000.

Davy et al., "Improved Optimization of Time-Frequency-Based Signal Classifiers," IEEE Signal Processing Letters, vol. 8, No. 2, Feb. 2001, pp. 52-57.

Decision on Rejection from Chinese Application No. 200780001197.9 issued Mar. 22, 2013.

Decision on Rejection Translation from Japanese Application No. 2005-508441, dated Sep. 14, 2010.

Dietterich et al., "Solving Multiclass Learning Problems via Error-Correcting Output Codes," Journal of Artificial Intelligence Research 2, 1995, pp. 263-286.

Domingos, "MetaCost: A General Method for Making Classifiers Cost-Sensitive," Fifth International Conferences on Knowledge Discovery and Data Mining, Portugal, 1999, pp. 155-164.

Drucker et al., "Support Vector Machines for Spam Categorization," IEEE Transactions on Neural Networks, vol. 10. No. 5. Sep. 1999, pp. 1048-1054.

Duda et al., "Use of the Hough Transformation to Detect Lines and Curves in Pictures," Graphics and Image Processing, Communications of the ACM, vol. 15, No. 1, Jan. 1972, pp. 11-15.

Dumais et al., "Inductive Learning Algorithms and Representations for Text Categorization," In Proceedings of the ACM-CIKM98, Nov. 1998, pp. 148-155.

European Decision to Grant from European Application No. 04250855.6. dated Dec. 4, 2008.

European Office Communication and Exam Report from European Application No. 09770507.3, dated Dec. 3, 2013.

European Office Communication and Exam Report from European Application No. 10741580.4, dated Jan. 6, 2014.

European Office Communication and Extended European Search Report from European Application No. 09770507.3, dated Oct. 26, 2011.

European Office Communication and Supplementary Partial Search Report from European Application No. 03768631.8, dated Feb. 9, 2007.

European Office Communication from European Application No. 03768631.8, dated Apr. 2, 2009.

European Office Communication from European Application No. 03768631.8, dated Apr. 10, 2008.

European Office Communication from European Application No. 03768631.8, dated Jun. 25, 2007.

European Office Communication from European Application No. 04250855.6, dated Jan. 17, 2007.

European Office Communication from European Application No. 04250855.6, dated May 23, 2007.

European Office Communication from European Application No. 04250855.6, dated Nov. 6, 2007.

European Office Communication from European Application No. 06721118.5, dated Jul. 22, 2009.

European Supplementary European Search Report from European Application No. 10741580.4, dated Sep. 26, 2012.

Examiner's Answer to Appeal Brief from U.S. Appl. No. 10/742,131, dated Feb. 18, 2011.

Examiner's Answer to Appeal Brief from U.S. Appl. No. 11/329,999, dated Jan. 6, 2011.

Examiner's Answer to Appeal Brief from U.S. Appl. No. 11/329,999, dated Oct. 17, 2013.

(56) References Cited

OTHER PUBLICATIONS

Examiner's Answer to Appeal Brief from U.S. Appl. No. 12/163,822, dated Aug. 3, 2012.
Examiner's Answer to Appeal Brief from U.S. Appl. No. 12/206,594, dated Jul. 26, 2012.
Examiner's Answer to Appeal Brief from U.S. Appl. No. 12/206,594, dated Mar. 16, 2012.
Final Office Action from U.S. Appl. No. 10/412,163, dated Feb. 27, 2007.
Final Office Action from U.S. Appl. No. 10/742,131, dated Apr. 14, 2009.
Final Office Action from U.S. Appl. No. 10/742,131, dated Jun. 10, 2010.
Final Office Action from U.S. Appl. No. 11/329,999, dated Jun. 21, 2010.
Final Office Action from U.S. Appl. No. 11/752,673, dated Jun. 3, 2010.
Final Office Action from U.S. Appl. No. 11/752,691, dated Sep. 3, 2010.
Final Office Action from U.S. Appl. No. 11/752,691, dated Sep. 12, 2013.
Final Office Action from U.S. Appl. No. 11/752,719, dated May 28, 2010.
Final Office Action from U.S. Appl. No. 12/163,822, dated Dec. 15, 2011.
Final Office Action from U.S. Appl. No. 12/206,594, dated May 27, 2011.
Final Office Action from U.S. Appl. No. 12/331,875, dated Jun. 19, 2012.
Final Office Action from U.S. Appl. No. 13/090,216, dated Aug. 30, 2013.
Final Office Action from U.S. Appl. No. 13/898,407, dated Jan. 13, 2014.
Fragoudis et al., "Integrating Feature and Instance Selection for Text Classification," SIGKDD'02, ACM, Jul. 2002, pp. 501-506.
Gllavata, et al., "Finding Text in Images via Local Thresholding," International Symposium on Signal Processing and Information Technology, Dec. 2003, pp. 539-542.
Guermeur et al., "A new multi-class SVM based on a uniform convergence result," IJCNN, Como, Italy, 2000, 6 pages.
Guo et al., "Face recognition by Support Vector Machines," Proc. of the International Conferences on Automatic Face and Gesture Recognition, 2000, pp. 196-201.
Hearst et al., "Trends and Controversies—Support Vector Machines," IEEE Intelligent Systems, vol. 13 No. 4, 1998, pp. 18-28.
Hersh et al., "OHSUMED: An Interactive Retrieval Evaluation and New Large Test Collection for Research," In SIGIR'94, Springer London, Jan. 1994, pp. 192-201.
Hsu et al., "A Comparison of Methods for Multi-class Support Vector Machines," Journal of Artificial Societies & Social Simulation vol. 4, No. 2, 2000, 26 pages.
IBM, "Morphological Techniques for Determining Bounding Rectangles and Octagons,"Technical Disclosure Bulletin, TDB-ACC-No. NB9306177, vol. 1, Issue 6B, Jun. 1, 1993, pp. 177-182.
International Preliminary Exam Report from PCT Application No. PCT/US06/07150, dated Dec. 3, 2007.
International Preliminary Exam Report from PCT Application No. PCT/US06/07150, dated Feb. 4, 2011.
International Preliminary Report on Patentability from PCT Application No. PCT/US2007/013484, dated Jan. 22, 2009.
International Search Report and Written Opinion from PCT Application No. PCT/US07/013484, dated Oct. 1, 2008.
International Search Report and Written Opinion from PCT Application No. PCT/US09/02621, dated Jun. 12, 2009.
International Search Report and Written Opinion from PCT Application No. PCT/US10/023224, dated Apr. 5, 2010.
International Search Report and Written Opinion from PCT Application No. PCT/US14/26569, dated Aug. 12, 2014.
International Search Report and Written Opinion from PCT Application No. PCT/US2006/007150, dated Jun. 30, 2006.
International Search Report and Written Opinion from PCT Application No. PCT/US2010/023224, dated Aug. 25, 2011.
International Search Report and Written Opinion from PCT Application No. PCT/US2013/021336, dated Jan. 12, 2013.
International Search Report from European Application No. 03768631.8, dated Mar. 26, 2007.
International Search Report from International Application No. PCT/US03/35117, dated Aug. 26, 2005.
International Search Report from PCT Application No. PCT/US03/35117, dated Aug. 26, 2009.
International Search Report from PCT Application No. PCT/US2006/007150, dated Apr. 7, 2006.
International Written Opinion from PCT Application No. PCT/US2006/007150, dated Jul. 4, 2006.
INTSIG Information Co.. Ltd., "CamScanner," www.intsig.com/en/camscanner.html, retrieved Oct. 25, 2012.
INTSIG Information Co., Ltd., "Product Descriptions," www.intsig.com/en/product.html, retrieved Oct. 25, 2012.
Jaakkola et al., "Maximum entropy discrimination," MIT Lab, 1999, pp. 1-26.
Jebara et al., "Feature Selection and Dualities in Maximum Entropy Discrimination," 16th Conference on Uncertainty in Artificial intelligence, UAI 2000, Jul. 2000, pp. 1-10.
Jebara, T. "Discriminative, Generative and Imitative Learning," Doctoral Thesis, School of Architecture and Planning, Massachusetts Institute of Technology, Feb. 2002, pp. 1-212.
Joachims, "Estimating the generalization performance of a SVM efficiently," Proceedings of ICML-00, 17th International Conference on Machine Learning, Morgan Kaufmann Publishers, San Francisco, US, 2000, pp. 431-438.
Joachims, "Making Large Scale SVM Learning Practical" Advances in Kernel Methods-Support Vector Learning, MIT Press, Jun. 1998, pp. 1-13.
Joachims, "Text Categorization with Support Vector Machines: Learning with Many Relevant Features," 1997, pp. 1-14.
Joachims, T., "Transductive Inference for Text Classification using Support Vector Machines," ICML, vol. 99, 1999, pp. 1-10.
Joachims, T., "Transductive Learning via Spectral Graph Partitioning," Proceedings of the Twentieth International Conference on Machine Learning (ICML-2003), Washington DC, 2003, pp. 1-8.
Keerthi et al., "Improvements to Platt's SMO Algorithm for SVM Classifier Design," 2001 Massachusetts Institute of Technology, Neural Computation, vol. 13, pp. 637-649.
Kindermann et al., "Error Correcting Codes with Optimized Kullback-Leibler Distances for Text Categorization," PKDD 2001, Springer-Verlag, pp. 266-276.
Kolcz et al., "Summarization as Feature Selection for Text Categorization," CIKM'01, Nov. 2001, pp. 365-370.
Krinsky, "The Supreme Court, Stare Decisis, and the Role of Judicial Deference in Patent Claim Construction Appeals," bepress Legal Series, paper 1206, 2006, pp. 1-34.
Lai, "Conversational News Agent" Thesis, The University of New South Wales, Nov. 2002, pp. 1-95.
Lee et al., "Multicategory Support Vector Machines, Theory, and Application to the Classification of Microarray Data and Satellite Radiance Data," Technical report No. 1064, University of Wisconsin, Sep. 2002, pp. 1-36.
Liu et al., "Boosting to Correct Inductive Bias in Text Classification," CIKM'02, ACM, Nov. 4-9, 2002, pp. 348-355.
Matalas et al., "An Edge Detection Technique Using the Facet Model and Parameterize Relaxation Labeling," IEEE Transactions Pattern Analysis and Machine Intelligence vol. 19 Issue 4, Apr. 1997, pp. 328-341.
Matsuyama, "Expert Systems for Image Processing: Knowledge-based Composition of Image Analysis Processes," Computer Vision, Graphics, and Image Processing, vol. 48, Issue 1, Oct. 1989, pp. 22-49, Abstract Only.
Mayoraz et al., "Support Vector Machines for Multi-class Classification," IDIAP Research Report 98-06, May 1998, pp. 1-7.
Mohri, M., "Finite-State Transducers in Language and Speech Processing," Association for Computational Linguistics, vol. 23. 1997, pp. 1-42.

(56) References Cited

OTHER PUBLICATIONS

Moreira et al., "Improved Pairwise Coupling Classification with Correcting Classifiers," IDIAP-Research Report 97-09, Oct. 1997, pp. 1-11.

Morik et al., "Combining statistical learning with a knowledge-based approach—A case study in intensive care monitoring," In Proceedings of the International Conference on Machine Learning, 1999, pp. 268-277.

Nazif et al., "Low Level Image Segmentation: An Expert System," IEEE Transactions on Pattern Analysis and Machine Intelligence, vol. PAMI-6, Issue 5, Sep. 1984, pp. 555-577, Abstract Only.

Nigam, K.P., "Using Unlabeled Data to Improve Text Classification," Doctoral Thesis, Carnegie Mellon University, 2001, pp. 1-128.

Non-Final Office Action from U.S. Appl. No. 10/412,163, dated Aug. 29, 2006

Non-Final Office Action from U.S. Appl. No. 10/412,163, dated Oct. 25, 2007.

Non-Final Office Action from U.S. Appl. No. 10/742,131, dated Mar. 27, 2008.

Non-Final Office Action from U.S. Appl. No. 10/742,131, dated Nov. 27, 2009

Non-Final Office Action from U.S. Appl. No. 10/742,131, dated Oct. 15, 2008.

Non-Final Office Action from U.S. Appl. No. 11/329,753, dated Apr. 30, 2008.

Non-Final Office Action from U.S. Appl. No. 11/329,753, dated Nov. 5, 2008.

Non-Final Office Action from U.S. Appl. No. 11/329,753, dated Sep. 12, 2007.

Non-Final Office Action from U.S. Appl. No. 11/329,999, dated Feb. 3, 2010.

Non-Final Office Action from U.S. Appl. No. 11/329,999, dated Jul. 20, 2009.

Non-Final Office Action from U.S. Appl. No. 11/329,999, dated Oct. 27, 2009.

Non-Final Office Action from U.S. Appl. No. 11/752,673, dated Dec. 31, 2009.

Non-Final Office Action from U.S. Appl. No. 11/752,691, dated Apr. 25, 2013.

Non-Final Office Action from U.S. Appl. No. 11/752,691, dated Feb. 24, 2010.

Non-Final Office Action from U.S. Appl. No. 11/752,691, dated Jul. 13, 2011.

Non-Final Office Action from U.S. Appl. No. 11/752,719, dated Nov. 30, 2009.

Non-Final Office Action from U.S. Appl. No. 12/163,822, dated May 26, 2011

Non-Final Office Action from U.S. Appl. No. 12/206,594, dated Dec. 10, 2010.

Non-Final Office Action from U.S. Appl. No. 12/331,875, dated Apr. 9, 2013.

Non-Final Office Action from U.S. Appl. No. 12/331,875, dated Dec. 22, 2011

Non-Final Office Action from U.S. Appl. No. 12/368,685, dated Mar. 29, 2012.

Non-Final Office Action from U.S. Appl. No. 12/435,277, dated Apr. 15, 2011.

Non-Final Office Action from U.S. Appl. No. 12/435,277, dated Nov. 15, 2010.

Non-Final Office Action from U.S. Appl. No. 12/436,854, dated Jun. 8, 2012

Non-Final Office Action from U.S. Appl. No. 12/721,393, dated Mar. 30, 2012.

Non-Final Office Action from U.S. Appl. No. 13/033,536, dated Dec. 27, 2011.

Non-Final Office Action from U.S. Appl. No. 13/090,216, dated Apr. 26, 2013

Non-Final Office Action from U.S. Appl. No. 13/090,216, dated Aug. 23, 2012.

Non-Final Office Action from U.S. Appl. No. 13/544,830, dated Jan. 14, 2013.

Non-Final Office Action from U.S. Appl. No. 13/691,610, dated Mar. 1, 2013

Non-Final Office Action from U.S. Appl. No. 13/898,407, dated Aug. 1, 2013.

Non-Final Office Action from U.S. Appl. No. 13/948,046, dated Dec. 6, 2013.

Non-Final Office Action from U.S. Appl. No. 14/078,402, dated Jan. 30, 2014

Non-Final Office Action from U.S. Appl. No. 14/175,999, dated Apr. 3, 2014.

Non-Final Office Action from U.S. Appl. No. 14/176,006, dated Apr. 7, 2014.

Non-Final Office Action from U.S. Appl. No. 14/220,016, dated May 22, 2014.

Non-Final Office Action from U.S. Appl. No, 14/220,023, dated May 5, 2014.

Non-Final Office Action from U.S. Appl. No. 14/220,029, dated May 14, 2014.

Non-Final Office Action from U.S. Appl. No. 14/268,876, dated Jul. 24, 2014.

Notice of Allowance from Japanese Application No. 2004-047112, dated Apr. 10, 2009

Notice of Allowance from Japanese Application No. 2008-503002, dated Apr. 24, 2012.

Notice of Allowance from Japanese Application No. 2011-549266, dated Dec. 18, 2013.

Notice of Allowance from Japanese Application No. No. 2001-377498, dated Jul. 28, 2009.

Notice of Allowance from Taiwanese Application No. 096118505, dated Nov. 9, 2012

Notice of Allowance from U.S. Appl. No. 10/412,163, dated Mar. 25, 2008.

Notice of Allowance from U.S. Appl. No. 10/742,131, dated Nov. 15, 2013.

Notice of Allowance from U.S. Appl. No. 11/329,753, dated Mar. 13, 2009

Notice of Allowance from U.S. Appl. No. 11/329,999, dated Jan. 31, 2014.

Notice of Allowance from U.S. Appl. No. 11/752,634, dated Dec. 31, 2009.

Notice of Allowance from U.S. Appl. No. 11/752,673, dated Jan. 24, 2011.

Notice of Allowance from U.S. Appl. No. 11/752,719, dated Dec. 28, 2010.

Notice of Allowance from U.S. Appl. No. 11/805,857, dated Sep. 10, 2008.

Notice of Allowance from U.S. Appl. No. 12/050,096, dated Mar. 24, 2009.

Notice of Allowance from U.S. Appl. No. 12/102,419, dated Apr. 9, 2012

Notice of Allowance from U.S. Appl. No. 12/331,875, dated Oct. 25, 2013.

Notice of Allowance from U.S. Appl. No. 12/368,685, dated Aug. 30, 2012.

Notice of Allowance from U.S. Appl. No. 12/435,277, dated Oct. 13, 2011.

Notice of Allowance from U.S. Appl. No. 12/436,854, dated Oct. 19, 2012.

Notice of Allowance from U.S. Appl. No. 12/721,393, dated Oct. 10, 2012.

Notice of Allowance from U.S. Appl. No. 13/033,536, dated Apr. 13, 2012.

Notice of Allowance from U.S. Appl. No. 13/080,163, dated May 1, 2013.

Notice of Allowance from U.S. Appl. No. 13/090,216, dated Dec. 24, 2013.

Notice of Allowance from U.S. Appl. No. 13/544,830, dated Apr. 26, 2013.

Notice of Allowance from U.S. Appl. No. 13/691,610, dated Jun. 24, 2013.

(56) References Cited

OTHER PUBLICATIONS

Notice of Allowance from U.S. Appl. No. 13/740,123, dated Jul. 10, 2014.
Notice of Allowance from U.S. Appl. No. 13/898,407, dated Apr. 23, 2014.
Notice of Allowance from U.S. Appl. No, 13/948,046, dated Jun. 2, 2014
Notice of Allowance from U.S. Appl. No. 14/078,402, dated Feb. 26, 2014.
Notice of Allowance from U.S. Appl. No. 14/175,999, dated Aug. 8, 2014.
Notice of Final Rejection from Japanese Application No. 2001-377498, dated Sep. 4, 2007.
Notice of Final Rejection Translation from Japanese Application No. 2008-503002, dated Dec. 27, 2011.
Notice of Ground of Rejection Translation from Japanese Application No. 2001-377498, dated Jul. 18, 2006.
Notice of Reasons for Rejection from Japanese Application No. 2009-519439, dated Sep. 7, 2012.
Notice of Reasons for Rejection Translation from Japanese Application No. 2004-047112, dated Dec. 22, 2008.
Notice of Reasons for Rejection Translation from Japanese Application No. 2005-508441, dated Jan. 19, 2010.
Notice of Reasons for Rejection Translation from Japanese Application No. 2008-503002, dated Oct. 21, 2009.
Notice of Reasons for Rejection Translation from Japanese Application No. 2008-503002, dated Sep. 30, 2010.
Notice of Reasons for Rejection Translation from Japanese Application No. 2011-549266, dated Sep. 4, 2013.
Office Action from Taiwanese Application No. 096118505, dated Sep. 7, 2011.
Office Action Summary from Chinese Application No. 200780001197.9, dated Jun. 9, 2010.
Office Action Summary from Chinese Application No. 200780001197.9, received Jul. 8, 2011.
Pan et al., "An Improved Constant-Time Algorithm for Computing the Radon and Hough Transforms on a Reconfigurable Mesh," IEEE Transactions on Systems, Man, and Cybernetics—Part A: Systems and Humans, vol. 29, No. 4, Jul. 1999, pp. 417-421.
Patent Board Decision on Appeal from U.S. Appl. No. 10/742,131, dated Aug. 27, 2013.
Pavel et al., "Efficient Algorithms for the Hough Transform on Arrays with Reconfigurable Optical Buses*," Department of Computing and Information Science, 1996, pp. 1-19.
Platt et al., "Large Margin DAGs for Multiclass Classification," Advances in Neural Information Processing Systems, vol. 12, 2000, pp. 547-553.
Platt, "Probabilistic outputs for Support Vector Machines and Comparisons to Regularized Likelihood Methods," Advances in Large Margin Classifiers, MIT Press, 1999, pp. 61-73.
Platt, J.C.. "Fast Training of Support Vector Machines Using Sequential Minimal Optimization," Advances in Kernel Methods—Support Vector Learning, 1999, pp. 41-65.
Platt, J.C., "Probabilistic Outputs for Support Vector Machines and Comparisons to Regularized Likelihood Methods," Advances in Large Margin Classifiers, MIT Press, Mar. 26, 1999, pp. 1-11.
Press et al., "Numerical Recipes in C++: The Art of Scientific Computing Second Edition," Cambridge University, 2002, pp. 413-417.
Price et al., "Pairwise Neural Network Classifiers with Probabilistic Outputs," Neural Infortnation Processing Systems, vol. 7, 1994, 8 pages.
Rainardi, V., "Building a Data Warehouse: With Examples in SQL Server," Chapter 15: Other Data Warehouse Usage, Apress, Dec. 27, 2007, pp. 471-474.
Rennie et al., "Improving Multiclass Text Classification with the Support Vector Machine," MIT Lab, Oct. 2001, pp. 1-14.
Replacement Examiner's Answer to Appeal Brief from U.S. Appl. No. 11/329,999, dated Jan. 31, 2011.
Requirement for Restriction from U.S. Appl. No. 14/177,136, dated Aug. 15, 2014.
Requirement for Restriction from U.S. Appl. No. 14/177,136, dated May 19, 2014.
Requirement for Restriction from U.S. Appl. No. 14/259,866, dated Jul. 11, 2014.
Richard et al., "Neural Network Classifiers Estimate Bayesian a-posteriori Probabilities," Neural Computation vol. 3 No, 4, 1991, pp. 461-483.
Russell et al., "Artificial Intelligence: A Modern Approach," Prentice-Hall, Inc., 1995, pp. 531-544.
Russell et al., "Artificial intelligence: A Modern Approach," Prentice-Hall, Inc., 1995, pp. 70-84.
Russell et al., "Artificial Intelligence: A Modern Approach—Second Edition," Pearson Education, Inc., 2003, pp. 749-752.
Scholkopf, B., "The Kernel Trick for Distances," Technical Report MSR-TR-2000-51, Microsoft Research, May 2000, pp. 1-9.
Schutz et al, "A Comparison of Classifiers and Document Representations for the Routing Problem," Xerox Palo Alto Research Center, 1995, 9 pages.
Shevade et al., "Improvements to Platt's SMO Algorithm for SVM Classifier Design," IEEE Transactions on Neural Networks, vol. 11, No. 5, Sep. 2000, pp. 1188-1193.
Shustorovich et al., "A Subspace Projection Approach to Feature Extraction: The Two-Dimensional Gabor Transform for Character Recognition," Neural Networks, vol. 7, Issue 8, 1994, pp. 1295-1301, Abstract Only.
Shustorovich et al., "Neural Network Positioning and Classification of Handwritten Characters," Neural Networks, vol. 9, Issue 4, Jun. 1996, pp. 685-693, Abstract Only.
Sollich, P., "Bayesian methods for Support Vector Machines: Evidence and Predictive Class Probabilities," Machine Learning, vol. 46, Jan. 2002, pp. 21-52.
Sollich, P., "Probabilistic methods for Support Vector Machines," MIT Press, 2000, 7 pages.
Souafi-Benasfi et al., "Bayesian Networks Classifiers applied to Documents," Proceedings of 16th International Conference on Pattern Recognition, vol. 1, Aug. 2002, pp. 483-486.
Szummer, "Learning From Partially Labeled Data," Doctorate Thesis, Chapter l and Chapter 4, Massachusetts Institute of Technology, Cambridge, MA (USA) Sep. 2002, pp. 1-81.
Thonnat et al., "An Expert System for the Automatic Classification and Description of Zooplanktons from Monocular Images," IEEE 9th International Conference on Pattern Recognition, Nov. 14-17, 1998, vol. 1, pp. 114-118, Abstract Only.
U.S. Appl. No. 13/802,226, filed Mar. 13, 2013.
U.S. Appl. No. 14/209,825, filed Mar. 13, 2014.
U.S. Appl. No. 14/225,298, filed Mar. 25, 2014
U.S. Appl. No. 14/266,671, filed Apr. 30, 2014.
U.S. Appl. No. 14/283,156, filed May 20, 2014.
U.S. Appl. No. 14/334,558, filed Jul. 17, 2014.
Vapnik, "The Nature of Statistical Learning Theory: Second Edition," Springer-Verlag New York, Inc., 2000, pp. 138-142.
Vapnik, V., "Statistics for Engineering and Information Science," Springer-Verlag New York, Inc., 2000, pp. 190-191.
Wang et al., "On Transductive Support Vector Machines," An American Mathematical Society, 2007, pp. 1-9.
Weston et al., "Support Vector Machines for Multi-Class Pattern Recognition," Proceedings of the Seventh European Symposium on Artificial Neural Networks, 1999, pp. 1-6.
Weston et al., "Multi-class Support Vector Machines," CSD-TR-98-04, Royal Holloway, University of London, Egham, UK, May 20, 1998, pp. 1-9.
Wikipedia. "Eight-point algorithm," downloaded from http://en.wikipedia.org/wiki/Eightpoint_algorithm, Last Modified on Apr. 18, 2014, pp. 1-7.
Zadrozny et al., "Transforming Classifier Scores into Accurate Multiclass Probability Estimates," Proceedings of the Eighth International Conference on Knowledge Discovery and Data Mining (KDD'02), 2002, pp. 694-699.
Zadrozny, B.. "Reducing Multiclass to Binary by Coupling Probability Estimates," Neural Information Processing Systems, 2001, pp. 1-8.

(56) References Cited

OTHER PUBLICATIONS

Zunino, et al., "Vector Quantization for License-Plate Location and Image Coding," IEEE Transactions on Industrial Electronics, vol. 47, Issue 1, Feb. 2000, pp. 159-167.
Bishop, C.M., "Neural Networks for Pattern Recognition," Oxford University Press, Inc., 1995, p. 27.
Bishop, C.M., "Neural Networks for Pattern Recognition," Oxford University Press, Inc., 1995, pp. 77-85.
Bishop, C.M., "Neural Networks for Pattern Recognition," Oxford University Press, Inc., 1995, pp. 230-247.
Bishop, C.M., "Neural Networks for Pattern Recognition," Oxford University Press, Inc., 1995, pp. 295-300.
Bishop, C.M., "Neural Networks for Pattern Recognition," Oxford University Press, Inc., 1995, pp. 343-345.
Final Office Action from U.S. Appl. No. 14/220,023, dated Sep. 18, 2014.
International Search Report and Written Opinion from PCT Application No. PCT/US14/35176, dated Sep. 18, 2014.
International Search Report and Written Opinion from PCT Application No. PCT/US14/26597, dated Sep. 19, 2014.
U.S. Appl. No. 14/491,901, filed Sep. 19, 2014.
Final Office Action from U.S. Appl. No. 14/220,029, dated Sep. 26, 2014.
Non-Final Office Action from U.S. Appl. No. 13/740,145, dated Sep. 29, 2014.
International Search Report and Written Opinion from PCT Application No. PCT/US14/36851, dated Sep. 25, 2014.
Notice of Allowance from U.S. Appl. No. 14/176,006, dated Oct. 1, 2014.
Non-Final Office Action from U.S. Appl. No. 11/752,691, dated Oct. 10, 2014.
Non-Final Office Action from U.S. Appl. No. 13/740,134, dated Oct. 10, 2014.
Non-Final Office Action from U.S. Appl. No. 14/259,866, dated Oct. 10, 2014.
International Search Report and Written Opinion from PCT Application No. PCT/US2014/036673, dated Aug. 28, 2014.
U.S. Appl. No. 14/473,950, filed Aug. 29, 2014.
Notice of Allowance from U.S. Appl. No. 13/740,139, dated Aug. 29, 2014.
Notice of Allowance from U.S. Appl. No. 14/268,876, dated Aug. 29, 2014.
Final Office Action from U.S. Appl. No. 14/176,006, dated Sep. 3, 2014.
Notice of Allowance from U.S. Appl. No. 14/334,558, dated Sep. 10, 2014.

SYSTEMS AND METHODS FOR PROCESSING VIDEO DATA

The present application is a continuation-in-part of U.S. patent application Ser. No. 13/898,407, filed May 20, 2013, which is a continuation of U.S. patent application Ser. No. 11/329,999, filed Jan. 11, 2006, now U.S. Pat. No. 8,749,839, which claims priority under 35 U.S.C. §119(e) from U.S. Provisional Application No. 60/665,067, filed Mar. 24, 2005, titled SYSTEMS AND METHODS FOR ENHANCING DIGITAL ACQUISITION DEVICES FOR ANALOG DATA IN LOCAL AS WELL AS REMOTE DEPLOYMENTS. This application is also a continuation-in-part of U.S. patent application Ser. No. 14/268,876, filed May 2, 2014, which claims priority to U.S. Provisional Patent Application No. 61/819,463, filed May 3, 2013. Each of the foregoing patents and patent applications are hereby expressly incorporated by reference, and priority is claimed thereto for the subject matter respectively disclosed therein.

BACKGROUND OF THE INVENTION

1. Field of the Invention

The present invention relates to systems and methods for improving the quality of data acquired by data acquisition devices. The user can be located locally or remotely from the data acquisition device.

2. Description of the Related Art

Data acquisition devices for analog data transform analog data to digital data. A typical example is a scanning device. It takes as input an image printed onto a sheet of paper and outputs a digital representation of the physical image. The quality obtained by the acquisition device depends strongly on using the device with settings that are suited for the specifics of the given analog data. For example, the scanner settings useful to achieve a high quality scanned image of a sunset are rather different from the settings used to scan a picture taken in the broad sunlight of a summer day. Finding better or optimal settings given the specifics of the analog data is a time consuming process that often makes it necessary to acquire the analog data more than once using different settings of the acquisition device. This becomes particularly unpractical and inefficient when the recipient of the digital data and the data acquisition device are at different locations.

The following example illustrates the inefficiency of the current technology. The recipient of a fax is unsatisfied with the quality of the received fax in order to obtain a better quality fax, the recipient has to, e.g. by using a phone, inform a person located at the origination of the fax end request to resend the fax with different settings.

Furthermore, given temporary analog data, the determination of improved acquisition settings using physical reacquisition of the analog data is either impossible or less feasible within a narrow time frame.

In current remote data acquisition applications, analog data are acquired digitally by using, for example, a scanning device or a digital copy machine. The digitalized data are then sent to a remote recipient via a network. Current methods of remote digital acquisition application do not provide the remote recipient of the acquired data with remote control of the data acquisition device.

SUMMARY OF THE INVENTION

Embodiments include methods of virtual acquisition of data for the purpose of quality enhancements. In an embodiment, virtual reacquisition for quality enhancement may be used for scanning devices, and other data acquisition devices, such as, for example, digital copiers, fax machines, multi-functional peripherals, infrared cameras, acoustic cameras, digital cameras, infrared cameras, acoustic cameras, digital cameras, mobile phones with built in digital cameras, and the like. Virtual reacquisition can be used with any analog or digital source including, for example, voice, acoustic measurements for monitoring devices, temperature, video, and the like.

The input stream of an acquisition device for analog data can be either discrete or continuous. In addition, the input stream can be a function of time or space. Regardless of these modalities, the resulting data are contained in an ordered set of discrete units. The order of the set contains the information of the time or space direction of the input stream. In case of a continuous input stream the acquisition device generates discrete units by subdividing the continuous input stream in bins. For example, the input to a video camera is continuous, and the resulting data are given by the ordered set of picture frames taken by the camera with each picture frame being an instance of the aforementioned discrete units. A batch of paper sheets fed into a scanning device is an example of discrete input stream, and the discrete data are defined by the paper sheets.

One embodiment is an efficient method and system for enhancing the digital data obtained by an acquisition device for analog data. The enhancements are obtained using virtual reacquisition of the analog data. The method of virtual reacquisition stores the raw data acquired by the acquisition device in a cache. The data processor accesses the raw data from the cache allowing the reprocessing of the raw data by the data processor without physically reacquiring the data by the acquisition device.

An embodiment stores as many of the incoming data units at the cache as possible, given the cache size. In certain embodiments, new storage for incoming data is created by deleting the data units that have resided at the cache the longest. In addition, or in other embodiments, data units are assigned priorities and data units with lower priorities are overwritten with new data units before data units with higher priorities.

An embodiment has the capability of virtually reacquiring the most current or more currently used data units acquired by the acquisition device. Alternatively, the user can, via a selection mechanism, virtually reacquire the raw data or subsections of the raw data stored at the cache. The method of virtual reacquisition renders unnecessary the time and labor consuming physical reacquisition of the analog data. Furthermore, in instances were physical reacquisition of the data is impossible, e.g. in the case of a time dependant input stream, the application of virtual reacquisition is especially valuable.

An additional application of virtual reacquisition is given when the acquisition rate of the acquisition device is too high for the output communication system and as default, compressed low resolution data are transferred. Using virtual reacquisition the recipient of the data can selectively access and reprocess the original high-resolution data despite the constraint given by the bandwidth of the transmission.

In addition, an embodiment of the method and system presented here utilizes virtual reacquisition to efficiently determine improved or optimal acquisition device settings. The improved of optimal settings can be found interactively in real time as well as in non-real time, automatically by the system itself, or using a combination thereof, depending on the specific embodiment. Furthermore, the method and system facilitates the control of digital acquisition devices by alerting the user automatically about potentially low quality digital data or changes in the input stream, that might be of interest to the user, by analyzing the data and comparing the results against some user defined thresholds. This feature is of value, for example, in deployments using or requiring the acquisition of large amounts of analog data.

In addition, the method of virtual reacquisition in combination with remote deployment, as presented in an embodiment, offers the potential of large efficiency gains in a large variety of business processes, e.g. security surveillance applications. For example, a building is monitored using a video system and owing to the available bandwidth, as low resolution data are transmitted to a central location. By analyzing the data, the system detects events that are potentially of interest for the person monitoring the system and triggers the transmission of high-resolution data to the user utilizing virtual reacquisition.

By transferring as default the processed data instead of the raw uncompressed data, the remote application of an embodiment makes efficient use of storage and of the network reducing or minimizing the hardware usage or requirements on storage as well as the network.

Furthermore, an embodiment of the method and system presented here allows multiple users to share the usage of one or multiple analog acquisition devices. Each user can process the same raw data with different setting of the data processor enabling each individual user to process the raw data according to his or her personal preferences and needs.

Finally, an embodiment of the method and system can be independently applied to subsections of the acquired discrete data units, i.e. the user can select subsections of the acquired data unit and process the selected subsections differently. For example, given a scanned image displaying an image and text, the user can subdivide the acquired data unit in two zones with one containing the image and the other text and can virtual reacquire the zones using settings most suited or better suited for the selected zone.

As mentioned above, an embodiment of the method and system presented here has the capability of determining improved or optimal processor settings automatically by deploying potentially one or more analytic engines. For example, a first analytic engine (engine 1) takes as input the raw data, whereas a second analytic engine (engine 2) uses the processed data as input. The second engine determines the quality of the processed data using a metric. It selects new processor settings either randomly or depending on the quality of the processed data as determined by the metric. The raw data are reprocessed using the new settings. This process continues until convergence, i.e. until the metric cannot detect any improvements in the quality of the processed data. The functions performed by the first analytic engine are, but are not limited to, page boundaries detection, background smoothing, bleed-through detection, color detection, and orientation detection, and the like.

Page boundaries detection is useful for efficient page skew correction. In an embodiment, the page boundaries detection detects the page against a variety of backgrounds and, thus, allows page skew correction and cropping for white background scanners as well as black background scanners.

An embodiment of a background smoothing method addresses the need or desire to reduce the number of colors within the backgrounds of an image to improve the appearance of the image as well as decrease the size of the image after compression. An embodiment of the method works as follows. Cluster all or a portion of the colors found in the image and select those that contain enough pixels to be considered backgrounds. These backgrounds are then merged, and all or a portion of the pixels within the image belonging to a background cluster are replaced by the average color within the cluster.

An embodiment of the bleed-through detection detects bleed through on otherwise blank sides of scanned documents in order to perform further image processing on these pages. An embodiment of this algorithm uses page boundary detection within front and back scanned images to approximately match side coordinates. Then, the algorithm uses existing color or gray content to fine-tune the mapping. This additional step is useful because of slightly different optics and skews of front and back cameras. If residual (unexplained) content fall below certain density criterion, the page is called blank.

In an embodiment, the color detection addresses the need or desire to detect the color content in a scanned image and the need or desire to distinguish between the foreground and background color. An embodiment of this algorithm provides a mechanism to eliminate the background color if it is a predominant color or the most predominant color in the document. An embodiment of this algorithm examines pixels in the scanned image and determines if they are a color pixel or a background pixel. This determination uses the saturation and luminance levels of the pixel.

In an embodiment, orientation detections determine automatically which way to orthogonally rotate a text page for viewing. An embodiment of the algorithm selects possible individual characters from connected components of black within the page and determines their individual orientations by a trained neural network. The algorithm uses the orientation results as votes to decide which orientation of the page is best or an improvement.

In an embodiment, virtual reacquisition is implemented as software and is independent from the acquisition device. The users of the acquisition device can interactively enhance the quality of the digital representation of the acquired analog data by changing the processor settings. The possible adjustments include, but are not limited to, brightness, contrast, gamma, erosion, orientation, segmentation, color rendering, saturation, resolution, warping angle, out of sequence detection, dilation, speckle removal, and skew angle. The embodiment is of value, for example, in connection with acquisition devices that, owing to their limited hardware capabilities, are generally incapable of producing consistently high quality digital data given, as input, a large variety of analog data. In these instances, the embodiment is a cost effective method to enhance the capabilities and usability of the acquisition device.

Furthermore, an embodiment allows the users of the acquisition device to acquire the digital data according to their individual preferences and requirements.

Another advantage, in an embodiment, is virtual reacquisition's dependence from the acquisition device. The algorithms employed by virtual reacquisition typically progress on a considerably faster pace than the improvements to the hardware of the acquisition devices. The user can easily take advantage of the algorithmic improvements by simply updating the virtual reacquisition software. This feature is of value, for example, for expensive high-end scanners by reducing or minimizing the scanners depreciation.

In a further embodiment, the embodiments described above are deployed remotely and, thus, offers the capabilities of virtual reacquisition to one or more remote recipients of the digital data. The implementation may be software, firmware, hardware, or any combination of software, firmware, or hardware.

An example of an embodiment is within the usage of fax server machines. The data are rendered in high definition analog form, stored at the data cache of the fax communication server, and the binary data, obtained by using default settings and attributes, are sent to their respective destinations. Through a call back protocol, implemented at the fax server machine, the recipient of the fax can select a specific image or a scaled area of an image from the images stored at the fax server and specify the processor settings and attributes for the selected image. The selected image or scaled area of the image is reprocessed according to the specified settings and transmitted to the recipient.

Image sets are stored in the cache at the fax server. When the cache is full or when the image is fully processed by the user, the images are either erased, replaced by the transmitted image, stored in a database, or any combination thereof. This embodiment enables the recipient of the fax to enhance the quality of the received fax directly on his desktop application, rendering obsolete the resending of the fax in case of insufficient image quality.

In addition, the above-mentioned call back protocol allows the recipient to alert the sender to irreversible potential problems such as, white pages. Finally, the sender does not have to guess improved or optimal settings while sending the tax.

In a further embodiment, virtual reacquisition is enhanced by an analytic engine that takes as input the raw data of the acquisition device. The analytic engine automatically determines improved or dose to optimal settings for the acquisition device. Additionally, it automatically monitors the quality of the digital data obtained by the acquisition device and alerts the user when the quality is below a predetermined threshold. The user can adjust the threshold to his or her preferences. In addition, the user can overwrite the acquisition device settings determined by the analytic engine and interactively adjust the settings manually when necessary or desired.

In an embodiment, the interactive adjustments can be one in non real-time, and thus, do not interrupt the flow of incoming data. This embodiment is of interest, for example, for deployments that use or require the acquisition of large amounts of analog data. It allows a heady automatic data acquisition and still ensures high quality of the resulting digital data. Typical examples are copier rooms or facilities that electronically archive large amounts of paper documents using scanning devices.

In an embodiment, virtual reacquisition enhanced by an analytic engine may be implemented as software, firmware, hardware, or any combination of software, firmware, or hardware. The hardware implementation offers advantages with regard to speed compared to the software implementation and allows handling high volumes of data fast and efficient.

In a further embodiment, the virtual reacquisition enhanced by the analytic engine is deployed remotely. Remotely deployed virtual reacquisition enhanced by an analytic engine may be implemented as software, firmware, hardware, or any combination of software, firmware, or hardware.

In a further embodiment, the virtual reacquisition is enhanced by a first and a second analytic engine. The second analytic engine analyzes the processed digital data obtained with specific data processor settings from the first analytic engine. Utilizing this information, the second analytic engine estimates a new set of data processor settings and the raw data are virtually reacquired using the new settings.

In an embodiment, this process is iterated until sufficiently improved settings or the optimal settings have been determined automatically. Virtual reacquisition enhanced by a first and a second analytic engine may be implemented as software firmware, hardware, or any combination of software, firmware, or hardware.

In a further embodiment, virtual reacquisition enhanced by a first and a second analytic engine is deployed remotely. Remotely deployed virtual reacquisition enhanced by a first and a second analytic engine may be implemented as software, firmware, hardware, or any combination of software, firmware, or hardware.

In an embodiment, a data processing system comprises raw or normalized data from a data capture device, where the raw or normalized data is stored in a computer accessible storage medium, and a first acquisition controller in communication with the raw or normalized data. The first acquisition controller is configured to analyze at least portions of the raw or normalized data to determine whether the raw or normalized data is within a first set of parameters. If the raw or normalized data is not within the first set of parameters, the first acquisition controller generates a first set of processor settings. The data processing system further comprises a processor in communication with the first acquisition controller, where the processor is configured to process the raw or normalized data with the first set of processor settings, and a second acquisition controller in communication with the processor. The second image acquisition controller is configured to analyze at least portions of the processed data to determine whether the processed data is within a second set of parameters. If the processed data is not within the second set of parameters, the second acquisition controller generates a second set of processor settings that the processor uses to reprocess the raw or normalized data.

In another embodiment, a data processing method comprises storing raw or normalized data from a data capture device in a computer accessible storage medium, and analyzing at least portions of the raw or normalized data with a first analytic engine to determine whether the raw or normalized data is within a first set of parameters. If the raw or normalized data is not within the first set of parameters, the method comprises generating with the first analytic engine a first set of processor settings, processing the raw or normalized data with the first set of processor settings, and analyzing at least portions of the processed data with a second analytic engine to determine whether the processed data is within a second set of parameters. If the processed data is not within the second set of parameters, the method further comprises generating with the second analytic engine a second set of processor settings to reprocess the raw or normalized data.

In yet another embodiment, a data processing system comprises a storing means for storing raw data from a data capture device, a first analyzing means in communication with the raw data for analyzing at least portions of the raw data to determine whether the raw data is within a first set of parameters, and if not, the first analyzing means generates a first set of processor settings. The data processing system further comprises a processing means in communication with the first analyzing means for processing the raw data with the first set of processor settings, and a second analyzing means in communication with the processing means for analyzing at least portions of the processed data to determine whether the processed data is within a second set of parameters, and if not, the second analyzing means generates a second set of processor settings that the processing means uses to reprocess the raw data.

In a further embodiment, a document processing system comprises document data from a data capture device where the document data is stored in a computer accessible storage medium, and a first acquisition controller in communication with the document data. The first acquisition controller is configured to analyze at least portions of the document data to determine whether the document data is within a first set of parameters. If the document data is not with the first set of parameters, the first acquisition controller generates a first set of processor settings. The document processing system further comprises a processor in communication with the first acquisition controller, where the processor is configured to process the document data with the first set of processor settings, and a second acquisition controller in communication with the processor. The second acquisition controller is configured to analyze at least portions of the processed document data to determine whether the processed document data is within a second set of parameters. If the processed document data is not within the second set of parameters, the second acquisition controller generates a second set of processor settings that the processor uses to reprocess the document data.

In an embodiment, a document processing method comprises storing document data from a data capture device in a computer accessible storage medium, and analyzing with a first analytic engine at least portions of the document data to determine whether the document data is within a first set of parameters. If the document data is not within the first set of parameters, the method further comprises generating with the first analytic engine a first set of processor settings, processing the document data with the first set of processor settings, and analyzing with a second analytic engine at least portions of the processed document data to determine whether the processed document data is within a second set of parameters. If the processed document data is not within the second set of parameters, the method further comprises generating with the second analytic engine a second set of processor settings to reprocess the document data.

In another embodiment, a document processing system comprises a storing means for storing document data from a data capture device, a first analyzing means in communication with the document data for analyzing at least portions of the document data to determine whether the document data is within a first set of parameters, and if not, the first analyzing means generates a first set of processor settings. The document processing system further comprises a processing means in communication with the first analyzing means for processing the document data with the first set of processor settings, a second analyzing means in communication with the processing means for analyzing at least portions of the processed document data to determine whether the processed document data is within a second set of parameters, and if not, the second analyzing means generates a second set of processor settings that the processing means uses to reprocess the document data.

In yet another embodiment, a document processing system comprises a random access cache that receives a document from a scanner, where the document is stored as multiple bands within the random access cache and in a manner that is randomly accessible. The document processing system further comprises a processor in communication with the random access cache, where the processor is configured to obtain the document from the random access cache, the processor having processor control settings that are used to process the document, and an acquisition controller interconnected with the processor. The acquisition controller is configured to analyze the processed document to determine when to use different processor control settings on at least one band within the document and where the processor randomly accesses the at least one band stored in the random access cache to reprocess the band with the different processor control settings.

In a further embodiment, a document processing method comprises storing a document from a scanner as multiple bands within a random access cache and in a manner that is randomly accessible, obtaining the document from the random access cache, and processing the document with processor control settings. The method further comprises analyzing the processed document with an analytic engine to determine when to use different processor control settings on at least one band within the document, and randomly accessing the at least one band stored in the random access cache to reprocess the an with the different processor control settings.

In an embodiment, a document processing system comprises a storing means for storing a document received from a scanner as multiple bands within the storing means and in a manner that is randomly accessible, and a processing means for obtaining the document from the storing means and processing the document with processor control settings associated with the processing means. The document processing system further comprises an analyzing means for analyzing the processed document to determine when to use different processor control settings on at least one band within the document, and an accessing means for randomly accessing the at least one band stored in storing means to reprocess the band with the different processor control settings.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENT

Figure 1:
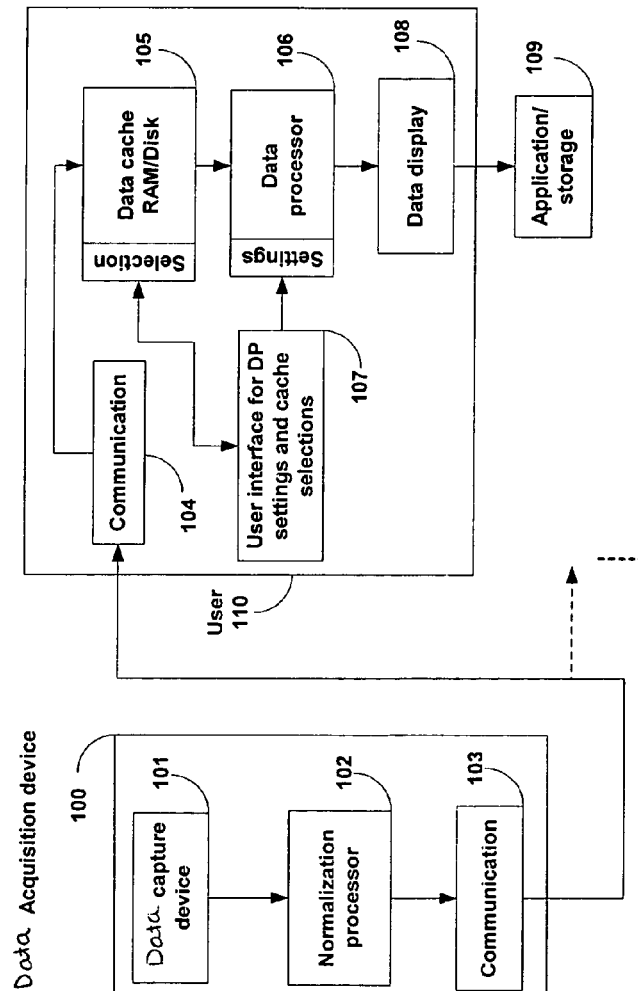
FIG. 1 is a lock diagram of an embodiment of a data acquisition and rescanning system.

FIG. 1 is a block diagram of an embodiment of a data acquisition and rescanning system 150. The data acquisition and rescanning system 150 comprises a data acquisition device 100, which comprises a data capture device 101, a normalization processor 102, and a communication device 103. Examples of data capture devices 101 include, but are not limited to scanners, cameras, video recorders, infrared cameras, acoustic cameras, digital cameras, facsimile machines, any devices capable of capturing an image, acoustic sensors, any devices having an acoustic sensor, and the like. Data capture devices 101 can be non-real time devices, such as, for example, scanners, or data capture devices 101 can be real time devices, such as, for example, cameras and video recorders.

The data acquisition and rescanning system 150 further comprises a user system 110, which comprises a communication device 104, which communicates with the communication device 103, a random access data cache 105, a data processor 106, a user interface 107, and a data display 108. In an embodiment, the random access data cache stores the data least one subsection zone, band, image strip, data strip, or the like, manner that is randomly accessible.

The data reacquisition and rescanning system 150 further comprises an application storage device 109. Examples of the application/storage device 109 include, but are not limited to computer processors, program logic, controller circuitry, general purpose single-chip or multi-chip microprocessors, digital signal processors, embedded microprocessors, microcontrollers and the like. Data storage examples can include volatile and non-volatile memory, hard drives, DVD storage, CD ROM storage, optical and magneto-optical storage, removable or non-removable flash memory devices, or another memory device.

Analog data are presented to the acquisition device 100. The analog capture device 101 measures the analog data. The normalization processor 102 transforms the measured data into normalized data. It calibrates and compensates for known errors and biases introduced by the sensors measuring the analog data to produce normalized data.

The normalized raw data, referred to as raw data from here on, are transmitted via a fast connection using the communication devices 103 and 104 to the user system 110 and stored at the random access data the 105. The raw data are stored as bands, image strips, data strips, or the like in the random access cache 105. In an embodiment, the random access data cache 105 is partitioned into 64 K byte bands.

In addition to the raw data, data pertaining to the raw data, or metadata for each band, are also stored at the cache 105. These metadata comprise, but are not limited to, a tag identifying the data and the location in the cache, a time and date stamp of the acquisition, the sequence number, the beginning of the data band, the end of the data band, height, width, a pointer to the next band, and the like. In some embodiments, tags identify subsections or zones of raw data.

The data processor 106 processes the raw data using the default data processor settings.

The order in which the raw data are processed by the data processor 106 is either determined automatically or interactively. In an automatic embodiment, the most current or more current raw data first stored at the cache 105 are processed.

In an interactive embodiment, the user identifies specific raw data bands or subsections of these for processing utilizing the data tags or metadata. The bands are randomly accessible in the cache 105. This allows non real-time virtual reacquisition.

The processed date together with their metadata are displayed at the data display 108. The default data processor settings are adjustable through the user interface 107. Changing the settings triggers the data processor 106 to reprocess the selected raw data stored in the random access data cache 105 with the changed settings and to display the reprocessed data at the data display 108. By interactively readjusting the processor settings, the data are processed until they satisfy the users preferences.

In addition to controlling the data processor 106, the user interface 107 also controls the random access data cache 105. The user, through the user interface 107, can access subsections, zones, bands, image strips, or data strips of the raw data as well as selecting specific raw data for non real time interactive processing.

The user can transmit the processed data to the application/storage device 109 for further processing as well as storage.

The data acquisition and rescanning system 150 depicted in FIG. 1 supports multiple user usage. The data acquisition device 100 can be accessed by multiple users. In an embodiment, the user system 110 further comprises a computer (not shown). In an embodiment, the user system 110 is implemented, at least in part, as software on the computer.

Figure 2:
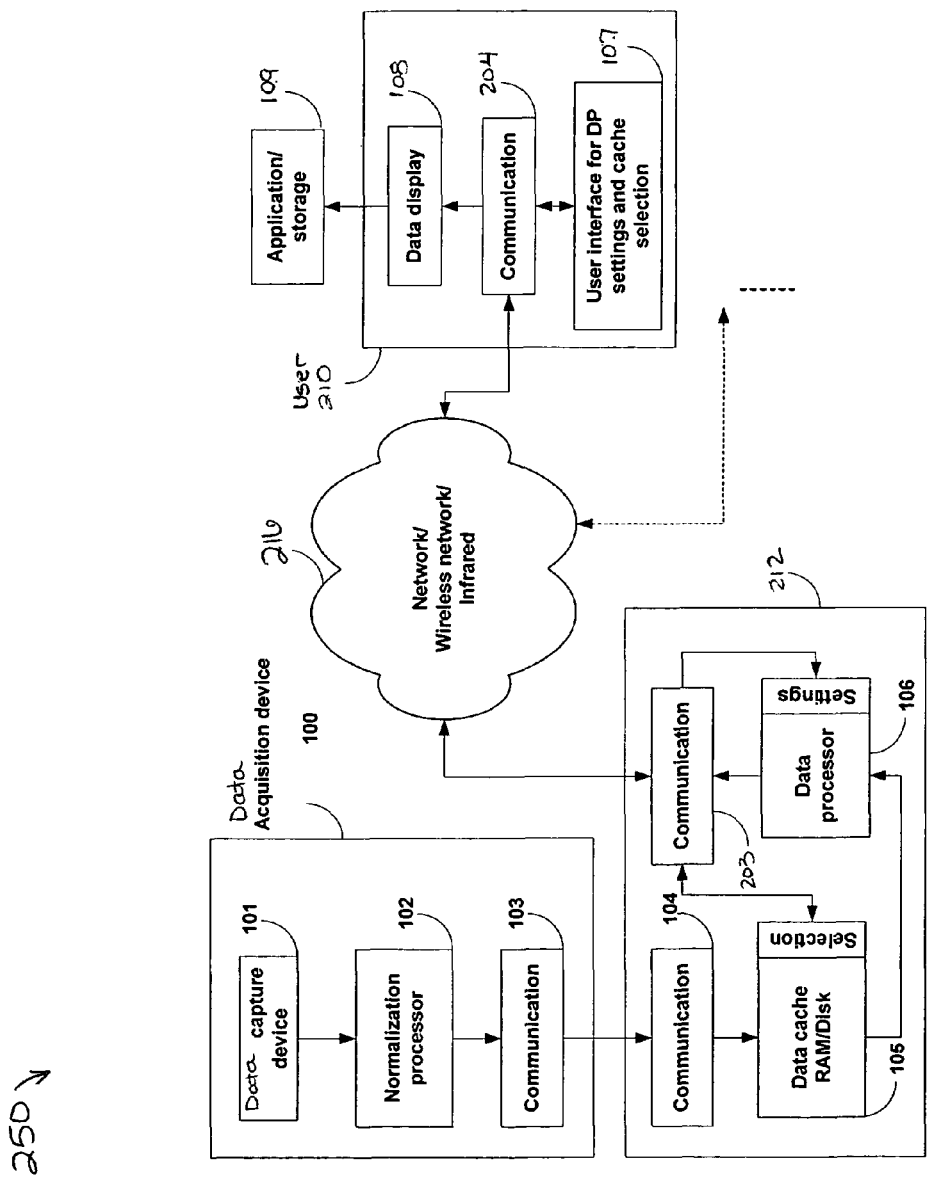
FIG. 2 is a block diagram of are embodiment of a remotely deployed data acquisition and rescanning system.

FIG. 2 is a block diagram of an embodiment of a remotely deployed data acquisition and rescanning system 250. The data acquisition and rescanning system 250 comprises the data acquisition device 100, a storage and processing system 212, a user system 210, and the acquisition/storage device 109.

The storage and processing system 212 comprises the communication device 103, the random access data cache 105, the data processor 106, and a communication device 203.

The user system 210 comprises a communication device 204, the use interface 107, and the data display 108.

The raw data from the acquisition device 100 are transmitted, via a fast connection using the communication devices 103 and 104, to the storage and processing system 212. The raw data and the metadata are stored at the random access data cache 105. The data processor 106 processes the raw data using the default data processor settings.

The user system 210 communicates with the storage and processing system 212 via communication medium 216 using the communication devices 203 and 204.

Focusing now on the communication medium 216, as shown in FIG. 2, in one embodiment, the communications medium is Internet, which is a global network of computers. In other embodiments, the communication medium 216 can be any communication system including by way of example, dedicated communication lines, telephone networks, wireless data transmission systems, infrared data transmission systems, two-way cable systems, customized computer networks, interactive kiosk networks, and the like.

The processed data together with their metadata displayed at the data display 108. The default data processor settings are adjustable through the user interface 107. Changing the settings triggers the data processor 106 to reprocess the selected raw data stored in the random access data cache 105 with the changed settings and to display the reprocessed data at the data display 108. By interactively readjusting the processor settings, the data are processed until they satisfy the user's preferences.

The user can transmit the processed data to the application/storage device 109 for further processing as well as storage.

The data acquisition and rescanning system 250 is similar to the data acquisition and rescanning system 150 except the user system 210 is located remotely from the data acquisition device 100 and the storage and processing system 212. In the remotely deployed system 250, the data cache 105 is local to the data acquisition device 100. The user system 210 does not have to be connected to the data acquisition device 100 with a fast connection in order to ensure an effective use of the embodiment. The data acquisition and rescanning system 250 is implemented, at least in part, as software, firmware, or any combination of software and firmware.

Figure 3:
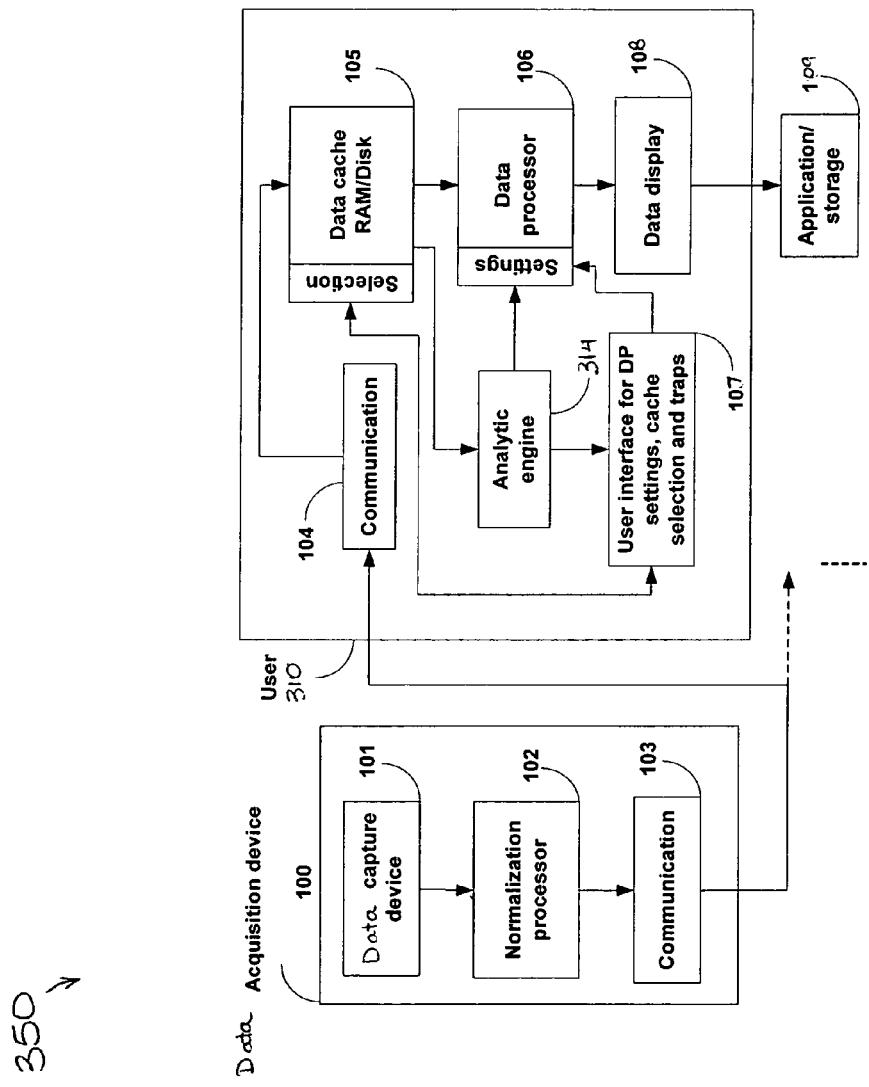
FIG. 3 is a block diagram of an embodiment of a data acquisition and rescanning system having an analytic engine.

FIG. 3 is a block diagram of an embodiment of data acquisition and rescanning system 350 comprising an analytic engine. The data acquisition and rescanning system 350 comprises the data acquisition device 100, a user system 310, and the application/storage device 109. The user system 310 comprises the communication device 104, the random access data cache 105, the data processor 106, the user interface 107, the data display 108, and an analytic engine 314.

Analog data are presented to the acquisition device 100. The analog capture device 101 measures the analog data. The normalization processor 102 transforms the measured data into normalized raw data. The raw data are transmitted via a fast connection using the communication devices 103 and 104 to the user system 310. At the user system 310, the raw data are stored at the random access data cache 105.

Selected raw data are analyzed by the analytic engine 314. In an embodiment, the analytic engine 314 is an acquisition controller 314. The selection mechanism can be either automatic or interactive as described in the embodiments above. The analysis performed by the analytic engine 314 yields new data processor settings for the selected raw data. Examples of analyses comprise, but are not limited to, page boundary detection, streak detection, page border detection, blank page detection, conversion from RGB color representation to a YCbCr color representation, hue measurement, saturation measurement, luminescence measurement, creating a grayscale intensity histogram, creating a color histogram, geometric analysis, color detection, gamma detection for brightness and color levels, textual orientation, and the like.

The settings are transferred to the data processor 106, and the raw data are processed with the new settings. The processed data are displayed at the data display 108. The data processor settings can be adjusted interactively using the user interface 107. In addition to determining the data processor settings, the analytic engine 314 also detects automatically raw data that will potentially result in poor quality processed data and alerts the user upon selection of these data through the user system 310. The corresponding trapping conditions (e.g., user-defined parameters specifying quality thresholds such as brightness range, contrast range, missing corner, blank page, and the like) are accessible to the user through the user interface 107. The user through the user system 310 is able to control the quality of the acquired data.

The user system 310 can transmit the processed data to the application/storage device 109 for further processing as well as storage. Additionally the user can, via the user interface 107, access subsections, or zones of the raw data stored at the random access data cache 105 to be processed at the data processor 108.

The data acquisition and rescanning system 350 allows the non real time interactive processing of specific raw data. The data acquisition rescanning system 350 also supports multiple user usage. The data acquisition device 100 can be accessed by multiple user systems 310 with each data processor 106 having unique processor settings. In an embodiment, the data acquisition and rescanning system 350 further comprises a computer (not shown). In an embodiment, the data acquisition and rescanning system 350 is implemented, at least in part, as software on the computer.

Figure 4:
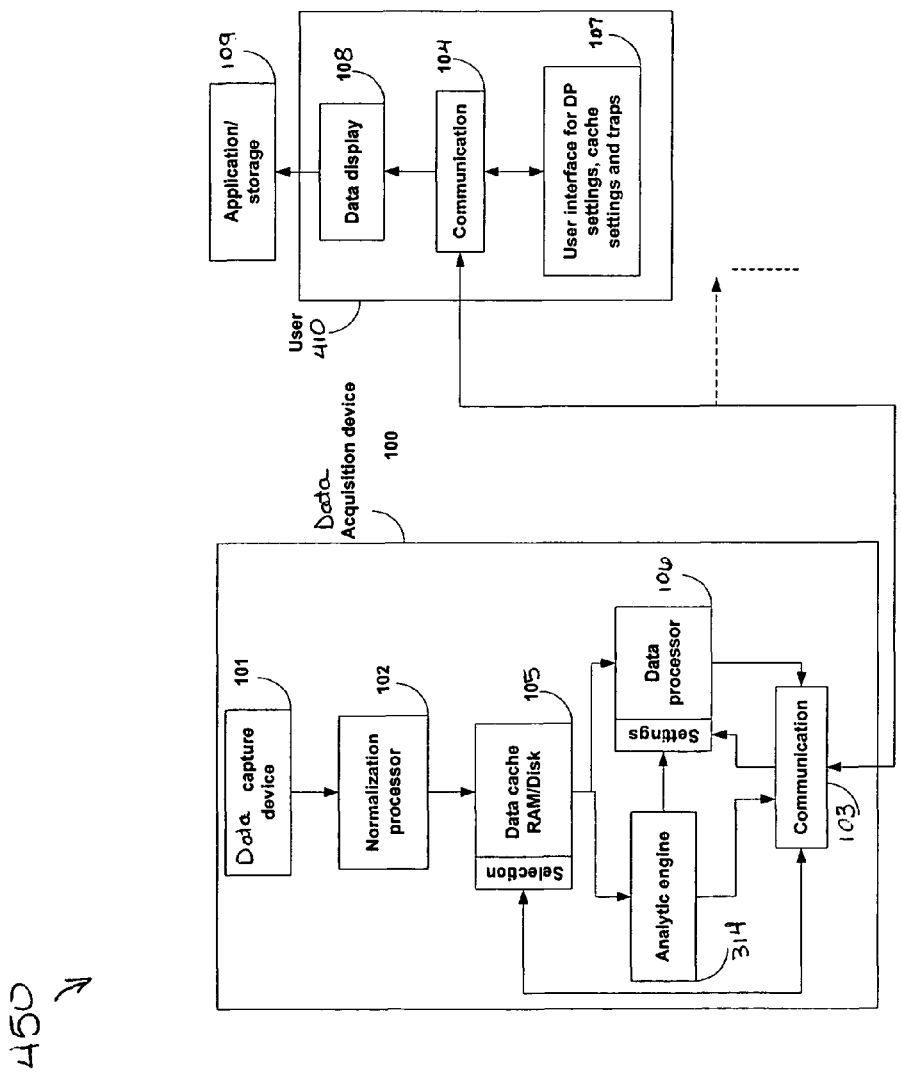
FIG. 4 is a block diagram of a hardware-implemented embodiment of a data acquisition and rescanning system having an analytic engine.

FIG. 4 is a block diagram of an embodiment of a data acquisition and rescanning system 450 comprising the data acquisition device 100, a user system 410, and the analytic engine 314. The data acquisition and rescanning system 450 implements the data acquisition and rescanning system 350 shown in FIG. 3 as hardware.

The random access data cache 105, the data processor 106, and the analytic engine 314 are implemented at the data acquisition device 100. The data acquisition device 100 further comprises the data capture device 101, the normalization processor 102, and the communication device 103. The user system 410 comprises the communication device 104, the user interface 107, and the data display 108.

Figure 5:
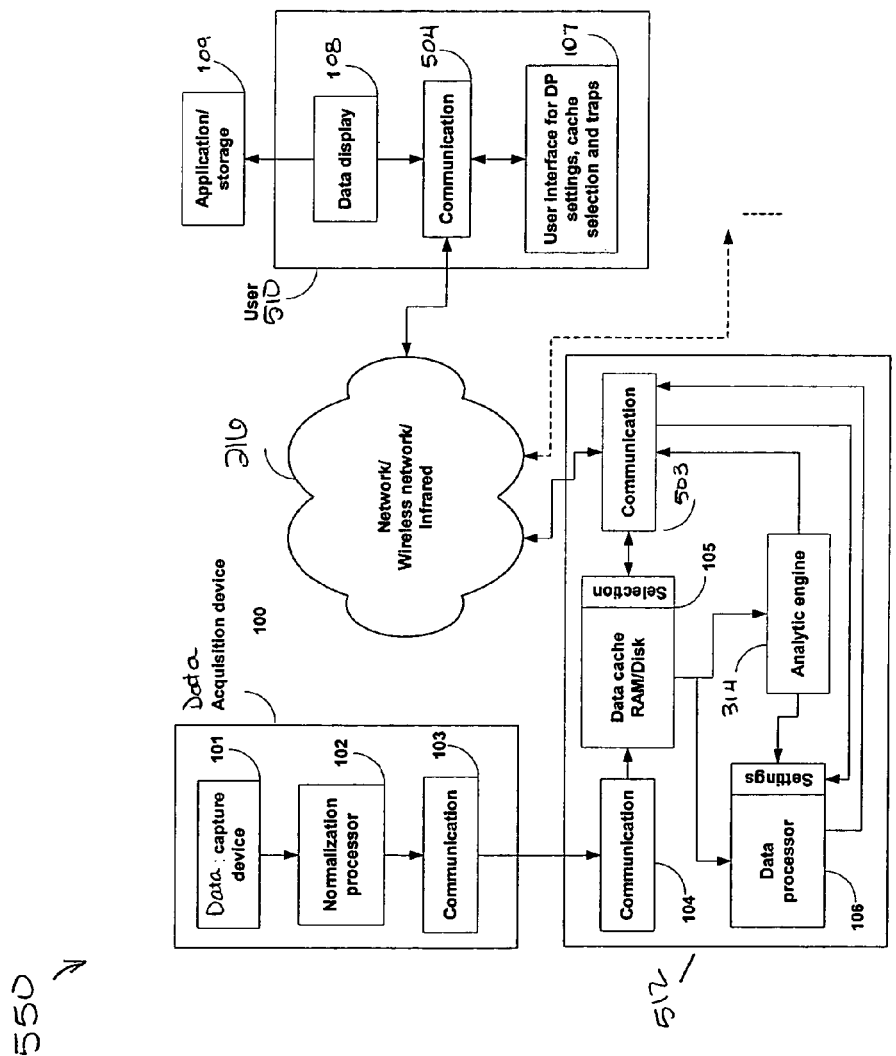
FIG. 5 is a block diagram of an embodiment of a remotely deployed data acquisition and rescanning system having an analytic engine.

FIG. 5 is a block diagram of an embodiment of a remotely deployed data acquisition and rescanning system 550 comprising the analytic engine 314. The data acquisition and rescanning system 550 comprises the data acquisition device 100, a storage and processing system 512, a user system 510, and the acquisition/storage device 109.

The storage and processing system 512 comprises the communication device 104, the random access data cache 105, the data processor 106, the analytic engine 314, an a communication device 503.

The user system 510 comprises a communication device 504, the user interface 107, and the data display 108.

The raw data from the acquisition device 100 are transmitted, via a fast connection using the communication devices 103 and 104, to the storage and processing system 512. The raw data and the metadata are stored at the cache 105. The data processor 106 processes the raw data using the default data processor settings.

Selected raw data are analyzed by the anal engine 314. The analysis performed by the analytic engine 314 yields new data processor settings for the selected raw data. The settings are transferred to the data processor 106, and the raw data are processed with the new settings.

The user system 510 communicates with the storage and processing system 512 via the communication medium 216 using the communication devices 503 and 504. The processed data are displayed at the data display 108. The data processor settings can be adjusted interactively using the user interface 107.

The user, through the user system 510, can transmit the processed data to the application/storage device 109 for further processing as well as storage. Additionally the user can, via the user interface 107, access subsections, or zones of the raw data stored at the random access data cache 105 to be processed at the data processor 106.

The data acquisition and rescanning system 550 allows the non real time interactive processing of specific raw data. The data acquisition and rescanning system 550 is similar to the data acquisition and rescanning system 350 except the user system 510 is located remotely from the data acquisition device 100 and the storage and processing system 512. In the remotely deployed system 550, the data cache 105 and the analytic engine 314 are local to the data acquisition device 100.

The data acquisition and rescanning system 550 also supports multiple user usage. The data acquisition device 100 can be accessed by multiple user systems 510 with each data processor 106 having unique processor settings. The data acquisition and rescanning system 550 is implemented, at least in part, as software, firmware, or a combination of software and firmware.

Figure 6:
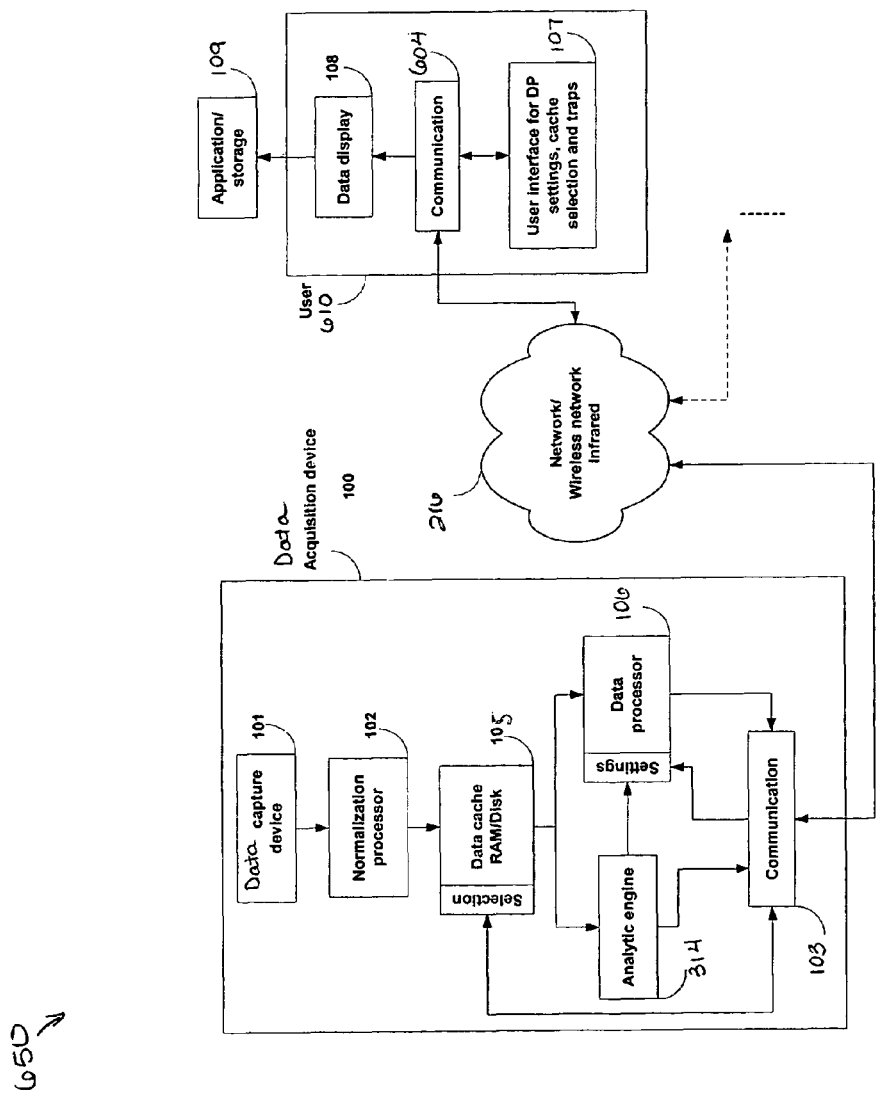
FIG. 6 is a block diagram of a hardware-implemented embodiment of a remotely deployed data acquisition and scanning system having an analytic engine.

FIG. 6 is a block diagram of a hardware implemented embodiment of a remotely deployed data acquisition and rescanning system 650 comprising the analytic engine 314. The data acquisition and rescanning system 650 implements the data acquisition and rescanning system 450 shown in FIG. 4 in a remote deployment. The data acquisition and rescanning system 650 comprises the data acquisition device 100, user system 610, and the application/storage device 109.

The random access data cache 105, the data processor 106, and the analytic engine 314 are implemented as hardware on the data acquisition device 100 directly. The data acquisition device 100 further comprises the data capture device 101, the normalization processor, and the communication device 103. The user system 610 comprises the user interface 107 the data display 108, and a communication device 604.

The user system 610 communicates with the data acquisition device 100 via the communication medium 216 using the communication devices 103 and 604.

Figure 7:
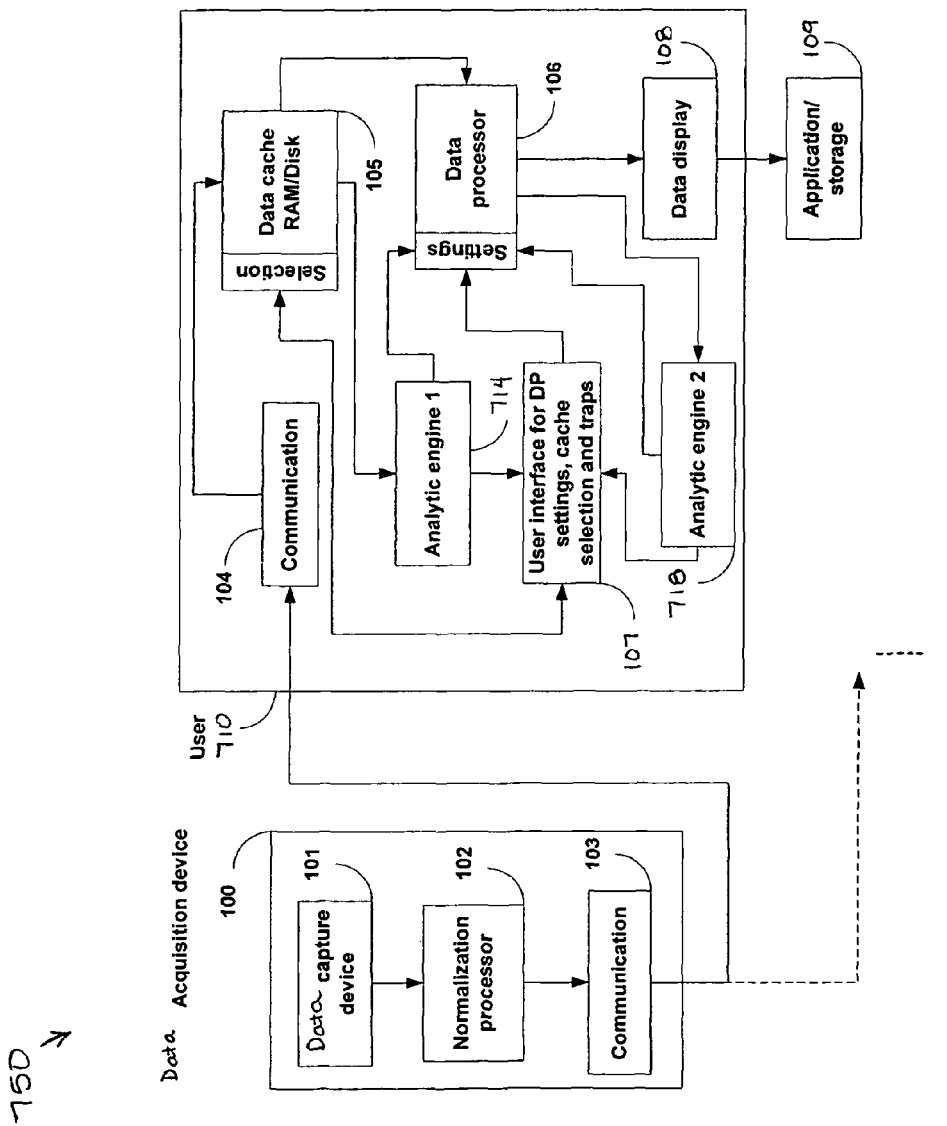
FIG. 7 is a block diagram of an embodiment of a data acquisition and rescanning system having a first and a second analytic engine.

FIG. 7 is a block diagram of an embodiment at a data acquisition and rescanning system 750 having a first analytic engine 714 and a second analytic engine 718. The data acquisition and rescanning system 750 comprises the data acquisition device 100 and a user system 710. The data acquisition device 100 comprises the data capture device 101, the normalization processor 102, and the communication device 103. The user system 710 comprises the communication device 104, the random access data cache 105, the data processor 106, the user interface 107, and the data display 108. The user system 710 further comprises the first analytic engine 714 and the second analytic engine 718. In an embodiment, the first and second analytic engines 714, 718 are first and second acquisition controllers 714, 718, respectively.

Analog data are presented to the acquisition device 100. The data capture device 101 measures the analog data. The normalization processor 102 transforms the measured data into normalized raw data. The raw data are transmitted is a fast connection using the communication devices 103 and 104 to the user system 710.

At the user system 710, the raw data are stored at the data cache 105. The raw data are stored as bands, mage strips, data strips, or the like in the random access data cache 105. In an embodiment, the random access data cache is partitioned in to 64 K byte bands.

In addition to the raw data, data pertaining to the raw data, or metadata for each band, are also stored at the cache 105. These metadata comprise, but are not limited to, a tag identifying the data and the location in the cache, a time and date stamp of the acquisition, the sequence number, the beginning of the data band, the end of the data band, height, width, a pointer to the next band, and the like. In some embodiments tags identify subsections or zones of raw data.

Selected raw data are analyzed by the first analytic engine 714. The selection mechanism can be either automatic or interactive as described in the embodiments above. The analysis performed by the first analytic engine 714 yields an improved or close to optimal data processor settings for the selected raw data. In an embodiment, the first analytic engine 714 performs geometric processing, such as, for example, document orientation, background compensation, color compensation, text extraction, text/background separation, page boundary detection, streak detection, page border detection, blank page detection, conversion from RGB color representation to a YCbCr color representation, hue measurement, saturation measurement, luminescence measurement, creating a grayscale intensity histogram, creating a color histogram, color detection, gamma detection for brightness and color levels, and the like.

The settings are transferred to the data processor 106, and the raw data are processed given with the settings.

The processed data are transferred to the second analytic engine 718. In an embodiment, the processor 106 sends the processed data to the second analytic engine 718 for analysis. In another embodiment, the processor 106 sends the processed data to the first analytic engine 714 and the first analytic engine 714 sends the processed data to the second analytic engine 718 for analysis.

At the second analytic engine 718 the processed data are analyzed and improved data processor settings are determined. The second analytic engine 718 compares the quality of the processed data to a predetermined metric. The second analytic engine 718 selects new processor settings based on the quality of the processed data as determined by the metric.

In an embodiment, the second analytic engine performs feature or quality processing, such as, for example, recognizing an area of poor optical character recognition, non-linear gamma, high background noise, character color distortion, and the like. In an embodiment, the second analytic engine replaces, at least in part, the user's data review at the data display 108 and the user's revised processor settings input from the user interface 107.

The new settings are transmitted to the data processor 106 and the raw data are reprocessed using the new settings. In an embodiment, the second analytic engine 718 sends the metadata containing the location of the raw data in the random access cache 105 and the new processor settings to the processor 106. The processor 106 processes the data with the new processor settings.

In another embodiment the second an engine 718 sends the metadata associated with the data and the new processor settings to the first analytic engine 714. The first analytic engine 714 receives the metadata containing the location of the raw data in the random access cache 105 and the new processor settings and sends the metadata containing location of the raw data in the random access cache 105 and the new processor settings to the processor 106. The processor processes the raw data with the new processor settings.

In yet another embodiment, the second analytic engine 718 sends the metadata associated with the data to the first analytic engine 714. The first analytic engine 714 receives the metadata containing the location of the raw data in the random access cache 105 and the new processor settings and processes the band of raw data with the new processor settings.

The processed data are transferred to the second analytic engine 718 for analysis. In an embodiment, the processor 106 sends the processed data to the second analytic engine 718 for analysis. In another embodiment, the first analytic engine 714 sends the processed data to the second analytic engine 718 for analysis. In another embodiment, the processor 106 sends the processed data to the first analytic engine 714 and the first analytic engine 714 sends the processed data to the second analytic engine 718 for analysis.

The step of reprocessing the raw data with the revised data processor settings and the step of analyzing the processed data and determining revised data processor settings are repeated until convergence, i.e. until the metric does not detect any improvements in the quality of the processed data. This yields improved or optimal processor settings.

For example, a scanner scans a document at a resolution of 600 dots per inch (dpi). The document includes text of various font sizes. The raw data are stored in the random access cache 105 in bands, along with the metadata associated with each band of raw data.

To save processing time and user storage space, the first analytic engine 714 sends the processor 106 settings to process the data at a resolution of 200 dpi, for example, along with other possible geometric processing settings, as describe above.

The processor 106 processes the raw data using the settings from the first analytic engine 714. The processed data and the associated metadata are transferred to the second analytic engine 718.

The second analytic engine 718 analyzes the processed data using a predefined metric. For example, the second analytic engine 718 determines that a band of the processed data is not recognizable, perhaps because the text size is too small to be recognizable at a resolution of 200 dpi. The second analytic engine 718 sends the metadata associated with the band of unrecognizable data along with new processor setting to process the data at a resolution of 400 dpi to the processor 106.

The processor 106 receives the metadata containing the location of the raw data in the random access cache 105 and the new processor settings and processes the band of raw data at 400 dpi. The processor 106 sends the processed band of data and its associated metadata to the second analytic engine 718 for analysis.

The second analytic engine 718 determines if the processed band of data meets the predetermined metric. If not, the second analytic engine 718 sends the metadata associated with the band along with new processor settings to process the band of raw data to the processor 106. For example, the second analytic engine 718 determines that the text in the band is unrecognizable even at a resolution of 400 dpi and sends the metadata associated with the band along with new processor settings to process the band of raw data at a resolution of 600 dpi to the processor 106.

The process of analyzing the data and reprocessing the raw data with new processor setting occurs until the second analytic engine 718 determines that the processed data meet the predefined metric. Processing parameters can be changed on portions or bands of the raw data without reprocessing all of the raw data. In an embodiment, reprocessing portions of the captured data saves processing time and data storage space.

The processed data obtained by these steps are displayed at the data display 108. The data processor settings can be adjusted interactively using the user interface 107.

In addition to determining the data processor settings, the first analytic engine 714 and the second analytic engine 718 automatically detect raw data that will potentially result in poor quality processed data. The corresponding trapping conditions, described above are accessible to the user through the user interface 107, enabling the user to efficiently control the quality of the acquired data.

Additionally the user can, via the user interface 107, access subsections or zones of the raw data stored at the random access data cache 105 to be processed at the data processor 106.

The data acquisition and rescanning system 750 also allows the non real time interactive processing of specific raw data. The user can transmit the processed data to the application/storage device 109 for further processing as well as storage. The data acquisition and rescanning system 750 supports multiple user usage. The acquisition device 100 can be accessed by multiple user systems 710 with each data processor 106 having unique processor settings. In an embodiment, the data acquisition and rescanning system 750 further comprises a computer (not shown). In an embodiment, the data acquisition and rescanning system 750 is implemented, at least in part, as software on the computer.

Figure 8:
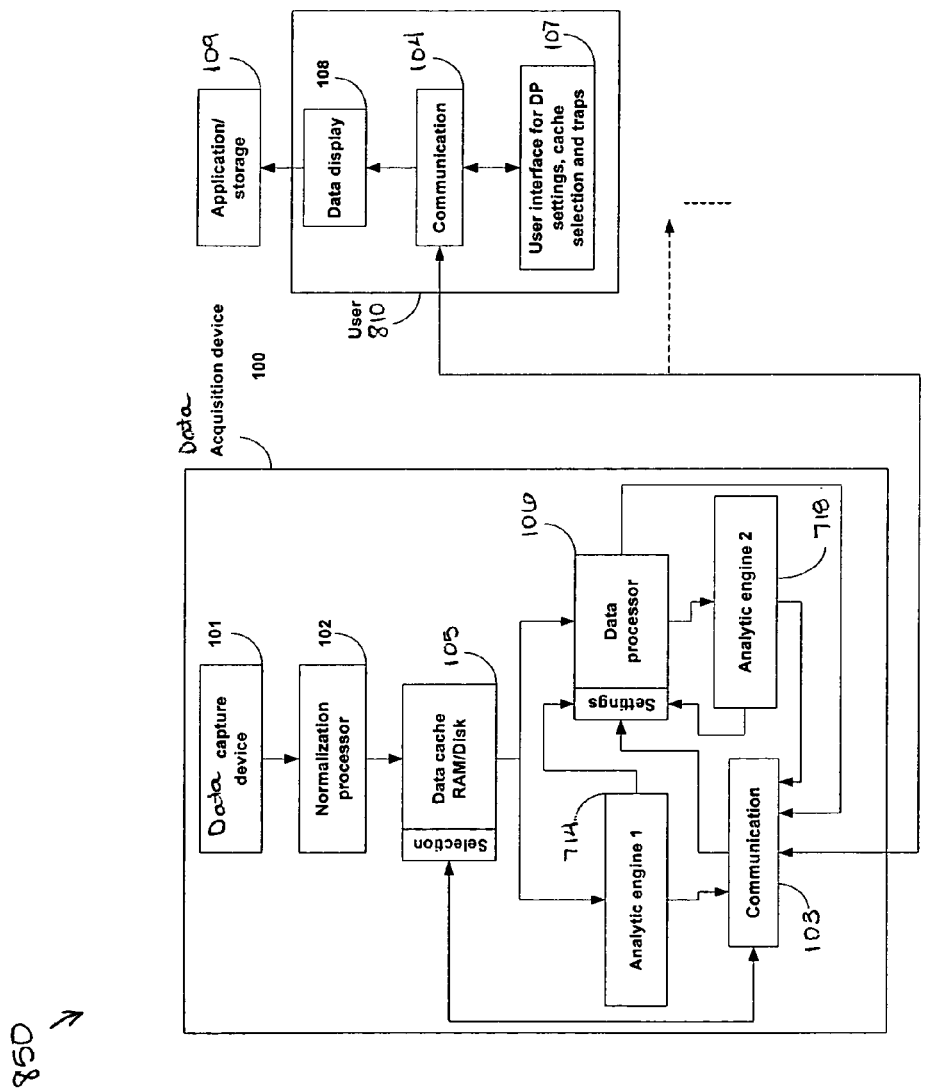
FIG. 8 is a block diagram of hardware implemented embodiment of a data acquisition and rescanning system having a first and a second analytic engine.

FIG. 8 is a block diagram of an embodiment of a data acquisition and rescanning system 850 comprising the first analytic engine 714 and the second analytic engine 718. The data acquisition and rescanning system 850 implements the data acquisition and rescanning system 750 shown in FIG. 7 as hardware.

The data acquisition and rescanning system 850 comprise the data acquisition device 100, a user system 810, and the application/storage device 109. The random access data cache 105, the data processor 106, the first analytic engine 714, and the second analytic engine 718 are implemented at the data acquisition device 100. The data acquisition device 100 further comprises the data capture device 101, the normalization processor 102, and the communication device 103. The user system 810 comprises the communication device 104, the user interface 107, and the data display 108.

Figure 9:
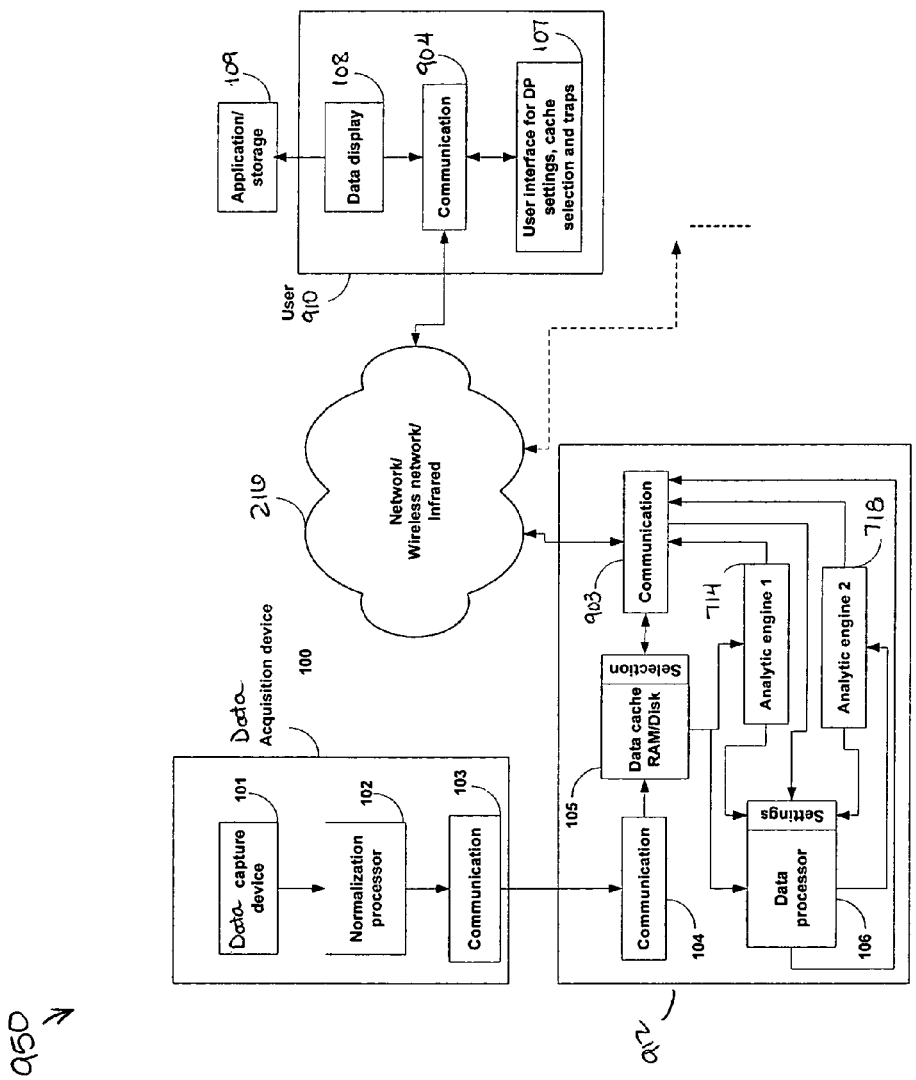
FIG. 9 is a block diagram of an embodiment of a remotely deployed data acquisition and rescanning system having a first and a second analytic engine.

FIG. 9 is a block diagram of an embodiment of a remotely deployed data acquisition and rescanning system 950 comprising the first analytic engine 714 and the second analytic engine 718. The data acquisition and rescanning system 950 comprises the data acquisition device 100, a storage and processing system 912, a user system 910, and the acquisition/storage device 109.

The data acquisition device comprises the data capture device 101, the normalization processor, and the communication device 103.

The storage and processing system 912 comprises the communication device 104, the random access data cache 105, the data processor 106, the first analytic engine 714, the second analytic engine 718, and a communication device 903.

The user system 910 comprises a communication device 904, the user interface 107, and the data display 108.

The raw data from the acquisition device 100 are transmitted, via a fast connection using the communication devices 103 and 104, to the storage and processing system 912. The raw data and the metadata are stored at the cache 105. The data processor 106 processes the raw data using the default data processor settings.

At the data storage and processing system 912, the raw data are stored at the data cache 105. Selected raw data are analyzed by the first analytic engine 714. The selection mechanism can be either automatic or interactive as described in the embodiments above. The analysis performed by the first analytic engine 714 yields an improved or close to optimal data processor settings given the selected raw data. The settings are transferred to the data processor 106, and the raw data are processed with the given settings.

The processed data are transferred to the second analytic engine 718. At the second analytic engine 718 the processed data are analyzed and improved data processor settings are determined. The second analytic engine 718 determines the quality of the processed data using a metric. The second analytic engine 718 selects new processor settings depending on the quality of the processed data as determined by the metric. The improved settings are transmitted to the data processor 106 and the raw data are reprocessed. The step reprocessing the processed data with the revised data processor settings and the step of analyzing the processed data and determining revised data processor settings are repeated into convergence, i.e. until the metric cannot detect any improvements in the quality of the processed data, as described above. This yields improved or optimal processor settings.

The user system 910 communicates with the storage and processing system 912 via a communication medium 216 using the communication devices 903 and 904. The processed data are displayed at the data display 108. The data processor settings can be adjusted interactively using the user interface 107.

The user, through the user system 910, can transmit the processed data to the application/storage 109 for further processing as well as storage. Additionally the user can, via the user interface 107, access subsections, or zones the raw data stored at the random access data cache 105 to be processed at the data processor 106.

The data acquisition and rescanning system 950 allows the on real time interactive processing of specific raw data. The data acquisition and rescanning system 950 is similar to the data acquisition and rescanning system 750 with the user system 910 located remotely from the data acquisition device 100 and the storage and processing system 912. In the remotely deployed system 950, the data cache 105, the data processor 106, the first analytic engine 714, and the second analytic engine 718 are local to the data acquisition device 100.

The data acquisition and rescanning system 950 also supports multiple user usage. The data acquisition device 100 can be accessed by multiple user systems 910 with each data processor 106 having unique processor settings. The data acquisition and rescanning system 950 is implemented, at least in part, as software, firmware, or a combination of software and firmware.

Figure 10:
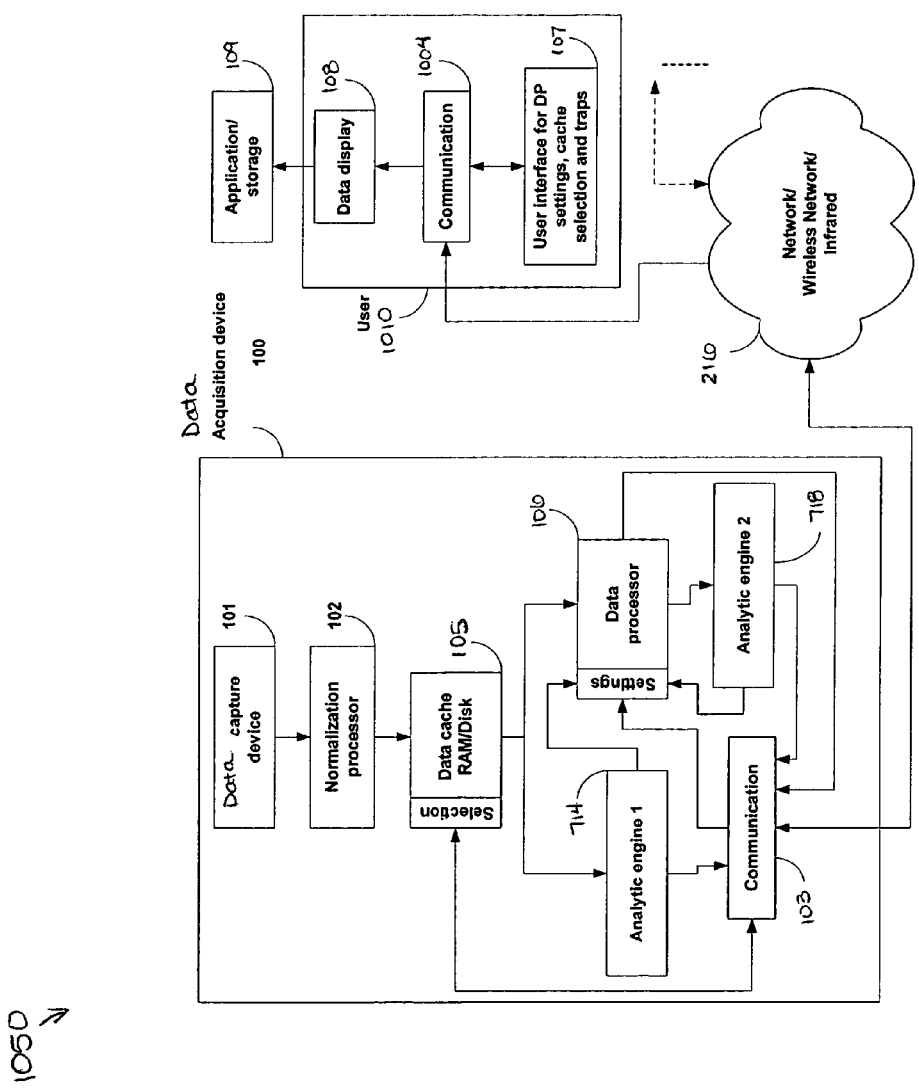
FIG. 10 is a block diagram of hardware implemented embodiment of a remotely deployed data acquisition and rescanning system having a first and a second analytic engine.

FIG. 10 is a block diagram of a hardware implemented embodiment of a remotely deployed data acquisition and rescanning system 1050 comprising the first analytic engine 714 and the second analytic engine 718. The data acquisition and rescanning system 1050 implements the data acquisition and rescanning system 850 shown in FIG. 8 in a remote deployment. The data acquisition and rescanning system 1050 comprises the data acquisition device 100, a user system 1010, and the application/storage device 109.

The random access data cache 105, the data processor 106, the first analytic engine 714, and the second analytic engine 718 are implemented as hardware at the acquisition device 100. The data acquisition device 100 further comprises the data capture device 101, the normalization processor 102, and the communication device 103.

The user system 1010 comprises the user interface 107, the data display 108, and a communication device 1004. The user system 1010 communicates with the data acquisition device 100 via the communication medium 216 using the communication devices 103 and 1004.

Figure 11:
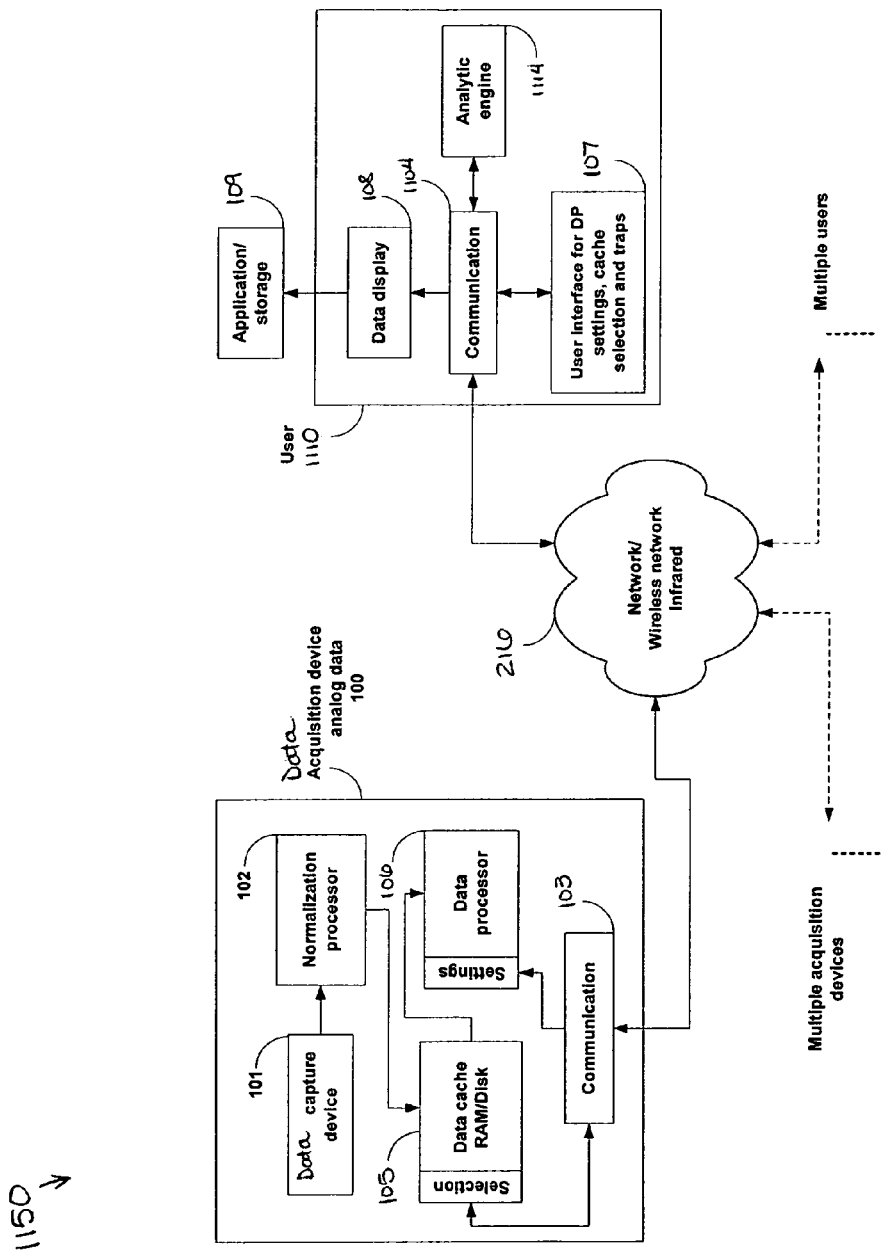
FIG. 11 is a block diagram of an embodiment of a data acquisition and rescanning system comprising multiple acquisition devices and having multiple users.

FIG. 11 is a block diagram of an embodiment of a data acquisition and rescanning system 1150 comprising a plurality of data acquisition devices 100 and a plurality of user systems 1110. The plurality of user systems 1110 are located remotely from the plurality of data acquisition devices 100.

The data acquisition device 100 comprises the data capture device 101, the normalization processor 102, the communication device 103, the random access data cache 105, and the data processor 106. In an embodiment, the data processor 106 is a low processing capability engine.

The user system 1110 comprises the user interface 107, the data display 108, a communication device 1104, and an analytic engine 1114. In an embodiment, the analytic engine 1114 is a high performance analytic processor.

Analog data are presented to the acquisition device 100. The analog capture device 101 measures the analog data. The normalization processor 102 transforms the measured data into normalized raw data. The data processor 106 is used for transformations of the data. The transformed data are stored at the random access data cache 105. Examples of data processing include, but are not limited to, document orientation, background compensation, color compensation, text extraction, text/background extraction, threshold, correlation, despeckle, and the like.

Working in a real time broadcast push mode or upon request from at least one of the user systems 1110, selected cached data are scaled and compressed by the data processor 106. The communication device 105 sends the scaled and compressed data, and the associated tag or metadata to the user system 1110 via the communication medium 216 using the communication device 103.

In an embodiment, the tag data comprises the capture device address and the data location in the cache 105. In an embodiment, the metadata comprise, but are not limited to, a tag identifying the data and the location in the cache, a time and date stamp of the acquisition, the sequence number, the beginning of the data band, the end of the data band, height, width, a pointer to the next band, and the like. The tag data is embedded in the communication network protocol of the communication medium 216.

The user system 1110 receives the data via the communication medium 216 and the communication device 1104. The data is analyzed by the an engine 1114. If the analysis detects some relevant data area(s) characterized by analysis results that are outside of a boundary determined by the user, the analytic engine 1114 activates the user interface 107 by sending the tag associated with the data and the location of the area(s) of interest within the data.

The user interface 107 can be an automatic or a manual operation. The user interface 107 uses the tag content and the area location to request a new data set with new processing settings from the corresponding data capture device 100. The data processor 106 reprocesses the selected data using the new settings and the data capture device 100 retransmits the reprocessed data to the user system 1110. This virtual rescan operation is an interactive process, which can use different settings or windows.

During the interactive process described above, the data continue to be transmitted in real time by the plurality of the capture devices 100 to the plurality of user systems 1110. In an embodiment, the user, through the data display 108, can visualize any of the incoming data. In an embodiment, any part of the receiving data can be stored by the application/storage device 109.

In an embodiment, the user system 1110 can lock selected data in the data cache 105 of one or more data acquisition devices 100 associated with the selected data. When the user system 1110 receives the selected data at the desired resolution, the user system 1110 unlocks the data. In an embodiment, the user system 1110 has an authorization level in order to lock data. The non-locked data in the data cache 105 is overwritten in a first in first out model.

Exemplary Embodiments

This section includes exemplary embodiments of a virtual rescan workflow, a detection orientation method, a detect bleed-through method, a color detection method, a background smoothing method, and a detection of scanned page boundaries method.

Exemplary Virtual Rescan (VRS) Workflow

If, in an embodiment, the user chooses to scan images with VRS processing, the VRS processing initializes the scanner to acquire a raw (unprocessed) master image. The master image is in grayscale if the user chooses to scan in black and white, else the master image in grayscale or color as the user specifies.

VRS processing also initializes the scanner using pre-defined scanner specific settings. These settings help the VRS processing improve performance. For example, one of the settings is to perform overscanning (i.e., scan more than the size requested so VRS can perform a good deskew operation).

The scanner scans an image, per the specified settings, and the raw image is transmitted from the scanner to a VRS cache.

The VRS software performs one or more image processing algorithms. In an embodiment, an analytic engine comprises the VRS. One algorithm determines the actual page boundaries within the scanned raw image. In an embodiment, the scanned image contains scanner-introduced background due to overscanning. Determining the page boundaries is done for a variety of backgrounds, such as black, white, grey, and the like. Techniques, such as streak detection, are used, for example, for line streaks introduced by a dirty scanner camera/lamp, rollers, or the like. Other techniques, such as page border shadow detection are used to determine a page boundary.

Another image processing algorithm determines if the scanned page is blank. A page may contain colors that bleed through from the other side of the page when scanning is done in duplex. If the algorithm determines that the were contains no content, the page can be deleted per the user setting.

Another image processing algorithm converts the page contents from an RGB color representation to a YCbCr (luminance, hue, and saturation format). This permits many color related operations on the hue and saturation aspects of the page, and hence, results in a speed improvement. If the scanner scans the image in black and white, this step is not performed.

Yet another image processing algorithm analyzes the image. Possible analyses are performing luminance analysis and extracting the grayscale intensity information into a histogram, extracting color information into a color histogram, performing geometric analysis on the page, and the like.

Another image processing algorithm detects whether the document has color, based on previous analyses. If there is no color content, the algorithm sets the scanner settings to indicate that the document is a black and white document. If document has background color and that background color is the predominant color, the algorithm sets the scanner settings to indicate that the document is a color document. Additionally, if the document contains color content, the user can adjust the scanner settings to reproduce the color or not to reproduce the color, based on a determination of whether the color content is related to specific document content, or is a predominate characteristic of the document, such as a document on yellow paper.

Another image processing algorithm performs gamma correction on the image to adjust the brightness and color levels.

A further image processing algorithm performs deskew and cropping on the page image based on the previous analyses.

Yet another image processing algorithm detects textual orientation in the image and rotates the image orthogonally, if required.

Another image processing algorithm performs other operations, such as, for example, barcode detection, line filtering, despeckling, annotating with an endorsement string, or the like.

A further image processing algorithm performs background smoothing by detecting the background colors and merging them together.

If the image has problems that cannot be corrected automatically, the image processing software displays the processed image and the settings to the user. The user then determines the settings for the image. As the user changes the settings, the image processing software performs one or more of the image processing algorithms discussed above using the user specified settings and displays the processed image to user. When the user accepts the image, the image processing software re-processes the raw image using the final settings chosen by the user.

In another embodiment, a second analytic engine performs additional analyses to determine if the processed image meets predetermined requirements. If the image does not meet the predetermined requirements, the second analytic engine determines new settings and reprocess the raw image using the new settings. This process repeats until the image meets the requirements.

When the image processing is complete, the image processing software sends the image to the application.

Exemplary Detect Orientation

In an embodiment, the detect orientation algorithm automatically detects which way to orthogonally rotate a text page for viewing. The algorithm selects possible individual characters from connected components of black within the page. The algorithm then determines the orientations of the individual characters by employing a trained neural network. The algorithm uses the orientation results of the neural network to determine a better page orientation.

The algorithm finds the connected components within the page image. Since some of these components can contain graphic elements, the algorithm uses a number of constraints to filter out non-characters within the page image. Examples of the constraints are the number of pixels exceeds a predetermined threshold; both width and height are large enough; the ratio of height to width does not exceed a predetermined threshold; the ratio of the number of black pixels in the connected component to the area of its bounding box is not too large or too small; the size of the component does not approach the size of the page; and the number of transitions from white to black and back along a line crossing the character in either horizontal or vertical direction is not too large.

Some of the components passing this test may contain glued characters, pieces of broken characters, and the like. In an embodiment, assuming reasonable image quality, a statistically meaningful majority contains individual characters.

The algorithm proportionally scales each of the components to fit into a gray-scale square of 20 by 20 pixels. The algorithm then adds a 2 pixel white margin around the gray-scale square and sends the resulting 24×24 image to a trained feed forward neural network for orientation detection.

The neural network used in the algorithm, in an embodiment, has a preprocessing layer that converts the 576 inputs into 144 features. The features pass through two hidden layers of 180 and 80 nodes, respectively. The result of the neural network is four outputs indicating confidences in "up", "down", "left", or "right" orientation. This neural network with its rather distinct preprocessing using Gabor Wavelets has been described in the papers, "A Subspace Projection Approach to Feature Extraction: The Two-Dimensional Gabor Transform for Character Recognition", Neural Networks, 7 (8), pp. 1295-1301, 1994, and "Neural Network Positioning and Classification of Handwritten Characters", Neural Networks 9 (4), pp. 685-693, 1996. The training of the neural network is not a part of the run-time algorithm and is performed off-line using scaled characters from common business fonts, such as, for example, Arial, Times Roman, Courier and the like.

Next, the algorithm decides whether to accept the orientation having the highest confidence level. The algorithm ides based on confidence ratios that exceed predetermined thresholds.

For increased or maximum accuracy, in an embodiment, the analysis of the page utilizes the components found within it. Typically, for most text pages a small percentage of the components is sufficient to make a confident decision. To achieve a reasonable tradeoff between accuracy and speed, the page is divided into several sets of stripes. The stripes in each set are distributed over the page to make the selection of components quasi-random. If, in an embodiment, the number of good connected components in the first set exceeds a predefined number and the votes confidently determine the winning orientation, the algorithm returns the result. Otherwise, the next set of stripes is processed, then the next, etc., until the end condition is met, or until all or a predetermined percentage of the components on the page have been examined.

Recognition of character shapes becomes more difficult as the font size and resolution become smaller. For the algorithm to perform well, an embodiment, the height of binary characters exceeds 16 pixels. The algorithm can show graceful degradation for characters up to 8 pixels in height.

The algorithm, in an embodiment, may assume that the majority of connected components on the page are individual characters.

Embodiments of the algorithm have been trained with the Latin alphabet. Since there are many common shapes between Latin and Cyrillic as well as between the Latin and Greek alphabets, the algorithm also performs well for Cyrillic and Latin. The algorithm can be trained specifically for different character sets.

Exemplary Detect Bleed-Through

An embodiment of the detect bleed-through algorithm addresses automatically detecting bleed-through on sides of scanned documents in order to perform further image processing on these pages. In an embodiment, the algorithm uses page boundary detection within front and back scanned images to approximately match side coordinates. Then, the algorithm uses existing color or gray content to fine-tune the mapping. This additional step can be used because of slightly different optics and skews of front and back cameras. If residual (unexplained) content fall below predetermined density criterion, the algorithm determines that the page is blank.

In an embodiment, the algorithm detects each side of the page against the background of the scanner. Next, the algorithm runs individual blank page detection on both sides of the page to determine if one or both sides of the page are blank regardless of possible bleed-through. If one or both sides are blank, the algorithm ends.

If one or both sides are not blank, the algorithm determines the main background of the page on both sides. Next, the algorithm chooses the side with greater volume of content as the front side. Next, the algorithm maps the back side to the front side using corresponding rectangles of the page.

Dark pixels with color sufficiently different from the background are marked on both sides to form mask images. The algorithm analyzes the mask images locally block by block to determine the local shift relative to the rough mapping. Next, the algorithm uses a Least Mean Squares approximation to finalize the back-to-front mapping. The algorithm cancels content on the back side within a predefined distance of darker content on the front side, and then the algorithm sends the residual image to the blank page detection step.

Exemplary Color Detection

An embodiment of the color detection algorithm detects the color content in a scanned image and distinguishes between the foreground and background color. The algorithm eliminates the background color if it is the most predominant color in the document. The algorithm examines pixels in the scanned image and determines if the pixel is a color pixel and if the pixel is a background pixel. This determination uses the saturation and luminance levels of the pixel.

In an embodiment, the algorithm converts the image from an RGB representation to a YCbCr (Luma and Chrominance) representation. The algorithm looks at the saturation component of the pixel to determine the saturation level. Saturation provides a measure of the amount of color in a pixel. The higher the saturation, the more vivid the color. The lower the value, the less color the pixel contains. Saturation is expressed as a number between 0 and 182, which comes from mathematical formulation used to calculate saturation. A user adjustable color threshold value, in an embodiment, is used to determine if a pixel is a color pixel. If the saturation value is greater than the threshold, the pixel is color, else it is not.

The algorithm determines if the pixel is a background pixel. When scanner scans a document, the white or black background of the document and/or the scanner can appear as a low saturated light or dark color. For most images, the amount of background pixels is a large percentage of the total area. The color detection algorithm, in order to exclude the contributions of the white and/or black background portions of an image, uses a white background threshold, a black background threshold, and a background saturation threshold to determine background pixel membership. If, in an embodiment, the luminance of a pixel is higher than the white background threshold or lower than the black background threshold, and the saturation of the pixel is lower than the background saturation threshold, then the pixel is a classified as a background pixel. Otherwise, the pixel is non-background pixel.

The algorithm analyzes the non-background pixels to determine the various color contents by building a histogram of the pixels based on their saturation values. A scanner can introduce some color to the scanned image because of the lamp or the camera. A dirty camera can add color spots, for instance. If a color saturation value of a pixel is below a predetermined threshold, the algorithm determines that the pixel does not have color. Otherwise, the pixel is considered a valid color. If the document contains any valid color, the document is considered a color document.

Exemplary Background Smoothing

An embodiment of the background smoothing algorithm reduces the number of colors within the backgrounds of an image to improve the appearance of the image as well as decreases the size of the image after compression.

The algorithm clusters the colors found in the image and selects those that contain enough pixels to be considered backgrounds.

The algorithm determines the co-occurrence of the background clusters to determine if two or more clusters actually represent a single background. These types of backgrounds a commonly generated by dithering or using micro-dots, which the eye perceives as the averaged color within the background. When the scanner scans the image at a high resolution, the individual colors are seen for each of the pixels. The algorithm merges the co-occurring clusters and calculates an average color for the cluster.

Then, the algorithm determines if backgrounds have neighboring clusters with colors that are slightly darker or slightly brighter. Often, when scanning, for example, the paper going through the transport will buckle due to the rollers and forces acting on the paper, and can create shadows and highlights within the image. These shadows and highlights can be perceived as different clusters and they can be merged with the main background.

The algorithm modifies the image pixel by pixel by searching the image and determining if the color of the pixel belongs to one of the background clusters. If the pixel belongs to a background cluster, the algorithm changes the pixel color to the averaged color of the cluster.

Exemplary Detection of Scanned Page Boundaries

The detection of scanned page boundaries algorithm automatically detects page boundaries within a scanned image. Generally, page skew detection algorithms used in the industry work reliably only for black background scanning where the contrast between very dark background of the scanner and typically white page is difficult to miss. In an embodiment, this algorithm detects the page against any background, thus, performing page skew correction and cropping even for white background scanners.

Since there may be very small color or gray level differences between the background of the scanner and the background of the page, the differences alone cannot be relied upon to detect the page boundary points. Instead, the algorithm calculates and compares statistics collected in a small window centered on pixels of analysis. The algorithm compares these statistics to the range of the statistics collected in the corners of the scanned image, where the algorithm expects the background of the scanner.

The algorithm calculates the statistics in the four corners of the scanned image. If some of the corners are not uniform, which can occur when the content of the page is close to the corner, the algorithm does not consider the non-uniform corners.

If some of the corners are significantly different from the other corners, the algorithm chooses the majority of like corners. It the choice has to be made between equally plausible alternatives, the algorithm compares the corners to the background of the inside of the scanned image in order to disqualify the background of an over-cropped page.

For qualifying corners, the algorithm aggregates the statistics of the scanner background for later use.

The algorithm searches rows and columns of the scanned image looking for the first and last pixel with statistical properties significantly different from those of the scanner background. Predetermined thresholds determine the significance of the deviations of the pixel-centered windows from the range of the scanner background.

The detected first and last non-background pixels can be used to determine candidate edge points. Several constraints are used to filter out outliers. For example, if searching for the left boundary of the page, the candidate edge point has immediate neighbors above and below such that the angles formed by connecting segments are within 45 degrees from the vertical and are close to each other. Candidate edge points are analyzed with a variant of a Least Mean Square approximation to find best straight lines representing the main rectangle of the page. The algorithm assigns a confidence measure to the found rectangle based on the ratio of edge points supporting the rectangle to the maximum possible number of edge points, which may depend on the size of the page, the resolution of the scan, and the like.

After the algorithm determines the angle of skew, the algorithm, checks if individual edge points outside of the main rectangle of the page have enough support from their neighbors to indicate a tab or another existing deviation from the assumed rectangular shape of the page. Edge points deemed meaningful are used to determine the crop lines.

In case of dual scanning, the algorithm reconciles the skew angles between the front and back of the page image. If the angles of skew detected on the front side are different from that of the back side, it is likely that one of the two is wrong. In this case, the algorithm uses the angle associated with the higher confidence and recalculates crop lines for the other side.

Similarly, if the crop lines on the front and back significantly disagree, the algorithm reconciles the crop lines between the front and back of the page image. The algorithm considers the differences between the main rectangle of the page and its crop line to determine and remove extensions due to scanner artifacts.

In an embodiment, the detection of page boundaries algorithm assumes that the background of the scanner is uniform, that variation in brightness between individual sensors over the width of the scan are not significant, and that there are very few non-functioning or badly calibrated sensors causing streaks.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

This application is related to U.S. patent application Ser. No. 13/740,123, filed Jan. 11, 2013; Ser. No. 13/802,226, filed Mar. 13, 2013; Ser. No. 14/209,825, filed Mar. 13, 2014; Ser. No. 14/259,866 filed Apr. 23, 2014; Ser. No. 14/177,136, filed Feb. 10, 2014; Ser. No. 14/175,999, filed Feb. 7, 2014; Ser. No. 14/220,016, filed Mar. 19, 2014; Ser. No. 14/220,023, filed Mar. 19, 2014 and Ser. No. 14/220,029, filed Mar. 19, 2014; and Provisional U.S. Patent Application No. 61/883,865, filed Sep. 27, 2013, and 61/905,063, filed Nov. 15, 2013.

The present application refers to image processing. In particular, the present application discloses systems, methods, and computer program products designed to augment current still-photo based methods and systems for capturing a digital image to leverage streaming video data to capture and process various types of information. As digital imaging technology continues to improve, video stream resolution usually lags available photo resolutions. As such, leveraging video streaming for document capture has been previously limited to smaller size objects because the available resolution did not always provide sufficient detail regarding larger objects to effectively process digital images depicting such objects. As video stream resolutions increase, this limitation has decreasingly impacted processing capabilities and suitability such that processing data from a video stream has become a viable alternative or even a preferred replacement to still-photo capture in various applications and/or implementations.

At a high level, an exemplary user experience for video stream capture may be loosely based on the following scenario.

A user invokes a video-stream capture interface from a native mobile application, via a software development kit (SDK) used to develop or modify a new or existing mobile application, via a built-in mobile operating system (OS) functionality, etc. Once invoked, the user is presented with an option to select video-based capture and perform a video-based capture operation. The capture application exposes a video capture interface that guides the user to ensure the physical object remains within the bounds of a bounding box superimposed on the mobile capture user interface. Once within the bounding box, the user clicks on the 'Capture' button to initiate the capture process. Once initiated, a mobile interface begins checking for stability of the mobile device using one or more hardware components of the mobile device such as an accelerometer, gyroscope, etc. Once stability has been achieved, an autofocus operation may be forced and the process of analyzing each of the (n) frames of the video stream begins.

The goal of frame analysis is to detect the existence of a target object within the vantage point provided by the video stream. Entities include but are not limited to page(s), barcode(s), buildings, motor vehicles, boats, persons, etc. The actual implementation of the real-time methodology and algorithms used to detect the existence of the target entity within the video frame will be discussed separately from this document.

Once the existence of the target object has been detected in one or more frames of the stream, either the frame is identified and processed by image perfection techniques, such as embodied in one exemplary scenario via electronic virtual rescan (EVRS) or for devices that support the necessary capability, the full resolution (photo) corresponding to the target video frame is identified and processed by EVRS. Alternatively, multiple low-resolution video frames could be combined to a single higher-resolution image.

From there, the mobile application may facilitate providing as much relevant entity metadata as possible with the lowest possible latency. Relevant metadata could include but not be limited to object type, object characteristics, field metadata, GPS information, page size, barcode value(s), car type, person height, boat length, etc.).

This capability would allow the user to capture multiple objects and object types simultaneously. Moreover, objects may be associated with a particular downstream process (e.g. a business process such as a loan application, insurance claim, financial transaction, etc.) quickly and easily with minimal user input other than simple click, point and capture functionality.

From one perspective, the overall capture and processing may generally follow a logical order similar to the flow diagram shown below.

It will be appreciated upon reading the present descriptions that the overall flow diagram shown below is a coarse conceptual example that should not be considered limiting in any way. The presently described capture and processing may, in various embodiments, include any number of additional and/or different operations, perform such operations in a different order, and/or omit certain operations depicted in the flow diagram.

Images (e.g. pictures, figures, graphical schematics, single frames of movies, videos, films, clips, etc.) are preferably digital images captured by cameras, especially cameras of mobile devices. As understood herein, a mobile device is any device capable of receiving data without having power supplied via a physical connection (e.g. wire, cord, cable, etc.) and capable of receiving data without a physical data connection (e.g. wire, cord, cable, etc.). Mobile devices within the scope of the present disclosures include exemplary devices such as a mobile telephone, smartphone, tablet, personal digital assistant, iPod®, iPad®, BLACKBERRY® device, etc.

However, as it will become apparent from the descriptions of various functionalities, the presently disclosed mobile image processing algorithms can be applied, sometimes with certain modifications, to images coming from scanners and multifunction peripherals (MFPs). Similarly, images processed using the presently disclosed processing algorithms may be further processed using conventional scanner processing algorithms, in some approaches.

In one general embodiment, a method includes: storing raw or normalized video data from a data capture device in a computer accessible storage medium; analyzing at least portions of the raw or normalized video data with a first analytic engine to: determine whether the raw video data is within a first set of parameters; and generate with the first analytic engine a first set of processor settings in response to determining the raw video data is not within the first set of parameters, processing the raw or normalized video data with the first set of processor settings; and analyzing at least portions of the processed data with a second analytic engine to determine whether the processed data is within a second set of parameters; generating with the second analytic engine a second set of processor settings to reprocess the raw or normalized video data in response to determining the processed data is not within the second set of parameters, sending the second set of processor settings to the first analytic engine; and reprocessing the raw or normalized video data with the first analytic engine using the second set of processor settings, and wherein the second set of parameters is different than the first set of parameters.

In another general embodiment, a system includes a processor; and logic in and/or executable by the processor, the logic being configured to cause the processor to: store raw or normalized video data from a data capture device in a computer accessible storage medium; analyze at least portions of the raw or normalized video data with a first analytic engine to: determine whether the raw video data is within a first set of parameters; and generate with the first analytic engine a first set of processor settings in response to determining the raw video data is not within the first set of parameters; process the raw or normalized video data with the first set of processor settings; and analyze at least portions of the processed data with a second analytic engine to determine whether the processed data is within a second set of parameters; generate with the second analytic engine a second set of processor settings to reprocess the raw or normalized video data in response to determining the processed data is not within the second set of parameters, send the second set of processor settings to the first analytic engine; and reprocess the raw or normalized video data with the first analytic engine using the second set of processor settings, and wherein the second set of parameters is different than the first set of parameters.

In still another general embodiment, a computer program product includes: a computer-readable storage medium having embodied thereon computer readable program code, the computer readable program code being executable by a processor, and configured to cause the processor to: store raw or normalized video data from a data capture device in a computer accessible storage medium; analyze at least portions of the raw or normalized video data with a first analytic engine to: determine whether the raw video data is within a first set of parameters; and generate with the first analytic engine a first set of processor settings in response to determining the raw video data is not within the first set of parameters; process the raw or normalized video data with the first set of processor settings; and analyze at least portions of the processed data with a second analytic engine to determine whether the processed data is within a second set of parameters; generate with the second analytic engine a second set of processor settings to reprocess the raw or normalized video data in response to determining the processed data is not within the second set of parameters, send the second set of processor settings to the first analytic engine; and reprocess the raw or normalized video data with the first analytic engine using the second set of processor settings, wherein the second set of parameters is different than the first set of parameters.

In even more general embodiments, a method includes invoking an image capture interface via a mobile device, the capture interface comprising a viewfinder represented on a display of the mobile device; analyzing a plurality of frames of video data captured via the capture interface, wherein the analyzing comprises determining: whether an object exhibiting one or more defining characteristics is depicted within the viewfinder; and whether the object depicted within the viewfinder satisfies one or more predetermined quality control criteria; and in response to determining a frame fails one or more of the predetermined quality control criteria, displaying an indication of the failure on the mobile device display; and in response to determining the object depicted within the viewfinder satisfies the one or more predetermined quality control criteria, one or more of: displaying an indication that the object depicted in the viewfinder exhibits the one or more defining characteristics; automatically capturing an image of the object, wherein the image is characterized by a resolution higher than a resolution of the video data; and automatically storing to a memory one or more of the frames in which the object satisfying the predetermined quality control criteria is depicted in the viewfinder.

Of course, the various embodiments set forth herein may be implemented utilizing hardware, software, or any desired combination thereof. For that matter, any type of logic may be utilized which is capable of implementing the various functionality set forth herein.

One benefit of using a mobile device is that with a data plan, image processing and information processing based on captured images can be done in a much more convenient, streamlined and integrated way than previous methods that relied on presence of a scanner. However, the use of mobile devices as document(s) capture and/or processing devices has heretofore been considered unfeasible for a variety of reasons.

In one approach, an image may be captured by a camera of a mobile device. The term "camera" should be broadly interpreted to include any type of device capable of capturing an image of a physical object external to the device, such as a piece of paper. The term "camera" does not encompass a peripheral scanner or multifunction device. Any type of camera may be used. Preferred embodiments may use cameras having a higher resolution, e.g. 8 MP or more, ideally 12 MP or more. The image may be captured in color, grayscale, black and white, or with any other known optical effect. The term "image" as referred to herein is meant to encompass any type of data corresponding to the output of the camera, including raw data, processed data, etc.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

In one embodiment, a plurality of remote networks are provided including a first remote network and a second remote network. A gateway may be coupled between the remote networks and a proximate network. In the context of the present network architecture, the networks, may each take any form including, but not limited to a LAN, a WAN such as the Internet, public switched telephone network (PSTN), internal telephone network, etc.

In use, the gateway serves as an entrance point from the remote networks to the proximate network. As such, the gateway may function as a router, which is capable of directing a given packet of data that arrives at the gateway, and a switch, which furnishes the actual path in and out of the gateway for a given packet.

Further included is at least one data server coupled to the proximate network, and which is accessible from the remote networks via the gateway. It should be noted that the data server(s) may include any type of computing device/groupware. Coupled to each data server is a plurality of user devices. Such user devices may include a desktop computer, laptop computer, hand-held computer, printer or any other type of logic. It should be noted that a user device may also be directly coupled to any of the networks, in one embodiment.

A peripheral or series of peripherals, e.g. facsimile machines, printers, networked storage units, etc., may be coupled to one or more of the networks. It should be noted that databases, servers, and/or additional components may be utilized with, or integrated into, any type of network element coupled to the networks. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

In one approach, a plurality of remote networks are provided including a first remote network and a second remote network. A gateway may be coupled between the remote networks and a proximate network. In the context of the present architecture, the networks, may each take any form including, but not limited to a LAN, a WAN such as the Internet, public switched telephone network (PSTN), internal telephone network, etc.

In use, the gateway serves as an entrance point from the remote networks to the proximate network. As such, the gateway may function as a router, which is capable of directing a given packet of data that arrives at the gateway, and a switch, which furnishes the actual path in and out of the gateway for a given packet.

Further included is at least one data server coupled to the proximate network, and which is accessible from the remote networks via the gateway. It should be noted that the data server(s) may include any type of computing device/groupware. Coupled to each data server is a plurality of user devices. Such user devices may include a desktop computer, lap-top computer, hand-held computer, printer or any other type of logic. It should be noted that a user device may also be directly coupled to any of the networks, in one embodiment.

A peripheral or series of peripherals, e.g., facsimile machines, printers, networked and/or local storage units or systems, etc., may be coupled to one or more of the networks. It should be noted that databases and/or additional components may be utilized with, or integrated into, any type of network element coupled to the networks. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

The workstations may include components such as a Random Access Memory (RAM), Read Only Memory (ROM), an I/O adapter for connecting peripheral devices such as disk storage units to the bus, a user interface adapter for connecting a keyboard, a mouse, a speaker, a microphone, and/or other user interface devices such as a touch screen and a digital camera (not shown) to the bus, communication adapter for connecting the workstation to a communication network (e.g., a data processing network) and a display adapter for connecting the bus to a display device.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

An application may be installed on the mobile device, e.g., stored in a nonvolatile memory of the device. In one approach, the application includes instructions to perform processing of an image on the mobile device. In another approach, the application includes instructions to send the image to a remote server such as a network server. In yet another approach, the application may include instructions to decide whether to perform some or all processing on the mobile device and/or send the image to the remote site.

In various embodiments, the presently disclosed methods, systems and/or computer program products may utilize and/or include any of the functionalities disclosed in related U.S. patent application Ser. No. 13/740,123, filed Jan. 11, 2013. For example, digital images suitable for processing in whole or in part using the presently disclosed methodologies, systems, etc. may be subjected to any image processing operations disclosed in the aforementioned Patent Application, such as page detection, rectangularization, detection of uneven illumination, illumination normalization, resolution estimation, blur detection, etc.

In various embodiments, the presently disclosed methods, systems and/or computer program products may utilize and/ or include any of the functionalities disclosed in related U.S. patent application Ser. No. 13/802,226, filed Mar. 13, 2013 and Provisional U.S. Patent Application No. 61/780,747, filed Mar. 13, 2013. For example, digital images suitable for processing in whole or in part using the presently disclosed methodologies, systems, etc. may be subjected to any classification and/or data extraction operations disclosed in the aforementioned Patent Applications, including for instance classifying objects depicted in a digital image according to type based at least in part on characteristics of the object, performing custom-tailored image processing using information about the object characteristics and/or object class, building and/or using feature vectors to perform classification, building and/or using feature vectors to develop a data extraction model for the object and/or object class(es), using data extraction models to extract data from digital images, etc.

In some embodiments, and entirely separate from the "extraction" operations and techniques disclosed herein, it may be useful to perform the image capture, analysis and processing as described, and subsequently analyze the resulting image with a targeted optical character recognition (OCR) operation. For example, a user may define a portion of a processed image upon which to perform the OCR, and may hover a window over that portion of the processed image. Then, the user may receive OCR results either pursuant to a request submitted by the user (e.g. to OCR the windowed region of the image) or automatically in near- or real-time in response to the window position (e.g. a constantly-active OCR process is performed on the image portion(s) falling within the OCR window, and any recognized characters may be displayed in real-time on the mobile device.

Preferably, the windowed OCR approach may be utilized to determine, verify (e.g. confirm an observed value obtained via OCR by comparing to a reference value), and/or validate (e.g. as mentioned above and further described in related U.S. Pat. No. 8,345,981 and/or U.S. patent application Ser. No. 14/175,999 (filed Feb. 7, 2014); Ser. No. 14/176,606 (filed Feb. 7, 2014) and/or Ser. No. 14/078,402 (filed Nov. 12, 2013)) text characters depicted in the depicted object. Even more preferably, the windowed OCR approach may be utilized to specifically determine "identifying information," e.g. as defined and described in related U.S. patent application Ser. No. 14/220,016 (filed Mar. 19, 2014).

For example, in one approach classification may include determining whether a depicted object belongs to one or more predetermined classes, and if not, requesting user input defining a new class. This approach may be augmented in some embodiments by automatically determining defining characteristics for the new class based on the user input, the object depicted in the image(s), a combination thereof, and/or any other relevant descriptive information as would be appreciated by skilled artisans. In this manner, it is possible for the present systems to be extended to unknown object types based on minimal input from the user and defining characteristics determined based on user input, image data, and/or a combination thereof.

In more approaches, the presently disclosed methods, systems, and/or computer program products may be utilized with, implemented in, and/or include one or more user interfaces configured to facilitate performing any functionality disclosed herein and/or in the aforementioned related Patent Application, such as an image processing mobile application, a case management application, and/or a classification application, in multiple embodiments.

In still more approaches, the presently disclosed systems, methods and/or computer program products may be advantageously applied to one or more of the use methodologies and/or scenarios disclosed in the aforementioned related Patent Application, among others that would be appreciated by one having ordinary skill in the art upon reading these descriptions.

It will further be appreciated that embodiments presented herein may be provided in the form of a service deployed on behalf of a customer to offer service on demand.

Video Capture and Discovery

In some embodiments, via a mobile application a user may capture video, analyze video and then store a full still photo resolution frame or frames. To facilitate computational efficiency, it is possible to use video data with a lower resolution than the full still photo resolution frame(s) for discovering objects depicted in the frame(s). Upon discovering a target object, various embodiments may use one or more high resolution photo frame for further processing.

For example, low-resolution video capture and processing of small documents like drivers licenses or business cards or checks is possible at least in part because some embodiments of capture may zoom in so close that even the low resolution video feed produces sufficient resolution for discovering the small document in the object.

In one approach, a capture component of a mobile application within the scope of the present disclosure may facilitate a user invoking a mobile device camera in a video capture mode. The user may provide input instructing the capture component to initiate capturing video data. The application, in response to receiving the "begin capture" instruction, in response to displaying a prompt to the user instructing the user to prepare for capturing data, etc. may query an on-device hardware such as an accelerometer and/or gyroscope for stability information. Upon detecting conditions from the on-device hardware that correspond to a stability condition, the application may force an autofocus, capture frames, and then spawn a background process to invoke and/or conduct image processing.

Moreover, the captured frames may be characterized by a resolution higher than a resolution of the video stream (and corresponding data) displayed to the user while performing the stability determination, focus, object discovery, etc. In some embodiments, a user reviewing a video stream may be simultaneously presented with a corresponding high-resolution frame of image data to review and/or provide feedback and user input relating to capture and/or processing using the mobile device/application.

In more embodiments, the capture component may be further improved to classify objects by type and selectively invoke the capture operation. For example, capture may be invoked only upon determining the capture field encompasses an object of interest, such as a document, an animal, a vehicle, a person, a particular type of document, animal, vehicle, etc.

In still more embodiments, the capture component may be further improved to determine classification of objects and/or detect characteristics of objects, and selectively invoke the capture operation in response to detecting an expected type of characteristic in the object. For example, a video stream of a capture field encompassing a document may be utilized to classify the type of document, and based on the document classification, the video stream may be utilized to determine whether the document contains particular characteristics, such as particular content (e.g. particular text such as a name, address, account number, a particular symbol such as a barcode, logo, a photograph, etc. as would be understood by one having ordinary skill in the art upon reading the present descriptions).

By providing additional classification capability in this vein, the mobile application may avoid undesirably capturing video data upon receiving information indicative of a stability condition, but where the capture field is focused on an object of no interest for subsequent processing (e.g. the mobile application would be capable of selectively avoiding capturing video of a dog as part of an overall document-processing workflow). Preferably, the classifying operation comprises a high-speed initial analysis to detect the existence of the object of interest in the video frame. However, classification may include any functionality discussed in related U.S. patent application Ser. No. 13/802,226.

In various approaches, upon determining a stability exists, achieving focus, and determining the capture field encompasses a desired capture target, the mobile application may invoke one or more processing operations. As input to the processing operations, the mobile application may provide either the video stream, frames from the video stream, and/or high resolution equivalents thereof.

Additional embodiments may include providing functionality to determine a minimum resolution necessary to perform object discovery, image processing, or any of a variety of downstream processing operations so that a mobile application may facilitate a user capturing the requisite data for subsequent processing in the most computationally efficient manner possible. For example, a user may invoke a training component of the mobile application, and directed to capture video data corresponding to a particular object or object type; the user may be directed to perform the capture operation for a plurality of repetitions, and with or without the user's knowledge, each repetition may capture video data at a different resolution so as to provide a diverse array of video data representing the object in a range of resolutions.

The mobile application may transparently perform object discovery, image processing, etc. using one or more of the plurality of different-resolution video data samples. Some of the samples may produce acceptable results, while others may not. The application may utilize information regarding the results achieved using various input samples to determine a resolution for subsequent use when capturing and/or performing various processing operations for objects corresponding to the particular object or object type for which training was performed.

In one approach, a resolution sufficient for object discovery is any resolution that enables detection of contrast between the foreground of the image, e.g. regions of the image corresponding to the object, and the background of the image, e.g. regions of the image not corresponding to the object. Detecting contrast includes detecting the existence of a subregion of the image containing a potential or "candidate" object boundary. For certain objects, a resolution in a range from about 25 dots per inch (DPI) to about 50 DPI may be sufficient to detect contrast and therefore object boundaries. Initial processing such as object discovery may be performed using these relatively low-resolution images to process data in a highly efficient manner. Additional processing may be performed utilizing the low-resolution image or a corresponding high-resolution image according to the requirements and/or desired result of the process.

In some approaches, upon detecting an object from the video stream data, a corresponding high resolution image may be captured and cropped to remove some or all background from the image.

In further embodiments, user feedback may be requested, obtained, and/or used to facilitate capturing and/or processing of video data as described herein. For example, upon performing object discovery on video data, various frames of the video data in which an object was reportedly discovered may be presented to the user. The user may confirm, modify or negate the discovery result determination. Based on the user input, the discovery algorithm may be modified. In another example, based on the user input a minimum capture resolution may be determined, where the various frames correspond to different capture resolutions, as discussed above in regard to training the capture component.

Super-Resolution

In further approaches, it may be advantageous to utilize data from multiple frames of image and/or video data to generate a single, superior composite image for processing. For example, a higher resolution image may be composed from multiple relatively low-resolution frames of video data. Alternatively, multiple high-resolution images may be synthesized into an even higher-resolution image. Further still, a relatively low-resolution region of an otherwise high-resolution image, or a blurred region (for example as may be caused by unstable capture conditions) of an otherwise clear image may be improved by synthesizing data from multiple image and/or video frames to resample the low-resolution or blurred region and generate a high-quality (i.e. high resolution/clarity) composite image. In some embodiments, the frames may represent binary image data (i.e. corresponding to two-tone or "bitonal" images), which may be compared, merged, and/or utilized to extract data from the image, such as text characters on a document.

Metadata

Retrieving, receiving, and providing metadata, as well as associating metadata with digital image data is another advantageous functionality within the scope of the presently described mobile application. Preferably, the mobile application facilitates obtaining and associating all available metadata with the corresponding image data. For example, in one scenario a user captures a video stream and/or image data corresponding to a document. The document may be detected within the image data and classified as a particular document type. Based on the classification, metadata may be retrieved from a knowledge base comprising a plurality of document classes and associated metadata. The retrieved metadata may then be associated with the document image data and/or video data in any suitable manner.

Metadata may include any information that is relevant to an object, an image of an object, etc. With continuing reference to the exemplary scenario involving a document as the object, illustrative metadata may include the document type, text content in the document, context of the text (e.g. positional location, font type, color, size, etc.) page size, page resolution, color bit depth, etc. In other embodiments, the metadata may correspond to instructions for subsequent processing of the data, such as particular parameters for manipulating image size, color profile, etc., particular parameters for extracting data from the image, etc. as would be understood by one having ordinary skill in the art upon reading the present descriptions.

Image Authentication

In some embodiments, various types of data, including raw and/or processed image data, metadata associated with image data, etc. as would be understood by one having ordinary skill in the art reading the present descriptions can include and/or be associated with authentication data. Authentication data may be utilized to very quickly and efficiently determine a status of data, such as whether a particular file has been altered from a previous state (e.g. by adding or removing metadata to an image file, by editing metadata associated with an image file, by processing or re-processing image data with different parameters, etc.).

In one embodiment, image authentication may include creating one or more authentication strings from a buffer in memory. The string may be any length, but is preferably a 127-byte string in at least some approaches. More particularly, authentication may involve compressing an image (which may include image data and/or associated metadata) to a memory buffer and creating the authentication string or strings for/from one or more portions of the buffer. Creating the authentication string(s) may include encoding data in the portions of the buffer into the authentication string, in one embodiment. Any form of encoding may be employed.

For example, authentication may generate an authentication string for only the image, for only the metadata, for the image and the associated metadata, etc. The authentication strings may be inserted into, appended to, or associated with the buffer in various approaches, and are preferably added to the buffer as one or more tags, at which point the buffer is dumped to physical memory (e.g. to disk) as a file. Notably, these authentication approaches may be equally applied to any format of image and/or metadata, including any compression format allowing metadata tags, such as JPEG or TIFF formats.

Additionally and/or alternatively, the authentication string may be embedded into the image itself, for example using a steganographic approach.

Data having authentication strings as described above can be subsequently authenticated to determine whether the data has been altered since the authentication strings were created. In particular, the file having the authentication tags may be read from physical memory into a memory buffer, and the encoded authentication strings may be extracted from the corresponding tags. These strings may be decoded and compared to the corresponding portion(s) of the buffer from which the encoded authentication string was generated. If the decoded authentication string and the portion of the buffer used to generate the authentication string match, the portion of the buffer used to generate the authentication string has not been altered, indicating that the entire file is unlikely to have been altered either. By utilizing multiple authentication strings (multiple portions of the buffer), determining whether a file has been altered may be performed with higher confidence, albeit at the cost of computational efficiency.

In one exemplary approach, video capture and processing may be performed in a manner substantially similar to the flow diagram shown below. As noted with regard to other flow diagrams presented above, this illustrative example is in no way limiting, but rather provided to facilitate better understanding of the inventive concepts presented herein.

Video Capture User Interface

In still more embodiments, the presently described systems, methods, and computer program products may be implemented via one or more user interfaces configured to facilitate capturing and processing information using video data.

The user interfaces may further enable a user to easily perform capture and processing operations using video data, as well as review the results of such capture and/or processing operations in real-time or near real-time. For example, each time that image and/or video data is captured and/or processed, a thumbnail corresponding to the image and/or video data may be produced and presented to a user. Generating the thumbnail may be a process that is performed asynchronously in the background, in some approaches. Via the thumbnail, a user may review the results of what was captured and/or processed. If the user is dissatisfied with the result, or the result is otherwise determined to be unacceptable, e.g. according to one or more predefined quality assurance metrics, a user interface may facilitate re-capturing and/or augmenting the originally captured data.

In addition, user interfaces may be provided to enable and/or facilitate user review of capture and/or processing results, for example at the end of a capture-and-process session. For instance, in one approach a user, upon completion of a capture and/or processing workflow (e.g. video and/or image data have been captured and at least one processing operation performed on the data), the user may be presented with an opportunity to review the result of the workflow.

In another approach, user review may be enabled during the video capture operation. For example, a user initiates the video capture functionality of a mobile application, and begins capturing video data. As described above, the capture operation includes preprocessing such as stability determination and/or object discovery. In the course of capturing the video data, an object in the capture field is detected and an indication of the discovery is presented to the user (for example the appearance of a bounding box within the capture field changing color from red to green). A high-resolution image, thumbnail, etc. is optionally captured upon discovering the object and determining the existence of a stability condition, and the image may be presented to the user for immediate review within the video capture user interface. Upon reviewing the image, thumbnail, etc., the user may indicate the acceptability of the captured image, generated thumbnail, etc. If the user indicates the image, thumbnail, etc. is acceptable, then the video capture user interface may automatically terminate the capture operation, or optionally may direct the user to terminate the capture operation. In this manner, user review may be utilized to minimize the occurrence of unnecessary capture and/or processing operations, such as may be caused by a user continuing to perform a capture operation after a suitable high-resolution image has been captured and/or processed in a manner that satisfies requirements for downstream processing, such as image quality, image format, etc.

Tracking

In various approaches, the presently disclosed techniques benefit from the advantage of real-time (or near-real time) latency. In other words, as a user interacting with a mobile device conducts a capture operation, an analysis, etc. as disclosed herein, the underlying processes conducted to accomplish each operation may be performed in parallel, i.e. for multiple objects simultaneously, and in a near-real time manner. The computational cost has been reduced to an extent necessary to provide real-time information regarding object(s) depicted in a mobile device viewfinder, and represents a major advantage to the user when compared to existing techniques that require discrete capture, analysis, and submission techniques.

As a result, one of the advantageous embodiments of real-time capture, processing, analysis, and etc. is the ability to "track" objects throughout the course of performing the presently disclosed techniques. By "tracking" it should be understood that an object within a mobile device field of view may be identified and/or analyzed, and the identification/analysis may remain valid and/or present in a series of discrete frames of image and/or video data because the methodology is capable of monitoring the position of objects upon detecting those objects, and continuously analyzing the detected objects to provide useful information.

From the user perspective, tracking typically is embodied in the form of a bounding border (e.g. box, as described herein) being maintained with respect to a detected object, even as the mobile device is moved in three-dimensional space during the capture operation (causing the detected object to apparently move from the perspective of the mobile device's reference point), and/or even as multiple objects are present in the field of view. Indeed, tracking is capable of monitoring any number of objects that may be defined according to characteristics such as set forth herein.

As will be appreciated by a skilled artisan upon reading the present disclosures, any of the raw and/or processed data, such as image data, video data, etc., may be associated with various metadata, may be associated with other raw or processed data, etc. Moreover, any of the presently disclosed functionalities may be applied to image capture and processing, video capture and processing, etc.

In a preferred approach, for example, tracking comprises one or more of: repositioning or redefining the bounding border to surround the periphery of the object in each of the frames where the tracked object is depicted within the viewfinder; and repositioning or redisplaying the indication that the object depicted in the viewfinder exhibits the one or more defining characteristics.

Optionally, the tracking further comprises receiving real-time feedback from the mobile device. The real-time feedback is based at least in part, and ideally based entirely, on one or more measurements performed using mobile device hardware components, for example any one or more of: a camera, an accelerometer, a gyroscope, and a clock.

According to some techniques, the real-time feedback may include stability feedback including an angle of orientation of the mobile device being within a predetermined orientation range; and a motion vector of the mobile device having a magnitude less than a predetermined threshold.

In another approach, the motion vector of the mobile device is determined based on real-time feedback received from the camera, and not determined based on feedback from the mobile device accelerometer. In short, the tracking techniques are capable of calculating a magnitude and direction of a velocity with which a camera is being moved through three-dimensional space independent of any change in acceleration. As a result, the device is freed from reliance on an accelerometer to determine motion vectors (such as would be the case with a constant velocity).

Yet another advantage conferred by use of video data with the present inventive techniques is the capacity to generate composite images from a plurality of frames. In one context, this advantage is leveraged as discussed below with respect to super-resolution, which may be used to clarify blurred or grainy regions of an otherwise high-quality image, for example.

In the additionally advantageous technique, composite image synthesis may be leveraged to effectively image an object that is otherwise too large to capture with sufficient detail for the desired application using image data alone. For example, consider the case of a long document such as a receipt or legal form. The document depicts a plethora of informative text, albeit in a relatively small size. In order to capture the entire document in a single image, a user would have to distance the document so far from the camera that the quality of the informative text would be so degraded that subsequent extraction and use of the information would be impractical or impossible.

Accordingly, it is an additional aspect of the presently disclosed inventive techniques that a long document may be captured using video data, and the various frames of the video data may be "stitched" together to form a composite image depicting the entire object that was too large to fit in a single shot with sufficient clarity. Particularly preferred are embodiments where the composite image retains the high level of specificity and detail otherwise achievable only by zooming in on the object to an extent that capturing the entire object in a single image is impossible.

Put another way, in one approach the composite image is characterized by a height and a width. The composite image height is greater than or equal to a height of any single frame of the video data, and the composite image width is greater than or equal to a width of any single frame of the video data. Each of the synthesized frames of the video data depicts a portion of the object, and the composite image depicts the entire object.

Moreover still, synthesizing the composite image includes detecting a first feature (e.g. top border of a page) of the object depicted in the viewfinder; automatically initiating a capture operation in response to detecting the first border of the object; capturing one or more of high-resolution image data and low-resolution video data via the automatically initiated capture operation; detecting a second feature (e.g. bottom border of a page) of the object depicted in the viewfinder; capturing one or more of high-resolution image data and low-resolution video data via the automatically initiated capture operation; and automatically terminating the capture operation in response to detecting the second feature of the object.

According to the foregoing approach, for example, a user may initiate the stitching operation by capturing a long document using a slow pan from top to bottom. As discussed in further detail above, windowed OCR may be particularly advantageous to utilize in combination with a stitching-based approach to capture, determine, analyze, etc. textual information depicted in a long document or other large object incapable of being captured with a desired level of detail or resolution in a single image or video frame. For example, in some approaches since a user will capture various partial images from which to form the composite image, and this capture process generally (but not necessarily) involves a relatively smooth, slow panning of the mobile device camera with respect to the object being imaged, it will be possible for the user to simultaneously capture the large object and perform some real-time (or near-real-time) windowed OCR in unison. The windowed OCR results may be utilized independently or in conjunction with any other defining characteristics of the object to determine characteristics of the object. For example, in one approach an object classification or pertinent information from the object may be determined contemporaneous to capturing the video and/or image data for subsequent use in generating the composite image.

In various approaches, a suspected object classification could be determined based on the defining characteristics of the object, and validated using windowed OCR results, e.g. presence of a feature, value or string known to be present in objects belonging to a particular classification. Similarly, an object classification could be determined solely based on windowed OCR results rather than using defining characteristics from the object as described above. Moreover still, in some embodiments both the defining characteristics of the object and the windowed OCR results may be taken into consideration when determining a classification of the object.

For example, in one approach an object classification may be determined independently based on (1) windowed OCR results and (2) the defining characteristics of the object. The independently determined results may be assigned a relative weight, confidence value, etc., and analyzed further in order to make an overall determination with respect to the object classification.

For instance, various object types may be more readily classified according to either textual information depicted on the object, or from defining characteristics of the object itself. Documents may, for example, be more readily or accurately classified based on textual information that may be determined using a windowed OCR approach, while objects depicting an identifying mark such as a logo, emblem, barcode, seal, etc. may be more readily or accurately classified based on defining characteristics such as object shape, contour, dimensions, color profile, etc. as would be understood by one having ordinary skill in the art upon reading the present descriptions.

Nonetheless, it may be useful to utilize multiple types of information in determining a classification of a particular object, even if it is known a priori that the object is more readily or accurately classified based on one specific type of information. In such cases, the form or forms of information that are known to produce facile, accurate, reliable classification of a particular object may be utilized to predict an object classification, and assigned a relative weight (e.g. defining characteristics as defined herein may be utilized and assigned a weight of 0.75 on a 0-to-1 scale).

Similarly, other form(s) of information helpful in determining object classifications, but perhaps to a lesser degree than the preferred information type, may be utilized to predict the object classification, and assigned relatively low weights compared to the preferred information type (e.g. textual information determined by windowed OCR may be used to predict the object classification, and the prediction assigned a weight of 0.25 on a 0-to-1 scale).

Returning now to the concept of composite image synthesis, in order to determine whether and precisely how two images should be stitched to form the composite image, in one approach the synthesizing comprises: performing at least one homography transformation on two or more of the frames of the video data, and aligning at least portions of the two or more frames of the video data based at least in part on the homography transformations.

Several exemplary methods commensurate in scope with the present disclosures will now be discussed with particular reference to FIGS. and. The exemplary embodiments presented below are not to be considered limiting on the scope of the instant disclosure, but rather are provided to illustrate possible implementations of the subject matter discussed herein.

An exemplary method for performing functions and achieving results described herein will now be described, according to one embodiment. The method may be performed in any suitable environment. Moreover, the method may include any number of additional and/or alternative operations aside from those specifically set forth below, in several approaches. The operations of method may be performed in any suitable order that would be comprehended by one having ordinary skill in the art upon reading this disclosure.

A digital video data captured by a mobile device is received.

Any or all of the following operations may be performed using a processor, which in various embodiments may be a processor of the mobile device, a processor of a remote device such as a server or another mobile device, a processor of one or more resources of a cloud computing environment, etc. Operations may be performed using any combination of such device(s) and/or processors thereof, in various embodiments.

In one approach, a plurality of frames of the digital video data are analyzed.

In another approach, one or more frames are identified based on the analysis, the identified frames satisfying one or more predefined quality control criteria.

In still another approach, at least one frame satisfying one or more of the predefined quality control criteria is processed.

In some approaches, predefined quality control criteria may include a minimum illumination level, e.g. an average illumination above a certain threshold; a maximum illumination level, e.g. an average illumination below a certain threshold; a minimum illumination evenness, e.g. an illumination deviation from some predefined value, from an average illumination, etc. being below a certain threshold; a minimum resolution; a minimum sharpness, e.g. an amount of blur below a certain threshold; and a minimum projection, i.e. the impact of projective effects such as angle of camera orientation, fish-bowling, etc. is below a certain threshold, which may be determined based on metadata collected during the capture operation or characteristics of the image.

Quality control criteria may further include, for example, a threshold visibility criterion or any other suitable indication of whether the document is wholly or partially visible), as may be embodied in a threshold number of expected edges, corners, or other defining features are discernable within the viewfinder region and/or are sufficiently within the viewfinder region (e.g. first embodiment is a binary yes/no, second embodiment is a further test to see if there is sufficient space around each edge of the object, etc. Further still, quality control criteria may in various approaches include a presence of glare; and an object classification.

For example, as a representation of a truly rectangular document may be analyzed to determine the rectangular "character" of the depicted document, which may appear trapezoidal due to imperfect capture angle. Images depicting a document whose appearance deviates too much from "rectangular" may be ignored. Determining whether a shape is substantially rectangular, such as a shape whose sides correspond to edges of a document, may be accomplished using any known means in the art, and in one embodiment may involve performing one or more transformations.

In more approaches, the method may additionally and/or alternatively include: determining whether the one or more frames satisfying the one or more predefined control criteria correspond to a high-resolution image stored on the mobile device; processing the high-resolution image upon determining the one or more frames satisfying the one or more predefined control criteria correspond to the high-resolution image. In other words, if a mobile device has a high resolution image of a document stored in memory, and a video stream captures a relatively low-resolution but otherwise acceptable frame or frames of the document, it may be preferable to utilize the high-resolution image in subsequent processing, but more computationally efficient to capture, analyze and/or pre-process the relatively low-resolution frame(s) corresponding to the high resolution image.

In various embodiments particularly directed to document processing, the digital video data comprises a digital representation of a document. In this scenario, the method may also include capturing the digital video data using a camera of the mobile device and detecting the digital representation of the document.

Some approaches including super-resolution capabilities as described herein may involve synthesizing at least a portion of two or more frames of the digital video data; and generating a composite image based on the synthesizing. At least a portion of the composite image is preferably characterized by a relatively higher resolution than a resolution of any of the two or more frames of the digital video data from which the composite image was synthesized. The composite image may be utilized to perform document detection (or object discovery in the case of objects other than documents).

Selective Auto-Capture

Also within the scope of the present disclosure is selective auto-capture functionality, which in one embodiment may be implemented in whole or in part as a method. The method may be performed in any suitable environment. Moreover, the method may include any number of additional and/or alternative operations aside from those specifically listed below, in several approaches. The operations of method may be performed in any suitable order that would be comprehended by one having ordinary skill in the art upon reading this disclosure.

A mobile application is invoked, preferably using a processor of a mobile device. The mobile application may be invoked in any suitable manner, such as by interacting with a user interface of the mobile device, issuing a voice command, pressing a button, etc.

A video capture interface of the mobile application is invoked. The video capture interface may be invoked expressly by a user, for example by interacting with a button or user interface displayed on the mobile device screen. Alternatively, the video capture interface may be invoked automatically, either as part of a predetermined routine, in response to a precondition being satisfied (such as a prior process completing execution), etc., in various approaches.

User input is received via the capture interface. The user input may preferably direct the mobile application to invoke a capture operation, for example using a capture component of a mobile device.

Real-time feedback is requested via the mobile device. The real-time feedback may relate to any relevant portion of video capture and/or processing, and in one preferred embodiment real-time feedback relates to invoking the capture operation, such as one or more characteristics of data captured via the capture operation, parameters for performing the capture operation, characteristics of a capture component to be used in performing a capture operation, such as an orientation and/or acceleration of a mobile device (which may be determined using integrated hardware components such as a gyroscope, an accelerometer, etc.), information regarding the result of a capture operation, suitability of captured data for subsequent processing, etc.

In one particular embodiment, operation includes requesting stability information from one or more hardware components integrated into the mobile device. The capture interface transparently requests mobile device acceleration data from an integrated accelerometer in response to receiving the user input directing the capture interface to invoke the capture operation. The capture interface may also transparently request mobile device orientation data from an integrated gyroscope in response to receiving the user input directing the capture interface to invoke the capture operation. Upon receiving the requested acceleration data and orientation data, the data are compared to predefined stability-threshold criteria previously determined to correspond to a stability condition, i.e. conditions that typically result in capturing image and/or video data of sufficient quality for downstream processing. The comparison result may be utilized to determine whether the stability condition exists, and data may be captured only upon determining the stability condition exists to maximize the probability that any image captured via the capture interface is suitable for the desired downstream processing.

Real-time feedback is received. As described in further detail below, the real-time feedback may be utilized to facilitate capturing video and/or image data under conditions likely to result in the video and/or image data being of sufficient quality for downstream processing. For example, real-time feedback may be utilized to ensure adequate illumination during capture, to minimize blur, glare, streaking, etc. to ensure the video and/or image data captures an appropriate object or object type, etc.

A capture operation is invoked via the capture interface upon determining the real-time feedback meets one or more predetermined criteria.

Real-time feedback is preferably based at least in part on one or more measurements performed using one or more integrated hardware components of the mobile device. Exemplary integrated hardware components include one or more of a camera, an accelerometer, a gyroscope, and a clock, but may include any hardware component integrated into a mobile device. Moreover, the real-time feedback may be in whole or in part an indication that a document is in a field of view of the camera integrated into the mobile device.

In a particularly preferred approach, the real-time feedback comprises stability feedback, such as an angle of orientation of the mobile device; an acceleration vector of the mobile device (e.g. a magnitude and a direction of acceleration per unit time of the mobile device), illumination of a field of view of the camera, illumination of a target object in the field of view of the camera, presence of glare in a field of view of the camera, etc. as would be understood by one having ordinary skill in the art upon reading the present descriptions. In one embodiment, illumination may be indicated by and/or derived from a minimum, maximum, average, or other statistical information regarding video stream and/or image intensity, brightness, etc., which may be obtained from the camera directly and/or with minimal preprocessing during the video stream capture, in various approaches. Similarly, glare may be indicated by one or more regions of the field of view being oversaturated. Oversaturation may be determined substantially as disclosed in related U.S. patent application Ser. No. 13/740,123.

Various implementations may utilize predetermined criteria such as the angle of orientation of the mobile device being within a predetermined orientation range; and the acceleration vector of the mobile device having a magnitude less than a predetermined threshold.

In one approach, invoking the capture operation includes invoking an autofocus operation using a camera of the mobile device; invoking an autoflash operation using the camera; and invoking a data acquisition operation using the camera.

In further approaches, data acquisition may include capturing data comprising one or more of a still image and digital video. The data may be or comprise a digital representation of a document, or a digital representation of a plurality of documents.

Still more embodiments within the scope of this disclosure may additionally and/or alternatively include determining whether the one or more predefined criteria are satisfied; and determining whether the capture operation captured data corresponding to the one or more predefined criteria being satisfied in response to determining the one or more predefined criteria are satisfied. For example, one embodiment may include determining that the mobile device captured data under conditions where the predefined criteria were satisfied, such as a minimum stability, proper angle of orientation, minimum movement in a particular direction, etc. as would be understood by one having ordinary skill in the art upon reading the present descriptions.

Exemplary methods within the scope of the instant descriptions may further encompass outputting an indication to the user via a display of the mobile device in response to determining the capture operation captured data corresponding to the one or more predefined criteria being satisfied. The indication preferably indicates the capture operation captured data corresponding to the one or more predefined criteria being satisfied. In one embodiment, the mobile device may display a bounding border, box or other overlaying shape around an object depicted in the mobile device camera's field of view.

The bounding box may change color upon determining that the capture operation has completed and captured data under conditions where the predefined criteria were satisfied. In one approach, the mobile device displays a white bounding box before detecting the object in the camera's field of view, a yellow bounding box upon detecting the object but before completing the capture operation under the desired conditions, and a green bounding box upon completing the capture operation under the desired conditions or a red bounding box upon failing to complete the capture operation under the desired conditions.

In this manner the user may be advantageously informed when to cease attempting to capture data via the capture interface of the mobile application and/or whether it will be necessary to repeat the capture operation for any object in the camera's field of view. Of course, in other embodiments where multiple documents are within the camera's field of view, the display may display several bounding boxes.

In another embodiment, the one or more bounding boxes may change in color in response to determining whether one or more of multiple documents within the camera's field of view have been recently captured and/or processed. For example, in one approach where a camera's field of view encompasses several objects such as documents, desirable capture conditions for each object may be achieved at a different point in time or several different points in time. Accordingly, it may be advantageous to determine when an object in the field of view has been captured according to desirable capture conditions, and cease attempting to capture that object while continuing to attempt capturing other object not yet captured under the desired capture conditions. Similarly, once all objects have been captured under the desired capture conditions, it may be useful to provide feedback indicating that all objects depicted in the field of view have been captured according to the desired capture conditions and the capture operation may be ceased.

In still another embodiment, where a camera's field of view encompasses several objects such as documents it may be advantageous to exclude or ignore objects in the course of the capture operation, for example if the object has been previously captured under suitable conditions or if the object has been previously processed by and/or according to processing intended to be performed using the data currently being captured.

An exemplary use case scenario will now be described, according to several embodiments. Those having ordinary skill in the art will appreciate upon reading these descriptions that the exemplary use case is provided for illustrative purposes, and is not intended to be limiting in any way. Other use cases are fully within the scope of the present descriptions, and may include utilizing any combination of features disclosed herein in any manner.

According to the exemplary use case scenario, the presently disclosed inventive concepts are embodied in a methodology substantially as represented by method as shown in FIG. The method may be performed in any suitable environment disclosed herein or as would be appreciated by one having ordinary skill in the art upon reading the present descriptions.

Additional and/or alternative embodiments of the aforementioned method include an operation where a capture interface is invoked via a mobile device. The capture interface includes a viewfinder, preferably a rectangular viewfinder defined by a targeting reticle displayed via the mobile device.

The method may also include operation(s) where a plurality of captured video data frames are analyzed to determine (1) whether an object exhibiting predetermined defining characteristics is wholly or partially depicted in the viewfinder region, and (2) whether the object satisfies quality control criteria. Defining characteristics and quality control criteria may include any feature as described herein, preferably those characteristics discussed above and in the related applications incorporated by reference with respect to image or object classification. Feature vectors represent data particularly suitable for use as "defining characteristics."

According to one method, and depending on whether the object exhibits the defining characteristics and satisfies quality control criteria, one or more responsive actions are taken in operation.

If the aforementioned criteria are met (object detected, quality acceptable), then an indication of this detection and/or quality status may be displayed to the user, e.g. via the device display. Preferably, these indications are displayed in real- or near-real time as the image analysis and/or processing are conducted.

On the other hand, if an object is not detected, or does not satisfy the quality control criteria, an indication of the failure(s) may similarly be displayed via the mobile device.

Further still, one or more images may be captured at a resolution higher than the resolution of the video data frames (to provide more and/or better raw data) and processed or stored. Similarly, those frames of video in which the object was depicted in the viewfinder and satisfies the quality control criteria may be archived, flagged, preserved stored to memory, etc. as would be understood by one having ordinary skill in the art upon reading the present descriptions.

The method may also feature one or more additional and/or alternative operations, in several approaches. For example, in one approach the captured image(s) and/or video frame(s) may be further processed. For example, processing may include classifying object(s) depicted in the image(s) and/or frame(s), extracting data from those object(s), tracking objects depicted in a video stream in real-time, displaying pertinent information to a user, etc.

Moreover, in particularly preferred embodiments, the presently disclosed techniques are fully capable of simultaneously performing any of the disclosed processing operations in near-real time as a video stream is captured, and furthermore capable of simultaneously performing the capture, analysis, and/or processing techniques disclosed herein in real-time or near-real time for multiple objects depicted within a single video stream (or image). This parallel, real-time functionality should be understood to apply equally to the operations discussed above, in various approaches.

In another use case illustration, a user starts a mobile application on their mobile device. The user is presented the option to invoke an optional module such as an "auto-assist" module or a "Mobile Capture Wizard" to assist the user in capturing high quality image data for subsequent processing. The user may interact with a button displayed on the mobile device display to invoke the optional "auto-assist" module or "Mobile Capture Wizard," for example. Alternatively, the module may be programmatically invoked or preset by the user, for example in a "settings" interface of the mobile capture application. In this use case, the user invokes the Mobile Capture Wizard.

Upon invoking the Mobile Capture Wizard, the user is presented with an interface via the mobile device display, the interface including several buttons which permit the user to selectively capture either in a "Photo" mode or a "Video" mode. The user interacts with the "Video" button indicating to the mobile application that the user wishes to capture a video stream. Alternatively, the capture mode may be programmatically invoked or preset by the user, for example in a "settings" interface of the mobile capture application.

After indicating the desire to capture a video stream, the user may interact with a camera button. In response, the Mobile Capture Wizard queries the device accelerometer and/or gyroscope to determine device orientation, and if the device is not oriented substantially as desired, (e.g. parallel to a flat, horizontal surface such as a desk, the ground, etc. for a document, or parallel to a vertical surface such as a poster, automobile surface depicting a Vehicle Identification Number, etc.), user feedback may be presented to the user via the mobile device display, e.g. in the form of a transparent screen, the feedback indicating improper device orientation. The user feedback may overlay the capture interface viewport so that the user cannot capture an image until proper device orientation is achieved. Proper device orientation may be programmatically determined and/or preset by a user to include any device orientation (e.g. as an angle) in a settings interface.

As the user moves the orientation of the device to a "desired orientation," the mobile application periodically queries the device accelerometer and/or gyroscope to determine the actual orientation of the device. During this operation an on-screen user feedback is displayed indicating to the user how the orientation of the device should be adjusted for optimal capture orientation.

Once the orientation falls within a predetermined tolerance range for aspect ratio correction and normalization, the transparent overlay screen disappears and the mobile application begins analyzing, in real-time, video data gathered from the mobile device camera to detect page boundaries.

Upon detecting page boundaries, the mobile device optionally again periodically checks for device stability, and upon determining that the device is sufficiently stable according to predetermined tolerance thresholds, additional user feedback is provided indicating suitable conditions exist for capturing the detected page. For example, user feedback may be provided in the form of a yellow bounding box displayed around the detected page boundaries.

Whether or not the optional second orientation and/or stability detection operation is performed, upon determining that the device is stable, properly oriented, and a page has been detected, user feedback is displayed via the mobile device display to indicate conditions suitable for capturing high-quality image data exist. The mobile application then proceeds automatically to capturing the image of the document depicted in the capture interface viewport.

The mobile application capture then forces an auto-focus operation using the device camera, and captures the video frame containing the detected page, which may be a high resolution version, if available, of the original video frame containing the detected page. Alternatively, one or more video frames, including the relatively low-resolution original video frame in which the page was detected may be captured. The mobile application displays the captured image in real-time, either directly in the capture interface or in another interface displayed on the mobile device display after completing the high-resolution capture operation.

Full image processing (which may include any or all of the image processing operations disclosed in the related U.S. patent applications referenced above) is initiated by the mobile application as a background, asynchronous thread. In addition, a quality control process module is simultaneously initiated and an on screen indication is given as feedback regarding document illumination and/or blur. Once the asynchronous background processing is complete, the displayed image is refreshed (e.g. top to bottom on the mobile device display) with the processed image. Notably, the image processing may be performed using a processor of the mobile device, a processor of a remote device such as a server, or any combination thereof.

The mobile application may either automatically save the original and processed image, or prompt a user for instructions regarding whether to save the original and/or processed image, and save the images indicated by the user accordingly. The data may be synchronized with a host cloud or on-premises system for storage, further processing and/or subsequent re-use.

In various embodiments, saving the image, whether the original image, processed image, or any variations thereof, may include saving a file combined with any image-related metadata, such as classification results, extraction results, or any environmental metadata such as geo-position tagging, date/time stamping, etc. all within one single file (e.g. a printable document format (PDF) e-form). This type of save operation may be optionally invoked by the user in real-time or in a settings interface. Alternatively, the image data may be saved as-is without being associated with metadata.

Various embodiments may additionally and/or alternatively include displaying a capture result preview via a display of the mobile device; and receiving user input in response to the capture preview. Moreover, in at least one embodiment the preview depicts at least one object captured via the capture operation.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

For example, in myriad illustrative approaches, a method, a system configured to execute logic and perform a method, and/or a computer program product comprising computer readable instructions configured to cause a processor to perform a method may include any one or more of the following features. Similarly, various embodiments may exclude some or all of the features set forth below. In general, the following features may be combined in any suitable manner that would be appreciated by one having ordinary skill in the art upon reading the present descriptions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
  storing raw or normalized video data from a data capture device in a computer accessible storage medium;
  analyzing at least portions of the raw or normalized video data with a first analytic engine to:
    determine whether the raw video data is within a first set of parameters; and
    generate with the first analytic engine a first set of processor settings in response to determining the raw video data is not within the first set of parameters;

processing the raw or normalized video data with the first set of processor settings to generate processed data; and
analyzing at least portions of the processed data with a second analytic engine to determine whether the processed data is within a second set of parameters;
generating with the second analytic engine a second set of processor settings to reprocess the raw or normalized video data in response to determining the processed data is not within the second set of parameters,
sending the second set of processor settings to the first analytic engine; and
reprocessing the raw or normalized video data with the first analytic engine using the second set of processor settings, and
wherein the second set of parameters is different than the first set of parameters.

2. The method as recited in claim 1, wherein at least one of the first set of processor settings and the second set of processor settings relate to one or more image characteristics selected from: brightness, contrast, gamma, erosion, orientation, segmentation, saturation, color rendering, resolution, warp angle, skew angle, despeckling, dilation and sequence detection.

3. The method as recited in claim 2, wherein both of the first set of processor settings and the second set of processor settings relate to the one or more image characteristics selected from: brightness, contrast, gamma, erosion, orientation, segmentation, saturation, color rendering, resolution, warp angle, skew angle, despeckling, dilation and sequence detection.

4. The method as recited in claim 1, wherein the second set of parameters comprises a predetermined metric.

5. The method as recited in claim 1, further comprising: sending metadata relating to the raw or normalized video data to the first analytic engine.

6. The method as recited in claim 5, wherein the metadata are sent to the first analytic engine with the second set of processor settings.

7. The method as recited in claim 5, wherein the processing is further based at least in part on the metadata.

8. The method as recited in claim 5, wherein the reprocessing is further based at least in part on the metadata.

9. The method as recited in claim 5, further comprising storing the metadata in the computer accessible storage medium, the metadata relating to one or more of the raw or normalized video data and the processed data.

10. The method as recited in claim 5, wherein the metadata comprise one or more of:
a tag identifying the stored raw or normalized video data;
a tag identifying a subsection of the stored raw or normalized video data;
a tag identifying a storage location of the stored raw or normalized video data;
an acquisition timestamp corresponding to the stored raw or normalized video data;
a sequence number;
an indicator corresponding to a beginning of a video data band;
an indicator corresponding to an end of the video data band; and
a pointer corresponding to a second video data band.

11. The method as recited in claim 5, further comprising displaying the metadata and video data relating to the metadata; and
receiving user input relating to one or more of the displayed metadata and the displayed video data relating to the metadata.

12. The method as recited in claim 1, wherein at least one of the analyzing at least portions of the raw or normalized video data with the first analytic engine and the analyzing at least portions of the processed data with the second analytic engine comprises performing one or more analyses selected from:
page boundary detection;
streak detection;
page border detection;
page border shadow detection;
blank page detection;
color representation conversion;
luminescence measurement;
grayscale intensity histogram analysis;
color intensity histogram analysis;
geometric analysis; and
textual orientation analysis.

13. The method as recited in claim 1, wherein at least one of the analyzing at least portions of the raw or normalized video data with the first analytic engine and the analyzing at least portions of the processed data with the second analytic engine comprises performing one or more analyses selected from:
streak detection;
blank page detection;
shadow detection;
color representation conversion;
luminescence measurement;
grayscale intensity histogram analysis; and
color intensity histogram analysis.

14. The method as recited in claim 1, wherein the processing comprises applying at least one of a detection orientation algorithm, a detect bleed-through algorithm, a background smoothing algorithm, and a detection of scanned page boundaries algorithm.

15. The method as recited in claim 1, wherein the reprocessing comprises applying at least one of a detection orientation algorithm, a detect bleed-through algorithm, a background smoothing algorithm, and a detection of scanned page boundaries algorithm.

16. A method, comprising:
invoking an image capture interface via a mobile device, the capture interface comprising a viewfinder represented on a display of the mobile device;
analyzing a plurality of frames of video data captured via the capture interface, wherein the analyzing comprises determining:
whether an object exhibiting one or more defining characteristics is depicted within the viewfinder; and
whether the object depicted within the viewfinder satisfies one or more predetermined quality control criteria; and
in response to determining a frame fails one or more of the predetermined quality control criteria, displaying an indication of the frame failure on the mobile device display; and
in response to determining the object depicted within the viewfinder satisfies the one or more predetermined quality control criteria, one or more of:
displaying an indication that the object depicted in the viewfinder exhibits the one or more defining characteristics;
automatically capturing an image of the object, wherein the image is characterized by a resolution higher than a resolution of the video data; and
automatically storing one or more of the frames to a memory, the frame(s) being frame(s) in which the object satisfying the predetermined quality control criteria is depicted in the viewfinder.

17. The method as recited in claim 16, further comprising processing at least one of the automatically captured image and the automatically stored frame(s) at least in part using a processor of the mobile device, wherein the processing comprises one or more of:
tracking the object depicted within the viewfinder in real-time
classifying the object depicted within the viewfinder; and
extracting data from the object depicted in the viewfinder.

18. The method as recited in claim 17, wherein the processing comprises simultaneously tracking a multiple pages across multiple of the frames.

19. A system, comprising:
a processor; and
logic in and/or executable by the processor, the logic being configured to cause the processor to:
store raw or normalized video data from a data capture device in a computer accessible storage medium;
analyze at least portions of the raw or normalized video data with a first analytic engine to:
determine whether the raw video data is within a first set of parameters; and
generate with the first analytic engine a first set of processor settings in response to determining the raw video data is not within the first set of parameters;
process the raw or normalized video data with the first set of processor settings to generate processed data; and
analyze at least portions of the processed data with a second analytic engine to determine whether the processed data is within a second set of parameters;
generate with the second analytic engine a second set of processor settings to reprocess the raw or normalized video data in response to determining the processed data is not within the second set of parameters,
send the second set of processor settings to the first analytic engine; and
reprocess the raw or normalized video data with the first analytic engine using the second set of processor settings, and
wherein the second set of parameters is different than the first set of parameters.

20. A computer program product comprising a non-transitory computer-readable storage medium having embodied thereon computer readable program code, the computer readable program code being executable by a processor, and configured to cause the processor to:
store raw or normalized video data from a data capture device in a computer accessible storage medium;
analyze at least portions of the raw or normalized video data with a first analytic engine to:
determine whether the raw video data is within a first set of parameters; and
generate with the first analytic engine a first set of processor settings in response to determining the raw video data is not within the first set of parameters;
process the raw or normalized video data with the first set of processor settings to generate processed data; and
analyze at least portions of the processed data with a second analytic engine to determine whether the processed data is within a second set of parameters;
generate with the second analytic engine a second set of processor settings to reprocess the raw or normalized video data in response to determining the processed data is not within the second set of parameters,
send the second set of processor settings to the first analytic engine; and
reprocess the raw or normalized video data with the first analytic engine using the second set of processor settings, and
wherein the second set of parameters is different than the first set of parameters.

* * * * *

UNITED STATES PATENT AND TRADEMARK OFFICE
CERTIFICATE OF CORRECTION

Page 1 of 2

PATENT NO. : 9,137,417 B2
APPLICATION NO. : 14/340460
DATED : September 15, 2015
INVENTOR(S) : Anthony Macciola et al.

It is certified that error appears in the above-identified patent and that said Letters Patent is hereby corrected as shown below:

In the Specification:

Col. 1, line 49 replace "end request" with --and request--;

Col. 1, line 65 replace "virtual acquisition" with --virtual reacquisition--;

Col. 2, line 49 replace "were physical" with --where physical--;

Col. 4, line 54 replace "dependence from" with --independence from--;

Col. 5, line 29 replace "dose to optimal" with --close to optimal--;

Col. 5, line 37 replace "be one" with --be done--;

Col. 5, line 41 replace "a heady" with --a nearly--;

Col. 8, line 12 replace "an embodiment" with --band embodiment--;

Col. 8, line 47 replace "lock diagram" with --block diagram--;

Col. 8, line 49 replace "are embodiment" with --an embodiment--;

Col. 9, line 4 replace "of hardware" with --of a hardware--;

Col. 9, line 34 replace "least one" with --in at least one--;

Col. 9, line 35 replace "manner that" with --and in a manner that--;

Col. 9, line 56 replace "random access data the" with --random access data cache--;

Col. 10, line 12 replace "date together" with --data together--;

Col. 10, line 45 replace "use interface" with --user interface--;

Col. 12, line 32 replace "an a" with --and a--;

Col. 12, line 42 replace "the anal engine" with --the analytic engine--;

Col. 13, line 26 replace "at a data" with --of a data--;

Col. 13, line 43 replace "transmitted is a" with --transmitted via a--;

Col. 13, line 47 replace "mage strips," with --image strips,--;

Col. 14, line 39 replace "an engine" with --analytic engine--;

Signed and Sealed this
Fifteenth Day of March, 2016

Michelle K. Lee
*Director of the United States Patent and Trademark Office*

Col. 17, line 16 replace "on real time" with --non real time--;

Col. 18, line 26 replace "the an engine" with --the analytic engine--;

Col. 19, line 28 replace "the were" with --the page--.